US00RE50261E

(19) United States
(12) Reissued Patent
Mimeault et al.

(10) Patent Number: US RE50,261 E
(45) Date of Reissued Patent: Jan. 7, 2025

(54) SYSTEM AND METHOD FOR MULTIPURPOSE TRAFFIC DETECTION AND CHARACTERIZATION

(71) Applicant: LeddarTech Inc., Quebec (CA)

(72) Inventors: Yvan Mimeault, Québec (CA); Samuel Gidel, Québec (CA)

(73) Assignee: LeddarTech Inc., Quebec (CA)

(21) Appl. No.: 17/412,092

(22) Filed: Aug. 25, 2021

Related U.S. Patent Documents

Reissue of:
(64) Patent No.: 9,235,988
Issued: Jan. 12, 2016
Appl. No.: 14/115,244
PCT Filed: Mar. 1, 2013
PCT No.: PCT/IB2013/051667
§ 371 (c)(1),
(2) Date: Nov. 1, 2013
PCT Pub. No.: WO2013/128427
PCT Pub. Date: Sep. 6, 2013

U.S. Applications:
(63) Continuation of application No. 15/867,995, filed on Jan. 11, 2018, now Pat. No. Re. 48,914, which is an application for the reissue of Pat. No. 9,235,988.
(Continued)

(51) Int. Cl.
*G01S 17/58* (2006.01)
*G01S 7/48* (2006.01)
(Continued)

(52) U.S. Cl.
CPC ..... *G01S 17/58* (2013.01); *G01S 7/4802* (2013.01); *G01S 7/4808* (2013.01); *G01S 7/484* (2013.01);
(Continued)

(58) Field of Classification Search
CPC .... G08G 1/0125; G08G 1/015; G08G 1/0175; G08G 1/054; G08G 1/04; G01S 17/023;
(Continued)

(56) References Cited

U.S. PATENT DOCUMENTS 3,680,085 A 7/1972 Del Signore
3,967,111 A 6/1976 Brown
(Continued)

FOREIGN PATENT DOCUMENTS

CA 2857132 1/2007
CA 2633377 6/2007
(Continued)

OTHER PUBLICATIONS

Atiq et al., "Vehicle Detection and Shape Recognition Using Optical Sensors: A Review", 2010 Second International Conference on Machine Learning and Computing, Bangalore, India, Feb. 9-11, 2010, 223-227.
(Continued)

*Primary Examiner* — Jeffrey D Carlson
(74) *Attorney, Agent, or Firm* — Fish & Richardson P.C.

(57) ABSTRACT

A method for tracking and characterizing a plurality of vehicles simultaneously in a traffic control environment, comprising: providing a 3D optical emitter; providing a 3D optical receiver with a wide and deep field of view; driving the 3D optical emitter into emitting short light pulses; receiving a reflection/backscatter of the emitted light, thereby acquiring an individual digital full-waveform LIDAR trace for each detection channel of the 3D optical receiver; using the individual digital full-waveform LIDAR trace and the emitted light waveform, detecting a presence of a plurality of vehicles, a position of at least part of each vehicle and a time at which the position is detected; assigning a unique identifier to each vehicle; repeating the steps of driving, receiving, acquiring and detecting, at a predetermined frequency; tracking and recording an updated position of each vehicle and an updated time at which the updated position is detected.

20 Claims, 46 Drawing Sheets

Related U.S. Application Data

(60) Provisional application No. 61/605,896, filed on Mar. 2, 2012.

(51) Int. Cl.

| | |
|---|---|
| ***G01S 7/484*** | (2006.01) |
| ***G01S 17/66*** | (2006.01) |
| ***G01S 17/86*** | (2020.01) |
| ***G01S 17/88*** | (2006.01) |
| ***G01S 17/89*** | (2020.01) |
| ***G06T 7/277*** | (2017.01) |
| ***G06V 10/20*** | (2022.01) |
| ***G06V 20/54*** | (2022.01) |
| ***G08G 1/01*** | (2006.01) |
| ***G08G 1/015*** | (2006.01) |
| ***G08G 1/017*** | (2006.01) |
| ***G08G 1/04*** | (2006.01) |
| ***G08G 1/054*** | (2006.01) |

(52) U.S. Cl.

CPC ..... *G01S 17/66* (2013.01); *G01S 17/86* (2020.01); *G01S 17/88* (2013.01); *G01S 17/89* (2013.01); *G06T 7/277* (2017.01); *G06V 10/255* (2022.01); *G06V 20/54* (2022.01); *G08G 1/0125* (2013.01); *G08G 1/015* (2013.01); *G08G 1/0175* (2013.01); *G08G 1/04* (2013.01); *G08G 1/054* (2013.01); *G06T 2200/04* (2013.01); *G06T 2207/10028* (2013.01); *G06T 2207/30236* (2013.01); *G06V 2201/08* (2022.01)

(58) Field of Classification Search

CPC ..... G01S 17/58; G01S 17/66; G01S 17/88; G01S 17/89; G01S 7/4802; G01S 7/4808; G01S 7/484; G06K 9/3241; G06K 9/00785; G06K 2209/23; G06T 2200/04; G06T 2207/10028; G06T 2207/30236; G06T 7/277

See application file for complete search history.

(56) References Cited

U.S. PATENT DOCUMENTS 4,533,242 A 8/1985 McLauchlan et al.
4,634,272 A 1/1987 Endo
4,717,862 A 1/1988 Anderson
4,733,961 A 3/1988 Mooney
4,808,997 A 2/1989 Barkley et al.
4,891,624 A 1/1990 Ishikawa et al.
4,928,232 A 5/1990 Gentile
5,102,218 A 4/1992 Min et al.
5,134,393 A 7/1992 Henson
5,179,286 A 1/1993 Akasu
5,270,780 A 12/1993 Moran et al.
5,317,311 A 5/1994 Martell et al.
5,357,331 A 10/1994 Flockencier
5,381,155 A 1/1995 Gerber
5,389,921 A 2/1995 Whitton
5,621,518 A 4/1997 Beller
5,629,704 A 5/1997 Throngnumchai et al.
5,633,629 A 5/1997 Hochstein
5,633,801 A 5/1997 Bottman
5,714,754 A 2/1998 Nicholas
5,760,686 A 6/1998 Toman
5,760,887 A 6/1998 Fink et al.
5,764,163 A 6/1998 Waldman et al.
5,777,564 A 7/1998 Jones
5,793,491 A * 8/1998 Wangler ..... G01S 7/4802 356/398
5,805,468 A 9/1998 Blöhbaum
5,812,249 A 9/1998 Johnson et al.
5,828,320 A 10/1998 Buck
5,836,583 A 11/1998 Towers
5,838,116 A 11/1998 Katyl et al.
5,889,477 A 3/1999 Fastenrath
5,896,190 A 4/1999 Wangler et al.
5,942,753 A 8/1999 Dell
5,953,110 A 9/1999 Burns
5,963,127 A 10/1999 Lang et al.
5,995,900 A 11/1999 Hsiao et al.
6,044,336 A 3/2000 Marmarelis et al.
6,094,159 A 7/2000 Osterfeld et al.
6,100,539 A 8/2000 Blümcke et al.
6,104,314 A 8/2000 Jiang
6,107,942 A 8/2000 Yoo et al.
6,115,113 A 9/2000 Flockencier
6,142,702 A 11/2000 Simmons
6,147,624 A 11/2000 Clapper
6,166,645 A 12/2000 Blaney
6,259,515 B1 7/2001 Benz et al.
6,259,862 B1 7/2001 Marino et al.
6,266,609 B1 7/2001 Fastenrath
6,281,632 B1 8/2001 Stam et al.
6,285,297 B1 9/2001 Ball
6,304,321 B1 * 10/2001 Wangler ..... G01S 17/89 356/398
6,340,935 B1 1/2002 Hall
6,363,326 B1 3/2002 Scully
6,377,167 B1 4/2002 Juds et al.
6,388,565 B1 5/2002 Bernhard et al.
6,404,506 B1 6/2002 Cheng et al.
6,411,221 B2 6/2002 Horber
6,417,783 B1 7/2002 Gabler et al.
6,426,708 B1 7/2002 Trajkovic et al.
6,502,011 B2 12/2002 Haag
6,502,053 B1 12/2002 Hardin et al.
6,516,286 B1 2/2003 Aebischer et al.
6,548,967 B1 4/2003 Dowling et al.
6,556,916 B2 4/2003 Waite et al.
6,559,776 B2 5/2003 Katz
6,580,385 B1 6/2003 Winner
6,642,854 B2 11/2003 McMaster
6,650,250 B2 11/2003 Muraki
6,665,621 B2 12/2003 Drinkard et al.
6,674,394 B1 1/2004 Zoratti
6,753,766 B2 6/2004 Patchell
6,753,950 B2 6/2004 Morcom
6,765,495 B1 7/2004 Dunning et al.
6,771,185 B1 8/2004 Yoo et al.
6,794,831 B2 9/2004 Leeb et al.
6,821,003 B2 11/2004 Baker et al.
6,825,778 B2 11/2004 Bergan et al.
6,831,576 B2 12/2004 Geiger et al.
6,836,317 B1 12/2004 Perger
6,842,231 B2 1/2005 Nourrcier et al.
6,850,156 B2 2/2005 Bloomfield et al.
6,885,311 B2 4/2005 Howard
6,885,312 B1 4/2005 Kirkpatrick
6,917,307 B2 7/2005 Li
6,927,700 B1 8/2005 Quinn
6,946,974 B1 9/2005 Racunas, Jr.
7,026,954 B2 4/2006 Slemmer et al.
7,049,945 B2 5/2006 Breed et al.
7,081,832 B2 7/2006 Nelson et al.
7,106,214 B2 9/2006 Jesadanont et al.
7,116,246 B2 10/2006 Winter et al.
7,119,674 B2 10/2006 Sefton
7,119,715 B2 10/2006 Orita
7,123,166 B1 10/2006 Haynes et al.
7,135,991 B2 11/2006 Slemmer et al.
7,148,813 B2 12/2006 Bauer
7,209,221 B2 4/2007 Breed et al.
7,221,271 B2 5/2007 Reime
7,221,288 B2 5/2007 Fitzgibbon et al.
7,236,102 B2 6/2007 Shimotani
7,250,605 B2 7/2007 Zhevelev et al.
7,253,747 B2 8/2007 Noguchi
7,317,384 B2 1/2008 Lefranc
7,319,777 B2 1/2008 Morcom
7,321,317 B2 1/2008 Nath et al.

(56) References Cited

U.S. PATENT DOCUMENTS 7,350,945 B2 4/2008 Albou et al.
7,352,972 B2 4/2008 Franklin
7,359,782 B2 4/2008 Breed et al.
7,378,947 B2 5/2008 Daura Luna et al.
7,405,676 B2 7/2008 Janssen
7,417,718 B2 8/2008 Wada et al.
7,426,450 B2 9/2008 Arnold et al.
7,486,204 B2 2/2009 Quintos
7,492,281 B2 2/2009 Lynam et al.
7,504,932 B2 3/2009 Bartels
7,554,652 B1 6/2009 Babin et al.
7,573,400 B2 8/2009 Arnold et al.
7,616,293 B2 11/2009 Sirota et al.
7,633,433 B2 12/2009 Behrens et al.
7,635,854 B1 12/2009 Babin
7,640,122 B2 12/2009 Levesque et al.
7,652,245 B2 1/2010 Crickmore et al.
7,688,222 B2 3/2010 Peddie et al.
7,725,348 B1 * 5/2010 Allen ..... G07B 15/063 705/13
7,734,500 B1 * 6/2010 Allen ..... G07B 15/063 701/1
7,760,111 B2 7/2010 Lynam et al.
7,764,193 B2 7/2010 Chen
7,796,081 B2 9/2010 Breed
7,808,401 B1 10/2010 Schwartz et al.
7,852,462 B2 12/2010 Breed et al.
7,855,376 B2 12/2010 Cantin et al.
7,859,432 B2 12/2010 Kim et al.
7,872,572 B2 1/2011 Harrington et al.
7,889,097 B1 2/2011 Arnold et al.
7,889,098 B1 2/2011 Arnold et al.
7,895,007 B2 2/2011 Levesque et al.
7,898,433 B2 3/2011 Roberts
7,917,320 B2 3/2011 Levesque et al.
7,933,690 B2 4/2011 Kushida et al.
7,952,491 B2 5/2011 Schwartz et al.
7,957,900 B2 * 6/2011 Chowdhary et al. ..... 701/300
8,242,476 B2 8/2012 Mimeault et al.
8,331,621 B1 * 12/2012 Allen ..... G08G 1/015 235/384
8,436,748 B2 5/2013 Mimeault et al.
8,593,519 B2 * 11/2013 Tauchi ..... G01S 13/89 348/142
8,600,656 B2 12/2013 Mimeault et al.
8,761,447 B2 * 6/2014 Maxik ..... H05B 37/0227 315/129
8,823,951 B2 * 9/2014 Mimeault ..... A47B 53/02 356/614
8,924,140 B2 * 12/2014 Sakamoto ..... G08G 1/166 340/435
8,964,031 B2 2/2015 Clucas
9,235,988 B2 1/2016 Mimeault
RE48,914 E 2/2022 Mimeault et al.
2002/0005778 A1 1/2002 Breed et al.
2002/0033884 A1 3/2002 Schurr
2002/0117340 A1 8/2002 Stettner
2002/0141618 A1 10/2002 Ciolli
2003/0114964 A1 * 6/2003 Strumolo ..... G08G 1/165 701/1
2003/0154017 A1 8/2003 Ellis
2003/0189500 A1 10/2003 Lim
2004/0035620 A1 2/2004 McKeefery
2004/0051859 A1 3/2004 Flockencier
2004/0083035 A1 4/2004 Ellis
2004/0118624 A1 6/2004 Beuhler et al.
2004/0135992 A1 7/2004 Munro
2004/0254728 A1 * 12/2004 Poropat ..... G01S 17/107 701/301
2005/0046597 A1 3/2005 Hutchison et al.
2005/0078297 A1 4/2005 Doemens et al.
2005/0117364 A1 6/2005 Rennick et al.
2005/0187701 A1 8/2005 Baney
2005/0231384 A1 10/2005 Shimotani
2005/0232469 A1 10/2005 Schofield et al.
2005/0269481 A1 12/2005 David et al.
2005/0270175 A1 12/2005 Peddie et al.
2005/0285738 A1 12/2005 Seas et al.
2006/0033641 A1 2/2006 Jaupitre
2006/0066472 A1 3/2006 Janssen
2006/0145824 A1 7/2006 Frenzel et al.
2006/0147089 A1 7/2006 Han et al.
2006/0149472 A1 7/2006 Han et al.
2006/0180670 A1 8/2006 Acosta et al.
2006/0203505 A1 9/2006 Griesinger et al.
2006/0221228 A1 10/2006 Kikuchi
2007/0018106 A1 1/2007 Zhevelev et al.
2007/0061192 A1 3/2007 Chew
2007/0091294 A1 4/2007 Hipp
2007/0096943 A1 5/2007 Arnold et al.
2007/0181786 A1 8/2007 Doemens
2007/0181810 A1 8/2007 Tan
2007/0205918 A1 9/2007 Riesco Prieto et al.
2007/0222639 A1 9/2007 Giles et al.
2007/0228262 A1 10/2007 Cantin et al.
2007/0255525 A1 11/2007 Lee et al.
2008/0006762 A1 1/2008 Fadell et al.
2008/0166023 A1 7/2008 Wang
2008/0172171 A1 7/2008 Kowalski
2008/0186470 A1 8/2008 Hipp
2008/0245952 A1 10/2008 Troxell
2008/0278366 A1 11/2008 Behrens
2008/0309914 A1 12/2008 Cantin et al.
2009/0027185 A1 1/2009 Daura Luna
2009/0102699 A1 4/2009 Behrens et al.
2009/0174540 A1 * 7/2009 Smith ..... B60Q 1/34 340/465
2009/0243822 A1 10/2009 Hinninger et al.
2009/0251680 A1 10/2009 Farsaie
2009/0267784 A1 10/2009 Braghiroli et al.
2009/0299631 A1 * 12/2009 Hawes ..... B60R 21/0134 701/300
2009/0323741 A1 12/2009 Deladurantaye et al.
2010/0020306 A1 1/2010 Hall
2010/0066527 A1 3/2010 Liou
2010/0117812 A1 5/2010 Laubinger et al.
2010/0141765 A1 6/2010 Capello et al.
2010/0191418 A1 7/2010 Mimeault et al.
2010/0194595 A1 8/2010 Mimeault et al.
2010/0214554 A1 8/2010 Audier et al.
2010/0277713 A1 11/2010 Mimeault
2010/0309024 A1 12/2010 Mimeault
2011/0006188 A1 1/2011 Lin
2011/0025843 A1 2/2011 Oggier et al.
2011/0026007 A1 2/2011 Gammenthaler
2011/0026008 A1 2/2011 Gammenthaler
2011/0115409 A1 5/2011 Schwartz et al.
2011/0115645 A1 5/2011 Hall et al.
2011/0134249 A1 6/2011 Wood et al.
2011/0205521 A1 * 8/2011 Mimeault et al. ..... 356/4.01
2011/0235028 A1 9/2011 Rohrseitz
2011/0255070 A1 10/2011 Phillips et al.
2012/0038902 A1 2/2012 Dotson
2012/0106800 A1 * 5/2012 Khan ..... G06T 7/20 382/104
2012/0229304 A1 9/2012 Dalal
2012/0287417 A1 11/2012 Mimeault
2012/0307065 A1 12/2012 Mimeault et al.
2014/0159925 A1 6/2014 Mimeault et al.
2014/0232566 A1 8/2014 Mimeault et al.

FOREIGN PATENT DOCUMENTS

CA 2710212 7/2009
CA 2782180 6/2011
CA 3112113 9/2013
CA 2998166 4/2019
CA 2998175 11/2020
CA 2865733 9/2023
CN 2857132 1/2007
CN 201917321 8/2011
DE 29617413 11/1996
DE 19823135 11/1999

(56) References Cited

FOREIGN PATENT DOCUMENTS

| | | | |
|---|---|---|---|
| DE | 19921449 | | 1/2001 |
| DE | 69710579 | | 8/2002 |
| DE | 10247290 | | 4/2004 |
| DE | 19604338 | | 7/2004 |
| DE | 102004035856 | | 3/2005 |
| DE | 202005010816 | | 11/2005 |
| DE | 102006025020 | | 11/2007 |
| DE | 202008007078 | | 10/2008 |
| DE | 102007038973 | | 2/2009 |
| DE | 102009013841 | | 9/2009 |
| DE | 102004016025 | | 5/2010 |
| DE | 102008043880 | | 5/2010 |
| DE | 102010012811 | | 9/2011 |
| DE | 102010012811 | A1 | 9/2011 |
| EP | 0318260 | | 5/1989 |
| EP | 0476562 | | 3/1992 |
| EP | 0259445 | | 8/1993 |
| EP | 0494815 | | 12/1996 |
| EP | 0798684 | | 10/1997 |
| EP | 0838695 | | 4/1998 |
| EP | 0612049 | | 9/1998 |
| EP | 0912970 | | 4/2000 |
| EP | 0779990 | | 3/2003 |
| EP | 0935764 | | 3/2003 |
| EP | 1296302 | | 3/2003 |
| EP | 0789342 | | 6/2003 |
| EP | 1334869 | | 8/2003 |
| EP | 1334869 | A2 | 8/2003 |
| EP | 0784302 | | 9/2003 |
| EP | 1034522 | | 1/2004 |
| EP | 0866434 | | 6/2004 |
| EP | 0988624 | | 7/2004 |
| EP | 0834424 | | 11/2004 |
| EP | 1220181 | | 8/2005 |
| EP | 1521226 | | 6/2006 |
| EP | 1049064 | | 9/2006 |
| EP | 0904552 | | 3/2007 |
| EP | 1052143 | | 7/2007 |
| EP | 1542194 | | 5/2009 |
| EP | 1048961 | | 7/2009 |
| EP | 2106968 | | 10/2009 |
| EP | 1224632 | | 12/2009 |
| EP | 2136550 | | 12/2009 |
| EP | 1435036 | | 1/2010 |
| EP | 1611458 | | 4/2010 |
| EP | 1997090 | | 9/2010 |
| EP | 1859990 | | 4/2011 |
| EP | 2306426 | | 4/2011 |
| EP | 2306426 | A1 | 4/2011 |
| EP | 2393295 | | 12/2011 |
| EP | 2393295 | A1 | 12/2011 |
| EP | 2820632 | | 5/2017 |
| FR | 2690519 | | 10/1993 |
| FR | 2743150 | | 7/1997 |
| FR | 2743151 | | 7/1997 |
| FR | 2749670 | | 12/1997 |
| FR | 2910408 | | 6/2008 |
| GB | 2264411 | | 8/1993 |
| GB | 2311265 | | 9/1997 |
| GB | 2354898 | | 7/2003 |
| GB | 2369737 | | 2/2005 |
| GB | 2399968 | | 2/2005 |
| GB | 2431498 | | 4/2007 |
| GB | 2445767 | | 7/2008 |
| JP | 2059608 | | 2/1990 |
| JP | H02059608 | | 2/1990 |
| JP | 04145390 | | 5/1992 |
| JP | 04145391 | | 5/1992 |
| JP | H04172285 | A | 6/1992 |
| JP | H07280940 | | 10/1995 |
| JP | 09178786 | | 7/1997 |
| JP | 2004102889 | | 4/2004 |
| JP | 2005170184 | | 6/2005 |
| JP | 2006021720 | | 1/2006 |
| JP | 2006507180 | | 3/2006 |
| JP | 2006172210 | | 6/2006 |
| JP | 2006258598 | | 9/2006 |
| JP | 2006521536 | | 9/2006 |
| JP | 2007121116 | | 5/2007 |
| WO | 8705138 | | 8/1987 |
| WO | WO1987005138 | | 8/1987 |
| WO | WO199203808 | | 3/1992 |
| WO | WO199634252 | | 10/1996 |
| WO | WO199904378 | | 1/1999 |
| WO | WO200139153 | | 5/2001 |
| WO | WO2001085491 | | 11/2001 |
| WO | WO200215334 | | 2/2002 |
| WO | WO2003000520 | | 1/2003 |
| WO | WO2003007269 | | 1/2003 |
| WO | 2004010402 | | 1/2004 |
| WO | 2004027451 | | 4/2004 |
| WO | 2004036244 | | 4/2004 |
| WO | 2004039631 | A1 | 5/2004 |
| WO | WO2004039631 | | 5/2004 |
| WO | 2004100103 | | 11/2004 |
| WO | 2005008271 | | 1/2005 |
| WO | 2005072358 | A2 | 8/2005 |
| WO | WO2005072358 | | 8/2005 |
| WO | 2006031220 | | 3/2006 |
| WO | 2006044758 | | 4/2006 |
| WO | 2006082502 | | 8/2006 |
| WO | 2006092659 | | 9/2006 |
| WO | 2007005942 | | 1/2007 |
| WO | 2007071032 | | 6/2007 |
| WO | 2007096814 | | 8/2007 |
| WO | 2008037049 | | 4/2008 |
| WO | 2008121648 | | 10/2008 |
| WO | 2008154736 | | 12/2008 |
| WO | 2008154737 | | 12/2008 |
| WO | 2009013739 | | 1/2009 |
| WO | 2009079789 | | 7/2009 |
| WO | 2009087536 | | 7/2009 |
| WO | 2009104955 | | 8/2009 |
| WO | 2009117197 | | 9/2009 |
| WO | 2010033024 | | 3/2010 |
| WO | 2010057697 | | 5/2010 |
| WO | 2010069002 | | 6/2010 |
| WO | 2010122284 | | 10/2010 |
| WO | 2010144349 | | 12/2010 |
| WO | 2011015817 | | 2/2011 |
| WO | 2011025563 | | 3/2011 |
| WO | 2011055259 | | 5/2011 |
| WO | 2011077400 | | 6/2011 |
| WO | 2012153309 | | 11/2012 |
| WO | 2012172526 | | 12/2012 |
| WO | WO2013128427 | | 9/2013 |
| WO | WO2013128427 | A1 | 9/2013 |

OTHER PUBLICATIONS

Baig et al., "Fusion Between Laser and Stereo Vision Data for Moving Objects Tracking in Intersection Like Scenario," 2011 IEEE Intelligent Vehicles Symposium (IV), Baden-Baden, Germany, Jun. 5-9, 2011, 362-367.

Examiners Report in Canadian Appln. No. 2865733, dated Aug. 12, 2020, 3 pages.

Examiners Report in Canadian Appln. No. 2865733, dated May 3, 2021, 3 pages.

Examiners Report in Canadian Appln. No. 2865733, dated Nov. 18, 2019, 4 pages.

Examiners Report in Canadian Appln. No. 2998166, dated Jul. 5, 2018, 6 pages.

Examiners Report in Canadian Appln. No. 2998166, dated Nov. 30, 2018, 4 pages.

Examiners Report in Canadian Appln. No. 2998175, dated Jul. 20, 2018, 3 pages.

Examiners Report in Canadian Appln. No. 2998175, dated Jul. 30, 2019, 6 pages.

Examiners Report in Canadian Appln. No. 2998175, dated Mar. 15, 2019, 5 pages.

(56) References Cited

OTHER PUBLICATIONS

Examiners Report in Canadian Appln. No. 2998175, dated Nov. 20, 2019, 5 pages.
Examiners Report in Canadian Appln. No. 2998175, dated Nov. 30, 2018, 5 pages.
International Preliminary Report on Patentability in International Application No. PCT/IB2013/051667, dated Sep. 2, 2014, 6 pages.
International Search Report and Written Opinion in International Application No. PCT/IB2013/051667, dated Jul. 9, 2013, 8 pages.
Notice of Allowance in Canadian Appln. No. 2865733, dated May 15, 2018, 1 page.
Notice of Allowance in Canadian Appln. No. 2998166, dated Feb. 12, 2019, 1 page.
Examiner's Report issued Aug. 15, 2022 in connection with CA 3,112,113, 3 pages.
Examiner's Report issued on Dec. 10, 2021 in connection with CA 2,865,733, 3 pages.
Examiner's Report issued Sep. 2, 2022 in connection with CA 2,865,733, 4 pages.
Final Office Action issued Apr. 10, 2020 in connection with U.S. Appl. No. 15/867,995, 15 pages.
Final Office Action issued May 7, 2021 in connection with U.S. Appl. No. 15/867,995, 14 pages.
Non-Final Office Action dated Apr. 7, 2015 in connection with U.S. Appl. No. 14/115,244, 10 pages.
Non-Final Office Action issued Dec. 16, 2020 in connection with U.S. Appl. No. 15/867,995, 12 pages.
Non-Final Office Action issued Sep. 17, 2019 in connection with U.S. Appl. No. 15/867,995, 38 pages.
Notice of Allowance dated Sep. 4, 2015 in connection with U.S. Appl. No. 14/115,244, 10 pages.
Notice of Allowance issued Sep. 9, 2021 in connection with U.S. Appl. No. 15/867,995, 10 pages.
Petrovskaya et al., "Awareness of Road Scene Participants for Autonomous Drawing," Handbook of Intelligent Vehicles, Oct. 12, 2011, 37 pages.
Communication pursuant to Article 94(3) EPC issued in connection with application No. EP 13755537 on Aug. 6, 2015, 9 pages.
Communication under Rule 71(3) EPC Intention to Grant issued in connection with application No. EP 13755537 on Oct. 19, 2016, 5 pages.
Examiner's Report issued Jun. 5, 2023 in connection with CA 3112113, 6 pages.
Notice of Allowance issued Aug. 17, 2023 in connection with Canadian Patent Application No. CA 2865733, 1 page.
Notice of Allowance issued Jul. 28, 2020 in connection with Canadian Patent Application No. 2998175, 1 page.
Supplemental European Search Report issued in connection with application No. EP 13755537 on Jul. 14, 2015, 7 pages.
Supplemental Partial European Search Report issued in connection with application No. EP 13755537 on Feb. 20, 2015, 8 pages.
U.S. Department of Transportation Federal Highway Administration, "Detailed Monitoring Protocol 4.0 Monitoring Methods", Department of Air Quality, Air Toxic MSAT, available at http://www.fhwa.dot.gov/environment/air_quality/air_toxics/research_and_analysis/near_road_study/protocol/protocol04.cfm, Updated on Jul. 6, 2011.
Examiner's Report in Canadian Appln. No. 3112113, mailed on May 10, 2024, 9 pages.
Shimoni et al., "Detection of vehicles in shadow areas", Workshop on Hyperspectral Image and Signal Processing: Evolution in Remote Sensing (WHISPERS), 2011 3rd, Jun. 6-9, 2011, pp. 1-4, IEEE, Lisbon.
United States Department of Transportation, Federal Highway Administration, Sensor Technology—Chapter 2, Traffic Detector Handbook : Third Edition—vol. 1, FHWA-HRT-06-108, available at http://www.tfhrc.gov/its/pubs/06108/02a.htm on Sep. 16, 2009.
The Vehicle Detector Clearinghouse, "A Summary of Vehicle Detection and Surveillance Technologies used in Intelligent Transportation Systems", Fall 2000, Southwest Technology Development Institute (SWTDI) at New Mexico State University (NMSU), sponsored in cooperation with the U.S. Department of Transportation FHWA, available at http://www.fhwa.dot.gov/ohim/tvtw/vdstits.
United States Department of Transporation, Research and Innovative Technology Administration, 5.3. Infrared Detectors, available at http://ntl.bts.gov/DOCS/96100/ch05/body_ch05_03.html on Sep. 16, 2009.
Tayfun Kon, Thesis, "Collision Warning and Avoidance System for Crest Vertical Curves", Virginia Tech, May 4, 1998, Appendix 82, pp. 51-92, published on Digital Library and Archives, University Libraries of Virginia Tech, VA.
Lawrence A. Klein, Vehicle Detector Technologies for Traffic Management Applications, Part 1, Colorado Department of Transportation, Intelligent Transportation Systems (ITS), 1997, available at http://www.cotrip.org/its/ITS%20Guidelines%20Web%20New%20Format%202-05/Web%20Solutions%20Packages/ITS%20Solution%20Packages%20-%20Web%20Copy/Vehicle%20Detectors/Klein%20Part%201%20Vehicle%20Detector%20Technologies.doc on Sep. 16, 2009.
Hussain, Tarik Mustafa, City University of New-York, Infrared Vehicle Sensor for Traffic Control, Thesis (PHD) City University of New York, Dissertation Abstracts International, vol. 55-07, Section A, p. 2176, 1994, available at http://adsabs.harvard.edu//abs/1994PhDT 85H on Sep. 16, 2009.
Dimitri Loukakos, Active Laser Infrared Detectors, Intelligent Transportation Systems, Traffic Surveillance, California Center for Innovative Transportation at the University of California, Dec. 20, 2001, available at http://www.calccit.org/itsdecision/serv_and_tech/Traffic_Surveillance/road-based/roadside/other_roadside_rep.html on Sep. 16, 2009.
GENEQ Inc., Passive Infrared Detector for Traffic Data Acquisition, Model IR 250, Department of Meteorology, available at http://www.geneq.com/catalog/en/ir250.html on Sep. 16, 2009.
Akindinov et al., "Detection of Light Pulses Using an Avalanche-Photodiode Array with a Metal-Resistor-Semiconductor Structure", Instruments and Experimental Techniques, Nov. 2004, vol. 48, No. 3205, pp. 355-363, Russia.
Braun et al., "Nanosecond transient electroluminescence from polymer lightemitting diodes", Applied Physics Letters Dec. 1992, vol. 61, No. 26, pp. 3092-3094, California.

* cited by examiner

Top view

SYSTEM AND METHOD FOR MULTIPURPOSE TRAFFIC DETECTION AND CHARACTERIZATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue continuation application of and claims priority of U.S. application Ser. No. 15/867,995, filed on Jan. 11, 2018. U.S. application Ser. No. 15/867,995 is a reissue application based on U.S. application Ser. No. 14/115,244, filed on Nov. 1, 2013, which previously issued as U.S. Pat. No. 9,235,988.*

TECHNICAL FIELD

The present invention relates to a system and method for traffic detection and more particularly to an optical system that detects the presence, location, lane position, direction and speed of vehicles in a traffic zone using an active three-dimensional sensor based on the time-of-flight ranging principle and an image sensor.

BACKGROUND OF THE ART

Growth in transportation demand has a major impact on traffic congestion and safety. To enhance the on-road safety and efficiency, major investments in transport infrastructures, including capital, operation and maintenance, are made all over the world. Intelligent systems collecting and disseminating real time traffic information is a key element for the optimization of traffic management.

Traffic monitoring can consist in different activities such as detecting the presence of a vehicle in a specific zone, counting the number of vehicles (volume), determining the lane position, classifying each vehicle, determining the direction of travel, estimating the occupancy and determining the speed.

Other traffic surveillance applications such as electronic toll collection and traffic enforcement require the same kind of information with a very high level of reliability.

In the United States, the FHWA has defined a vehicle classification based on 13 categories of vehicles from motorcycles, passenger cars, buses, two-axle-six-tire-single unit trucks, and up to a seven or more axle multi-trailer trucks classes. Several alternative classification schemes are possible. Often, the aggregation of the FHWA 13 classes is split into 3 or 4 classes. Other countries have their own way to define a classification for vehicles.

In the case of speed infringement, determining the position and the lane, measuring accurately the speed of a specific vehicle in a multi-lane high-density highway, and associating this information without any ambiguity with the vehicle identified using an Automatic License Plate Recognition (ALPR) system is quite challenging.

A red light enforcement system has comparable requirements. There is a need for an automatic red light enforcement system but the high reliability required for this application is also challenging. It implies the detection of vehicles at specific locations, the tracking of each of these vehicles in dense traffic at the intersection, the identification of each of these vehicles with the ALPR system, the confirmation of a red light violation by a specific vehicle and the collection of all information to support the issuance of a traffic violation ticket to the registered owner of the vehicle without any ambiguity.

Different kinds of detectors are used to collect data for these applications. Intrusive detectors such as inductive loop detectors are still common for detecting the presence of vehicles but have some disadvantages such as lengthy disruption to the traffic flow during installation and maintenance, inflexibility and inability to track a vehicle. Cameras with video processing have some drawbacks notably for speed measurement.

Radar technology is known to perform well for speed measurement but has some limitations in terms of lateral resolution making difficult the association between a speed measurement and the identification of a specific vehicle in dense traffic, for example, at an intersection. Radar technology presents difficulties in the correlation of a specific speed measurement to a specific vehicle when two or more vehicles traveling at different speeds simultaneously enter into the measurement beam. This limitation has an impact for speed enforcement applications. In some countries, legislation requires that ambiguous situations simply be discarded to reduce errors in the process. Installation of radar technology for speed enforcement is demanding because it requires adjusting the angle of the axis of the main lobe of emission in both the horizontal and vertical directions with respect to the axis of the road, with accuracy typically less than one-half degree angle to limit the cosine effect.

Thus, there is a need for a method and system for reliable multipurpose traffic detection for traffic management and enforcement applications.

SUMMARY

According to one broad aspect of the present invention, there is provided a method for tracking and characterizing a plurality of vehicles simultaneously in a traffic control environment. The method comprises providing a 3D optical emitter at an installation height oriented to allow illumination of a 3D detection zone in the environment; providing a 3D optical receiver oriented to have a wide and deep field of view within the 3D detection zone, the 3D optical receiver having a plurality of detection channels in the field of view; driving the 3D optical emitter into emitting short light pulses toward the detection zone, the light pulses having an emitted light waveform; receiving a reflection/backscatter of the emitted light on the vehicles in the 3D detection zone at the 3D optical receiver, thereby acquiring an individual digital full-waveform LIDAR trace for each detection channel of the 3D optical receiver; using the individual digital full-waveform LIDAR trace and the emitted light waveform, detecting a presence of a plurality of vehicles in the 3D detection zone, a position of at least part of each the vehicle in the 3D detection zone and a time at which the position is detected; assigning a unique identifier to each vehicle of the plurality of vehicles detected; repeating the steps of driving, receiving, acquiring and detecting, at a predetermined frequency; at each instance of the repeating step, tracking and recording an updated position of each vehicle of the plurality of vehicles detected and an updated time at which the updated position is detected, with the unique identifier.

In one embodiment, the traffic control environment is at least one of a traffic management environment and a traffic enforcement environment.

In one embodiment, detecting the presence includes extracting observations in the individual digital full-waveform LIDAR trace; using the location for the observations to remove observations coming from a surrounding environment; extracting lines using an estimate line and a covariance matrix using polar coordinates; removing observations located on lines parallel to the x axis.

In one embodiment, detecting the presence includes extracting observations in the individual digital full-waveform LIDAR trace and intensity data for the observations; finding at least one blob in the observations; computing an observation weight depending on the intensity of the observations in the blob; computing a blob gravity center based on the weight and a position of the observations in the blob.

In one embodiment, the method further comprises setting at least one trigger line location and recording trigger line trespassing data with the unique identifier.

In one embodiment, the method further comprises setting the trigger line location relative to a visible landmark in the environment.

In one embodiment, detecting the time at which the position is detected includes assigning a timestamp for the detecting the presence and wherein the timestamp is adapted to be synchronized with an external controller.

In one embodiment, the method further comprises obtaining a classification for each detected vehicles using a plurality of detections in the 3D detection zone caused by the same vehicle.

In one embodiment, detecting the presence further comprises detecting a presence of a pedestrian in the environment.

In one embodiment, the part of the vehicle is one of a front, a side and a rear of the vehicle.

In one embodiment, emitting short light pulses includes emitting short light pulses of a duration of less than 50 ns.

In one embodiment, the 3D optical emitter is at least one of an infrared LED source, a visible-light LED source and a laser.

In one embodiment, providing the 3D optical receiver to have a wide and deep field of view includes providing the 3D optical receiver to have a horizontal field of view angle of at least 20° and a vertical field of view angle of at least 4°.

In one embodiment, the method further comprises determining and recording a speed for each the vehicle using the position and the updated position of one of the instances of the repeating step and an elapsed time between the time of the position and the updated time of the updated position, with the unique identifier.

In one embodiment, the method further comprises using a Kalman filter to determine an accuracy for the speed to validate the speed; comparing the accuracy to a predetermined accuracy threshold; if the accuracy is lower than the predetermined accuracy threshold, rejecting the speed.

In one embodiment, the method further comprises retrieving a speed limit and identifying a speed limit infraction by comparing the speed recorded for each the vehicle to the speed limit.

In one embodiment, the method further comprises providing a 2D optical receiver, wherein the 2D optical receiver being an image sensor adapted to provide images of the 2D detection zone; driving the 2D optical receiver to capture a 2D image; using image registration to correlate corresponding locations between the 2D image and the detection channels; extracting vehicle identification data from the 2D image at a location corresponding to the location for the detected vehicle; assigning the vehicle identification data to the unique identifier.

In one embodiment, the vehicle identification data is at least one of a picture of the vehicle and a license plate alphanumerical code present on the vehicle.

In one embodiment, the vehicle identification data includes the 2D image showing a traffic violation.

In one embodiment, the method further comprises extracting at least one of a size of characters on the license plate and a size of the license plate and comparing one of the size among different instances of the repeating to determine an approximate speed value.

In one embodiment, the method further comprises providing a 2D illumination source oriented to allow illumination of a 2D detection zone in the 3D detection zone and driving the 2D illumination source to emit pulses to illuminate the 2D detection zone and synchronizing the driving the 2D optical receiver to capture images with the driving the 2D illumination source to emit pulses to allow capture of the images during the illumination.

In one embodiment, driving the 2D illumination source includes driving the 2D illumination source to emit pulses of a duration between 10 μs and 10 ms.

In one embodiment, the 2D illumination source is at least one of a visible light LED source, an infrared LED light source and laser.

In one embodiment, the 3D optical emitter and the 2D illumination source are provided by a common infrared LED light source.

In one embodiment, the vehicle identification data is at least two areas of high retroreflectivity apparent on the images, the detecting a presence includes extracting observations in the individual digital signals and intensity data for the observations, the method further comprising correlating locations for the areas of high retroreflectivity and high intensity data locations in the observations, wherein each the area of high retroreflectivity is created from one of a retroreflective license plate, a retro-reflector affixed on a vehicle and a retro-reflective lighting module provided on a vehicle.

In one embodiment, the method further comprises combining multiples ones of the captured images into a combined image with the vehicle and the vehicle identification data apparent.

According to another broad aspect of the present invention, there is provided a system for tracking and characterizing a plurality of vehicles simultaneously in a traffic control environment, the system comprising: a 3D optical emitter provided at an installation height and oriented to allow illumination of a 3D detection zone in the environment; a 3D optical receiver provided and oriented to have a wide and deep field of view within the 3D detection zone, the 3D optical receiver having a plurality of detection channels in the field of view; a controller for driving the 3D optical emitter into emitting short light pulses toward the detection zone, the light pulses having an emitted light waveform; the 3D optical receiver receiving a reflection/backscatter of the emitted light on the vehicles in the 3D detection zone, thereby acquiring an individual digital full-waveform LIDAR trace for each channel of the 3D optical receiver; a processor for detecting a presence of a plurality of vehicles in the 3D detection zone using the individual digital full-waveform LIDAR trace and the emitted light waveform, detecting a position of at least part of each the vehicle in the 3D detection zone, recording a time at which the position is detected, assigning a unique identifier to each vehicle of the plurality of vehicles detected and tracking and recording an updated position of each vehicle of the plurality of vehicles detected and an updated time at which the updated position is detected, with the unique identifier.

In one embodiment, the processor is further for determining and recording a speed for each the vehicle using the position and the updated position of one of the instances of the repeating step and an elapsed time between the time of the position and the updated time of the updated position, with the unique identifier.

In one embodiment, the system further comprises a 2D optical receiver, wherein the 2D optical receiver is an image sensor adapted to provide images of the 2D detection zone; and a driver for driving the 2D optical receiver to capture a 2D image; the processor being further adapted for using image registration to correlate corresponding locations between the 2D image and the detection channels and extracting vehicle identification data from the 2D image at a location corresponding to the location for the detected vehicle; and assigning the vehicle identification data to the unique identifier.

In one embodiment, the system further comprises a 2D illumination source provided and oriented to allow illumination of a 2D detection zone in the 3D detection zone; a source driver for driving the 2D illumination source to emit pulses; a synchronization module for synchronizing the source driver and the driver to allow capture of the images while the 2D detection zone is illuminated.

According to another broad aspect of the present invention, there is provided a method for tracking and characterizing a plurality of vehicles simultaneously in a traffic control environment, comprising: providing a 3D optical emitter; providing a 3D optical receiver with a wide and deep field of view; driving the 3D optical emitter into emitting short light pulses; receiving a reflection/backscatter of the emitted light, thereby acquiring an individual digital full-waveform LIDAR trace for each detection channel of the 3D optical receiver; using the individual digital full-waveform LIDAR trace and the emitted light waveform, detecting a presence of a plurality of vehicles, a position of at least part of each vehicle and a time at which the position is detected; assigning a unique identifier to each vehicle; repeating the steps of driving, receiving, acquiring and detecting, at a predetermined frequency; tracking and recording an updated position of each vehicle and an updated time at which the updated position is detected.

Throughout this specification, the term "object" is intended to include a moving object and a stationary object. For example, it can be a vehicle, an environmental particle, a person, a pedestrian, a passenger, an animal, a gas, a liquid, a particle such as dust, a pavement, a wall, a post, a sidewalk, a ground surface, a tree, etc.

Throughout this specification, the term "vehicle" is intended to include any movable means of transportation for cargo, humans and animals, not necessarily restricted to ground transportation, including wheeled and unwheeled vehicles, such as, for example, a truck, a bus, a boat, a subway car, a train wagon, an aerial tramway car, a ski lift, a plane, a car, a motorcycle, a tricycle, a bicycle, a Segway™, a carriage, a wheelbarrow, a stroller, etc.

Throughout this specification, the term "environmental particle" is intended to include any particle detectable in the air or on the ground and which can be caused by an environmental, chemical or natural phenomenon or by human intervention. It includes fog, water, rain, liquid, dust, dirt, vapor, snow, smoke, gas, smog, pollution, black ice, hail, etc.

Throughout this specification, the term "red light" is intended to mean a traffic light (traffic signal, traffic lamp or signal light) which is currently signaling users of a road, at a road intersection, that they do not have the right of way into the intersection and that they should stop before entering the intersection. Another color and/or symbol could be used to signal the same information to the user depending on the jurisdiction.

Throughout this specification, the term "green light" is intended to mean a traffic light (traffic signal, traffic lamp or signal light) which is currently signaling users of a road, at a road intersection, that they have the right of way into the intersection and that they should enter the intersection if it is safe to do so. Another color and/or symbol could be used to signal the same information to the user depending on the jurisdiction.

BRIEF DESCRIPTION OF THE DRAWINGS

The accompanying drawings, which are included to provide a better understanding of the main aspects of the system and method and are incorporated in and constitute a part of this specification, illustrate different example embodiments. The accompanying drawings are not intended to be drawn to scale. In the drawings:

FIG. 13 includes FIGS. 13A, 13B, 13C, 13D, 13E and 13F, in which

FIG. 14 includes FIGS. 14A, 14B, 14C, 14D, 14E and 14F, in which

FIG. 32 includes FIGS. 32A, 32B, 32C and 32D in which

FIG. 33 includes FIGS. 33A, 33B and 33C in which

FIG. 34 includes FIGS. 34A, 34B, 34C and 34D in which

DETAILED DESCRIPTION

Description of the Multipurpose Traffic Detection System

Reference will now be made in detail to example embodiments. The system and method may however, be embodied in many different forms and should not be construed as limited to the example embodiments set forth in the following description.

Figure 1:
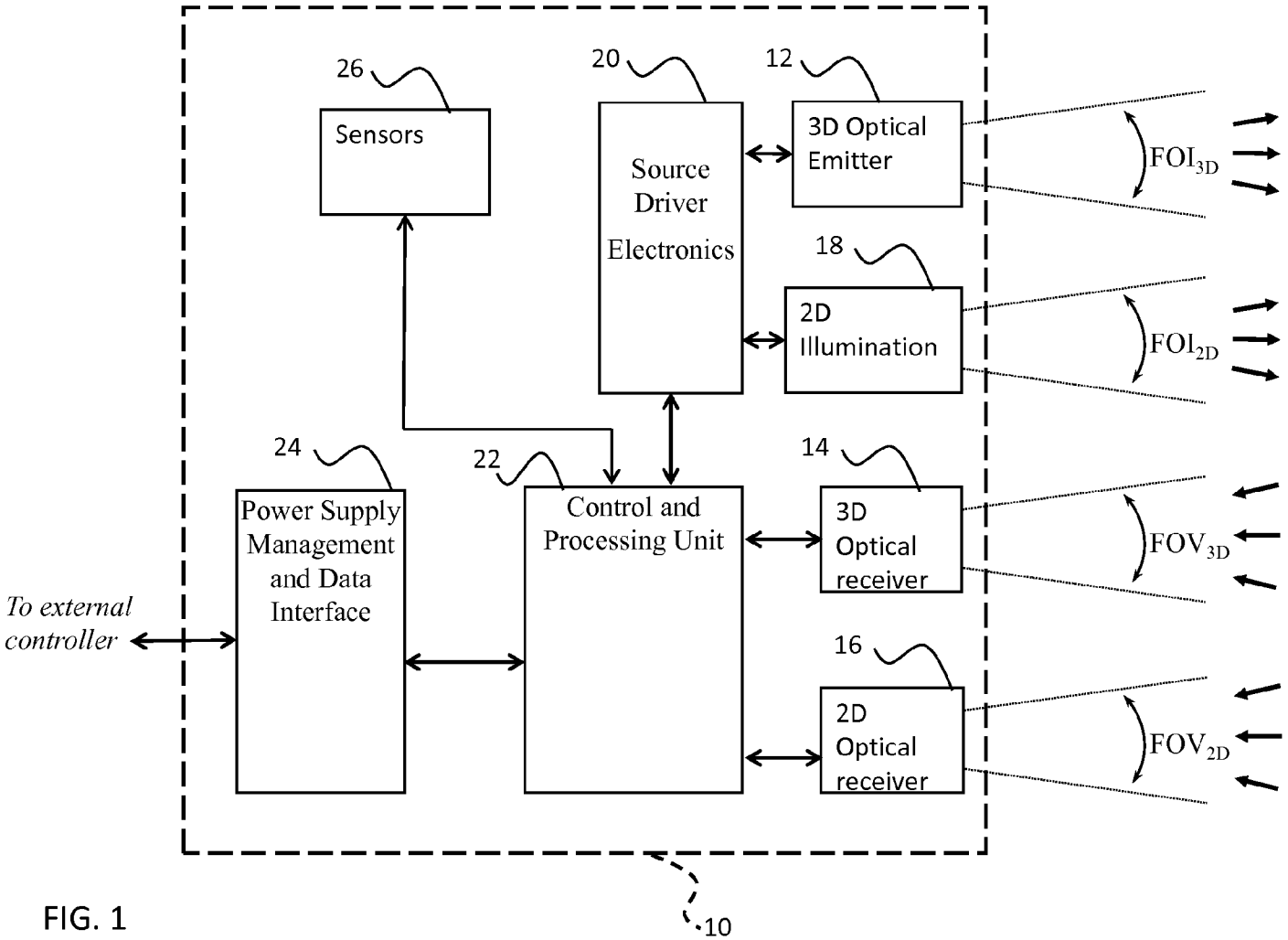
FIG. 1 is a functional bloc diagram of an example of the multipurpose traffic detection system showing its main components and the way they are interconnected.

The functionalities of the various components integrated in an example multipurpose traffic detection system 10 can be better understood by referring to the functional block diagram shown in FIG. 1. The 3D Optical Emitter 12 (3DOE) emits short pulses of light, for example of a length less than 50 ns, within a predetermined zone. In the example embodiment, the 3DOE 12 is an IR LED illumination source determining a Field-of-Illumination $FOI_{3D}$ covering the 3D detection zone $FOV_{3D}$. The optical source of the 3DOE can also be based on Laser technology. The horizontal angles of the $FOI_{3D}$ and $FOV_{3D}$ are wide enough to cover at least one lane. For example, a system with a horizontal FOI/FOV of 35° would be able to cover 3 lanes, each lane having a width of 3.5 m, when installed at 15 m from the side of the detection zone.

Figure 2:
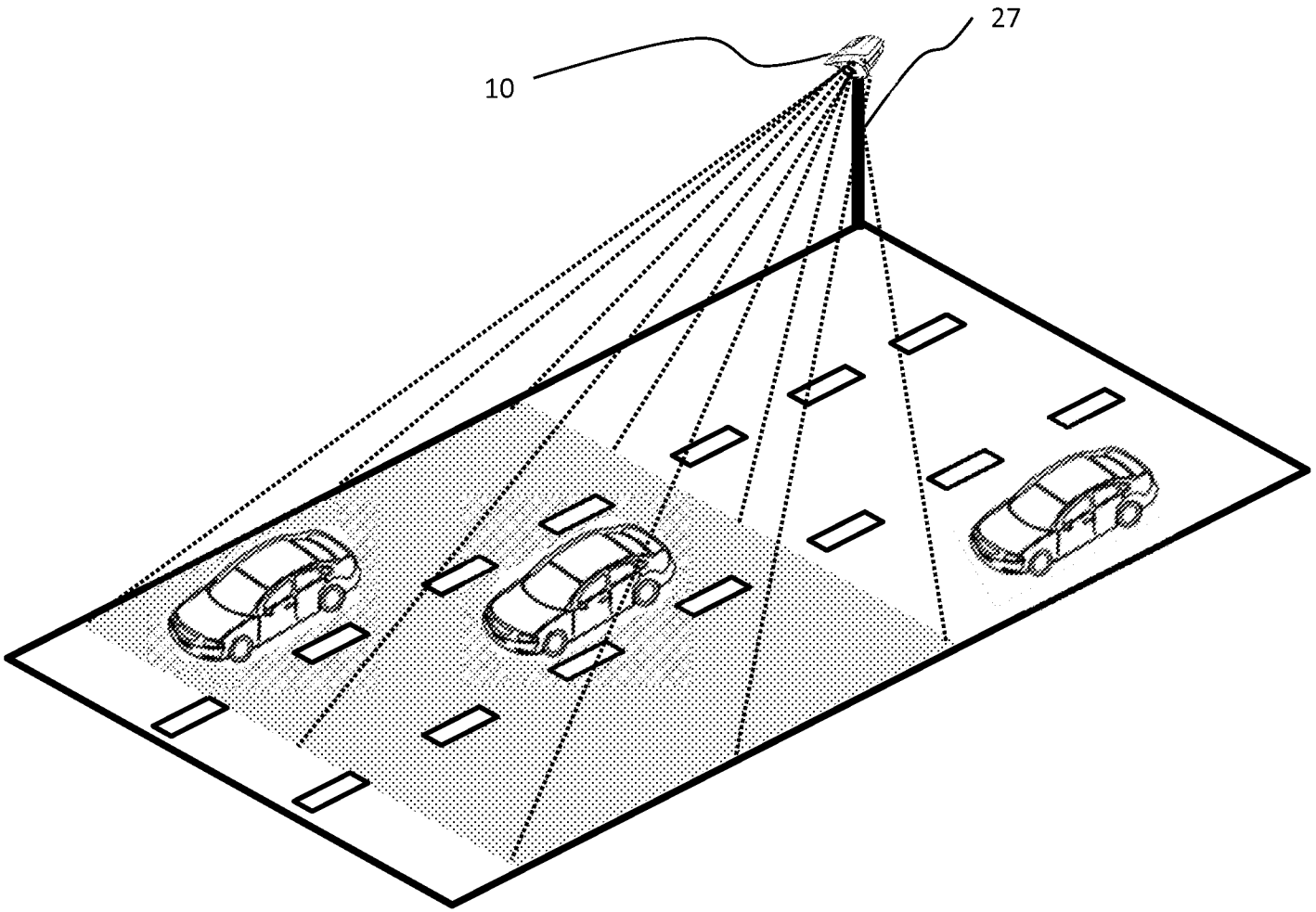
FIG. 2 is an example installation of the traffic detection system on the side of a 3-lane highway.

An example mounting configuration of the multipurpose traffic detection system 10 can be seen in FIG. 2, which depicts a schematic view of a roadway with 3 lanes being shown. The traffic detection system 10 is shown mounted on a pole 27 with an orientation towards traffic direction. Pole 27 can be a new dedicated road infrastructure for the sensor installation or an already existing road infrastructure streetlight assembly or other types of infrastructures like gantries or buildings. This exemplary roadway comprises three adjacent traffic lanes for vehicles. The traffic detection system is intended to detect any type of objects that may be present within the predetermined 3D detection zone.

Figure 3:
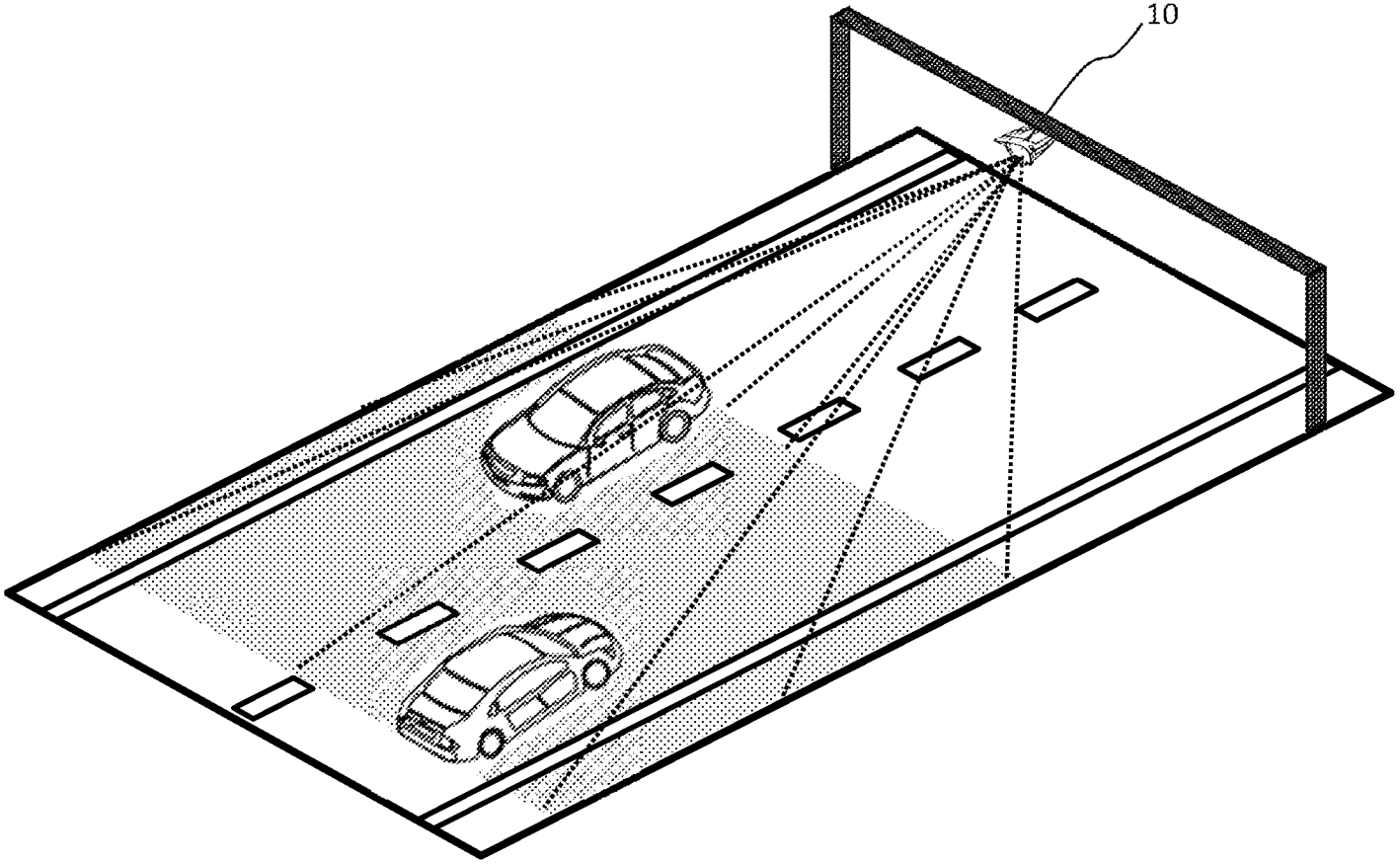
FIG. 3 shows an example installation of the traffic detection system on a gantry.

The mounting height of the traffic detection system 10 is, for example, between 1 to 10 m with a lateral distance from the nearest traffic lane of, for example, between 1 to 5 m. In FIG. 2, three vehicles travelling in the same direction on the traffic lanes enter in the 3D detection zone. When the vehicles reach the 3D detection zone, the multipurpose traffic detection system is used for detection, localization, classification and measurement of the speed of the vehicles through the zone. The system can also be installed over the roadway on a gantry as shown in FIG. 3. The system can also detect vehicles traveling in opposite directions.

Figure 4:
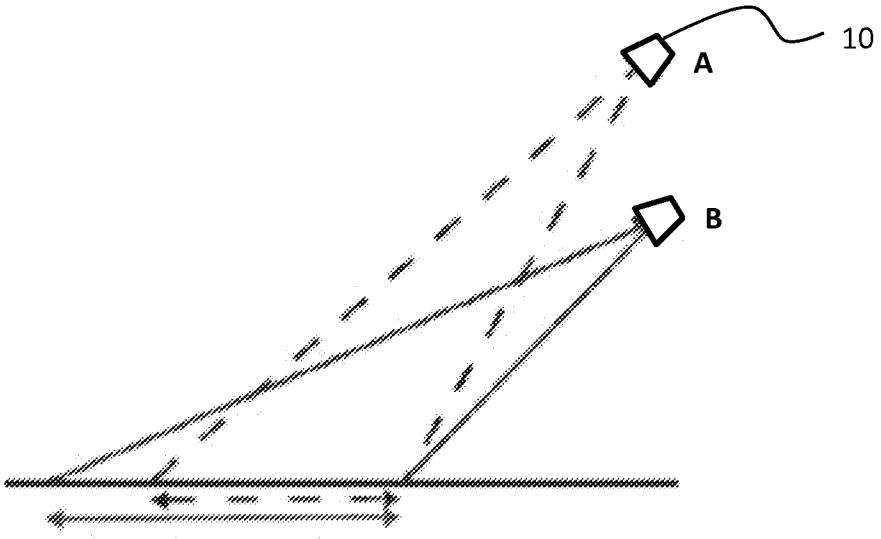
FIG. 4 shows the impact on the depth of a detection zone of the height of installation of the system.

The detection system can be installed at different heights, from the ground up to 10 m. FIG. 4 shows the impact of the installation height on the longitudinal length of the detection zone. With a fixed starting distance of detection, the longitudinal length of the detection zone will be shorter with a system installed higher. The vertical angles of the $FOI_{3D}$ and $FOV_{3D}$ have to be wide enough to detect and track vehicles over several meters, for example over at least 8 m. For example, a system installed at a height of 3.5 m with a vertical FOI/FOV of 6° and a detection zone beginning at 15 m from the detector will have a detection zone depth of approximately 13 m.

Referring back to FIG. 1, part of the light diffusively reflected by the vehicles and objects in the $FOI_{3D}$ is directed towards the collecting aperture of the 3D Optical Receiver 14 (3DOR) for its 3D optical detection and subsequent conversion into digital waveforms. To be detected, an object should appear within the $FOV_{3D}$ of the 3DOR, which is defined by its optics as well as by the dimensions of its optically sensitive device. The 3DOR is composed of one or more optical lenses, multichannel optical detectors, for example photodiode arrays, an analog frontend and analog-to-digital converter. Usually, the channels are digitalized in parallel and the system implements a full-waveform signal processing of the signal waveforms generated by the plurality of optical detection channels.

The multipurpose traffic detection system provides a good accuracy in terms of lateral resolution and is less dependent on the angle of installation than Radar technology.

In FIG. 1, the 2D Optical Receiver 16 (2DOR) is at least one image sensor, for example a CMOS or CCD (including front end and AD conversion) which provides images of the portion of the roadway area that encompasses or overlaps at least a section of the $FOI_{3D}$ of the 3DOE and the $FOV_{3D}$ of the 3DOR. The 2DOR will be used during installation, to transmit video data, and, for some applications, to help identify vehicles using, for example, Automatic License Plate Recognition (ALPR) techniques. For applications requiring vehicle identification, the requirement for the image sensor in terms of resolution is high. An external image sensor or camera can also be used for this function. The average size of a character on a license plate is between 50 mm to 80 mm. It takes at least 16 pixels per character (height) to obtain good results with an Optical Character Recognition (OCR) processing within an ALPR system. Based on that criterion, the identification of a license plate of a vehicle circulating on a 3-lane highway (3.5 m×3 m) requires an image sensor with a least 5 Mpixels (2.5K×2K). High resolution image sensors are expensive. One way to reduce the cost is to use at least two image sensors each with lower resolution and to combine the information coming from both images using image stitching techniques. The synchronization, acquisition and image processing are performed by Control and processing unit 22.

The 2D Illumination 18 (2DI) is an optical source emitting infrared and/or visible light. The 2DI can be embedded in the sensor enclosure or can be an external module. In one example embodiment, the optical source of 2DI 18 is at least one LED. LEDs are efficient and the FOI can be optimized with optical collimators and diffusers. The pulse width of 2DOE can be in the range of 10 μs to 10 ms and can be synchronized with the image capture (integration time) of the image sensor(s). For vehicles traveling at high speed, the integration time can be in the range of 500 μs and less. A vehicle moving at 150 km/h will travel 21 cm in 500 μs.

A single set of infrared LEDs can be used for both the 3DOE and 2DOE. Very high-short intensity pulses (for example <50 ns) for 3D detection can be mixed with longer pulses (for example 10 μs to 10 ms) for 2D sensor(s). The LEDs can have a wavelength between 800 and 1000 μm, for example.

Source Driver Electronics (SDE) 20 uses dedicated electronics for driving the 3DOE 12 with current pulses having peak amplitude and duration suitable for effective implementation of the optical ranging principle on which the operation of the multipurpose traffic detection system is based. A pulsed voltage trig signal forwarded by the Control and Processing Unit 22 commands the generation of each current pulse by the drive electronics. The operating conditions and performance requirements for the multipurpose traffic detection system call for the emission of short optical pulses having a duration in the range of 5 to 50 ns, for example. Depending on the repetition rate at which the pulses are emitted, the duty cycle (relative ON time) of the optical emission can be as low as 0.1%. In order to get the desired peak optical output power for the radiated light pulses, any lowering of the peak drive level of the LEDs or Laser can be compensated by mounting additional LED or Laser sources in the 3DOE 12 and appropriately duplicating their drive electronics.

The SDE 20 can also drive 2D illumination with current pulses having peak amplitude and duration suitable for effective illumination of the scene for the 2DOR 16. A pulsed voltage trig signal forwarded by the Control and Processing Unit 22 commands the generation of each current pulse by the drive electronics. The operating conditions and performance requirements for the multipurpose traffic detection system call for the emission of 2D optical pulses having a duration in the range of 10 μs to 10 ms, for example.

The SDE 20 can control and receive information from 3DOE and 2D illumination about the intensity of the current pulse, LEDs/Laser temperature, etc.

All of these modules exchange data and receive commands and signals from the control and processing unit 22. The Control and processing unit 22 can include digital logic (for example by a Field-Programmable Gated Array (FPGA)) for pre-processing the 3D raw data and for the synchronization and control, a memory, and a processing unit. The processing unit can be a digital signal processing (DSP) unit, a microcontroller or an embarked personal computer (PC) board as will be readily understood.

The primary objective of the 3D full-waveform processing is to detect, within a prescribed minimum detection probability, the presence of vehicles in a lane that is mapped to a number of adjacent detection channels. Because of the usual optical reflection characteristics of the vehicle bodies and of various constraints that limit the performances of the modules implemented in a traffic detection system, the optical return signals captured by the 3DOR are optimized by acquisition shifting techniques, accumulation techniques and filtering and correlation technique to enhance the signal-to-noise ratio (SNR) of the useful signal echoes and detect a digital replica of the pulse emitted by the 3DPE. The properties (peak amplitude, shape, time/distance location) of the useful features present in the waveforms should remain ideally unchanged during the time period required to capture a complete set of waveforms that will be averaged. This condition may cause issues when attempting to detect vehicles that move rapidly, this situation leading to signal echoes that drift more or less appreciably from waveform to waveform. The detrimental impacts of this situation can be alleviated by designing the traffic detection system so that it radiates light pulses at a high repetition rate (e.g., in the tens to hundreds of kHz range). Such high repetition rates will enable the capture of a very large number of waveforms during a time interval sufficiently short to keep the optical echoes associated to a moving vehicle stationary. Detection information on each channel can then be upgraded, for example between a few tens to a few hundred times per second. For example, with a multipurpose traffic detection system using a frame rate at 200 Hz, a car at 250 km/h would have moved forward by 35 cm between each frame.

The Control and processing unit 22 has numerous functions in the operation of the multipurpose traffic detection system, one of these being the calibration of the system. This calibration process can be done by connecting a remote computer to the Control and processing unit 22 and communicating using a Power management and data Interface 24.

During normal operation of the multipurpose traffic detection system, Power management and data Interface 24 receives information from the external controller (including parameters like a speed limit) and also allows the Control and processing unit 22 to send data. The data sent can be related to the detection of each vehicle and can comprise information such as an accurate timestamp of the detection time synchronized with the external controller, a unique identifier (ID number), the lane and position of the vehicle (lateral and longitudinal) for each trigger event, the position of the vehicle in an image, video streaming, identification by ALPR, speed, classification, weather information, etc., to the external controller.

In another embodiment, part of the process and algorithms can be integrated in the external controller which receives the raw data from the Control and processing unit by the Power Management and Interface.

Several types of interfaces can be used to communicate with the external controller: Ethernet, RS-485, wireless link, etc. Power over Ethernet (PoE) may be used for its simplicity of connection including power, data and distance (up to 100 m).

The data information can also be stored in memory and retrieved later.

Power management and data Interface 24 can also send electrical trigger signals to synchronize events like the detection of the front or the rear of a vehicle at a specific position to other devices like an external camera, an external illuminator or other interface and external controller.

The Power Supply Management and Data Interface 24 can also be useful in transmitting images and videos to an external system or network to allow a remote operator to monitor different traffic events (ex.: accident, congestion, etc.). Video compression (ex.: MPEG) can be done by a processor to limit the bandwidth required for the video transmission.

The four optical modules can be rigidly secured to the attachment surface of an actuator assembly (not shown). The modules can then pivot in a controlled manner about up to three orthogonal axes to allow a precise alignment of their common line of sight after the multipurpose traffic detection unit has been installed in place and aligned in a coarse manner. The fine-tuning of the orientation of the line of sight is, for example, performed remotely by an operator via a computer device connected to the multipurpose traffic detection system, for example through PoE or a wireless data link.

FIG. 1 also shows a functional bloc labeled Sensors 26 for measuring different parameters. The internal temperature in the system enclosure can be monitored with a temperature sensor which can be used to control a heating/cooling device, not shown. The current orientation of the system can be monitored using an inclinometer/compass assembly. Such information may be useful for timely detection of the line of sight that may become misaligned. The sensor suite may also include an accelerometer for monitoring in real-time the vibration level to which the system is submitted to as well as a global positioning system (GPS) unit for real-time tracking of the location of the system and/or for having access to a real-time clock.

Figure 5:
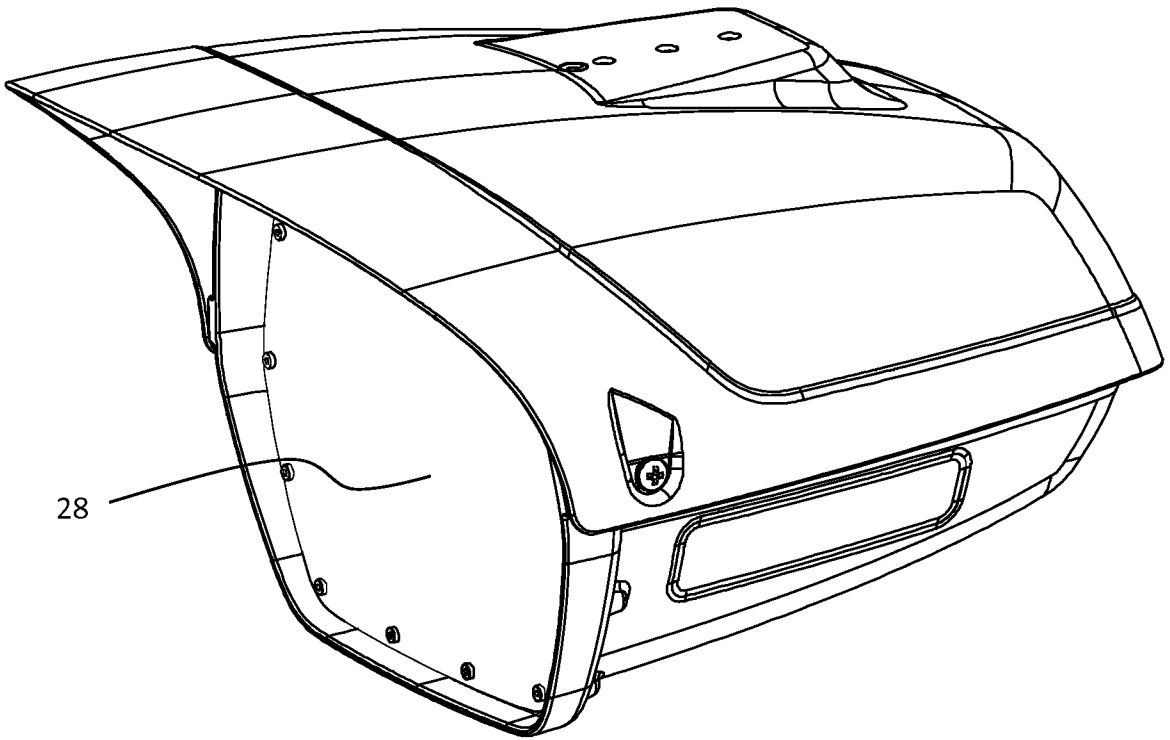
FIG. 5 shows an example casing for the multipurpose traffic detector.

FIG. 5 shows an example casing with a window 28 for the multipurpose traffic detection system. The casing can house a more or less complete suite of monitoring instruments, each of them forwarding its output data signals to the control and processing unit for further processing or relay. In other configurations of the casing, lateral sections can be integrated to protect the window from the road dust.

Use, Set-Up, Basic Principles, Features and Applications

Figure 6:
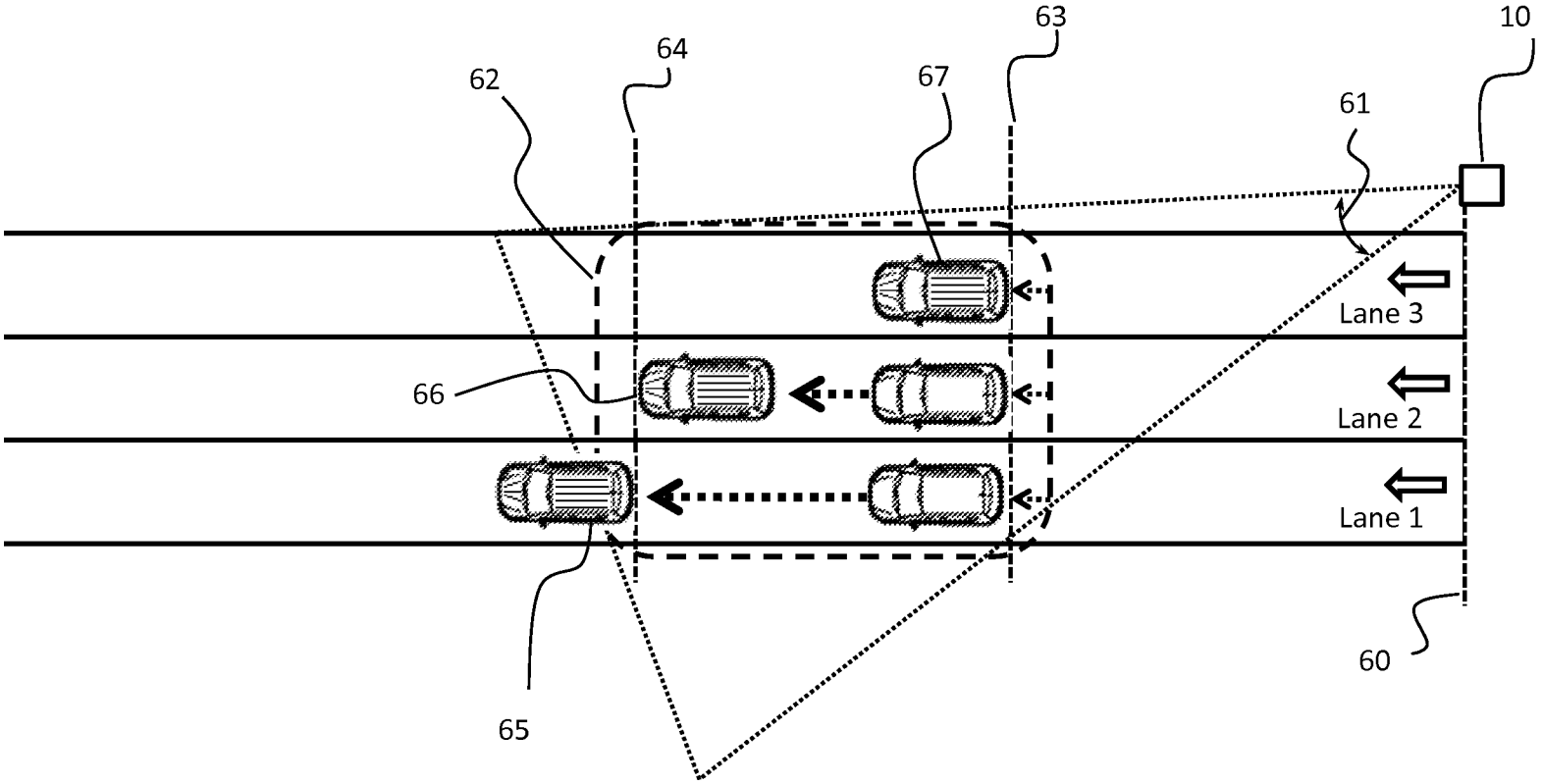
FIG. 6 shows a top view of the detection zone on a 3-lane highway.

FIG. 6 shows a top view of an installation of the multipurpose detection system. The multichannel 3DOR detects vehicles present within a two-dimensional detection zone, the active nature of the traffic detection system provides an optical ranging capability that enables measurement of the instantaneous distances of the detected vehicles from the system. This optical ranging capability is implemented via the emission of light in the form of very brief pulses along with the recordal of the time it takes to the pulses to travel from the system to the vehicle and then to return to the system. Those skilled in the art will readily recognize that the optical ranging is performed via the so-called time-of-flight (TOF) principle, of widespread use in optical rangefinder devices. However, most optical rangefinders rely on analog peak detection of the light pulse signal reflected from a remote object followed by its comparison with a predetermined amplitude threshold level. In the present system, the traffic detection system numerically processes the signal waveform acquired for a certain period of time after the emission of a light pulse. The traffic detection system can therefore be categorized as a full-waveform LIDAR (Light Detection and Ranging) instrument. The system analyses the detection and distance measurements on several 3D channels and is able to track several vehicles at the same time in the detection zone. The system can determine the lane position, the distance from the detector and the speed, for each individual vehicle.

As can be seen in FIG. 6, the detection system 10 is installed at a reference line 60, has a wide FOV 61, has a large and wide detection and tracking zone 62 covering several lanes and several meters of depth and detects several vehicles on several lanes in a roadway.

The detection system can be configured with two trigger positions. The first trigger 63 is set in the first section of the detection zone and the second trigger 64 is set a few meters away, in this case close to the end of the detection zone. In this example, a first vehicle 65 was detected when entering the detection zone on lane 1, was tracked, was detected at the position of the first trigger 63, was continuously tracked and is now being detected at the position of the second trigger 64. Information about its lane position, speed, etc., can be constantly sent or can be sent only when the vehicle reaches pre-established trigger positions. A second vehicle 66 was detected when entering the detection zone on lane 2, was tracked, was detected at the position of the first trigger 63, and is continuously tracked until it reaches the position of the second trigger 64. A third vehicle 67 was detected when entering the detection zone on lane 3, was tracked, is detected at the position of the first trigger 63, will continue to be tracked and will reach the position of the second trigger 64.

The detection system has the capability to identify, track and send information about multiple vehicles at the same time and its multiple receiver channels greatly reduce the cosine effect for speed measurement.

The system can capture several snapshots using the 2DOR at different levels of illumination using the 2DOE. Information about each vehicle (date/hour of an event, speed, position, photographs and identification based on Automatic License Plate Recognition) can be sent to the external controller. This is useful for applications like traffic management (for vehicle detection, volume, occupancy, speed measurement and classification), speed enforcement, red light enforcement, etc. The system can be permanently or temporarily installed. It can even be a mobile system, for example a system installed on a vehicle.

Figure 7:
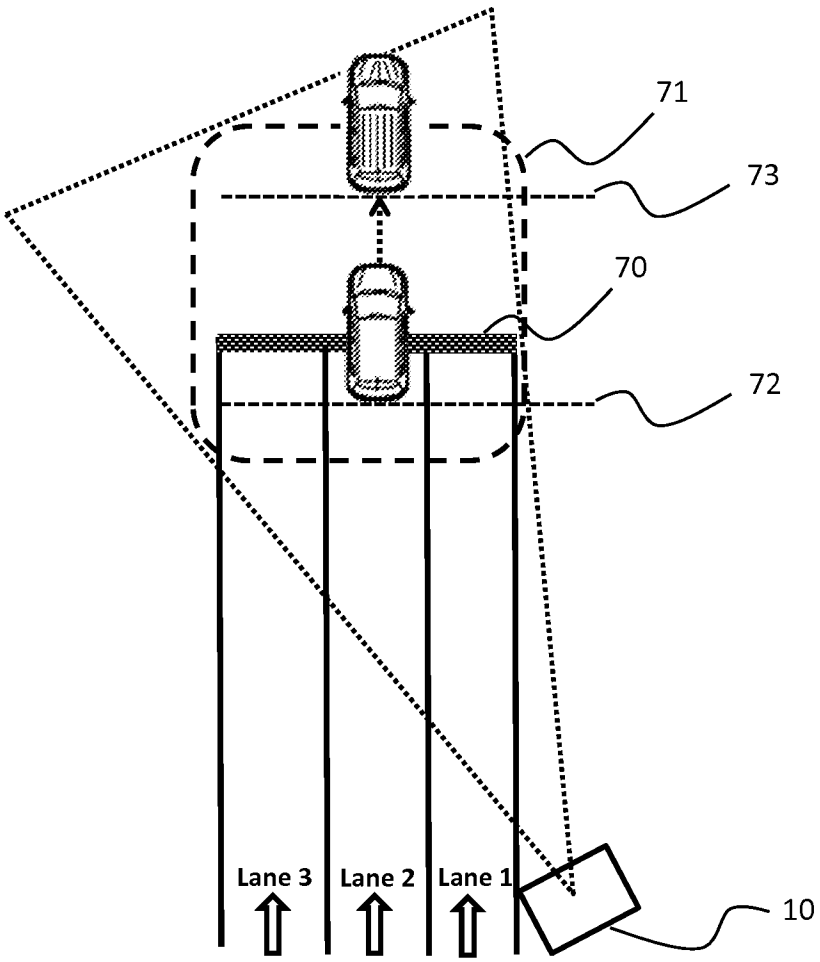
FIG. 7 shows a top view of the detection zone in a red light enforcement application.

An example of configuration for Red Light Enforcement is shown in FIG. 7. The capability of the system to detect, track, determine the lane position, measure the speed and take photographs (or videos) for each vehicle several meters away from the stop bar has great value for this application. Red light enforcement applications require the detection of a vehicle entering an intersection when the traffic light is at the red state and the automatic capture of several images of the vehicle as it crosses the stop bar and runs the red light. The detection system needs to provide evidence that a violation occurred without ambiguity.

For most applications, detection rates should be high, for example of the order of 95% and more (without occlusion), and false detections should occur only very rarely. Images and information about the date and time of the infraction will allow the authorities to transmit a traffic infraction ticket. Identification of the driver and/or owner of the vehicle is generally made by the authorities using the information from the license plate of the vehicle. Since speed information is available, speed infractions can also be detected when the traffic light is green. As will be readily understood, the detection system can also be used for other detection applications such as stop line crossing and railway crossing.

In FIG. 7, the detection system is installed on the side of the road at an example distance of 15 to 25 m from the stop bar 70. The detection and tracking zone 71 starts few meters before the stop bar 70 and covers several meters after the bar, allowing a large and deep zone for detecting and tracking any vehicle on several lanes (three lanes in that example), at different speeds (from 0 to more than 100 km/h), at a rate of up to ten vehicles detected per second. The detection system can take several images of a red light infraction including, for example, when the vehicle is located at a predetermined trigger distance, for example at first trigger 72 when the back of the vehicle is close to the stop bar 70 and at second trigger 73 when the back of the vehicle is few meters away from the stop bar 70. Optional detection of the lane position is useful when a right turn on red is allowed at the intersection.

Speed enforcement is another application that requires providing evidence that a speed violation occurred. The correlation between the detected speed and the actual vehicle guilty of the infraction needs to be trustworthy. Sufficient information should be provided to allow identification of the vehicle owner, using information from the license plate, for example. The capability of the detection system to measure the speed of several vehicles at the same time with high accuracy and to make the association between each speed measurement and the specific identified vehicle is useful for traffic enforcement applications. This is made possible by, among others, the multiple FOV, the robustness and accuracy of the sensor and the capability to store several images of a violation.

The detector can store speed limit data (which can be different for each lane) and determine the occurrence of the infraction.

The detector can be mounted on a permanent installation or can also be temporary, provided on a movable tripod for example. Detectors can also be installed at the entry and at the exit of a point-to-point enforcement system allowing the measurement of the average speed of a vehicle by determining the amount of time it takes to displace the vehicle between the two points. The position of each vehicle and its classification are also information that the detector can transmit to the external controller. In some countries, lane restriction can be determined for specific vehicles, such as trucks for example.

Moreover, the multipurpose traffic detection system can fulfill more than one application at a time. For example, the system used for traffic management near an intersection can also be used for red light enforcement at that intersection.

Methods for Alignment and Detection of the Traffic Detection System

A method that allows a rapid and simple alignment step for the multipurpose traffic detection system after it has been set in place is provided.

Figure 8A:
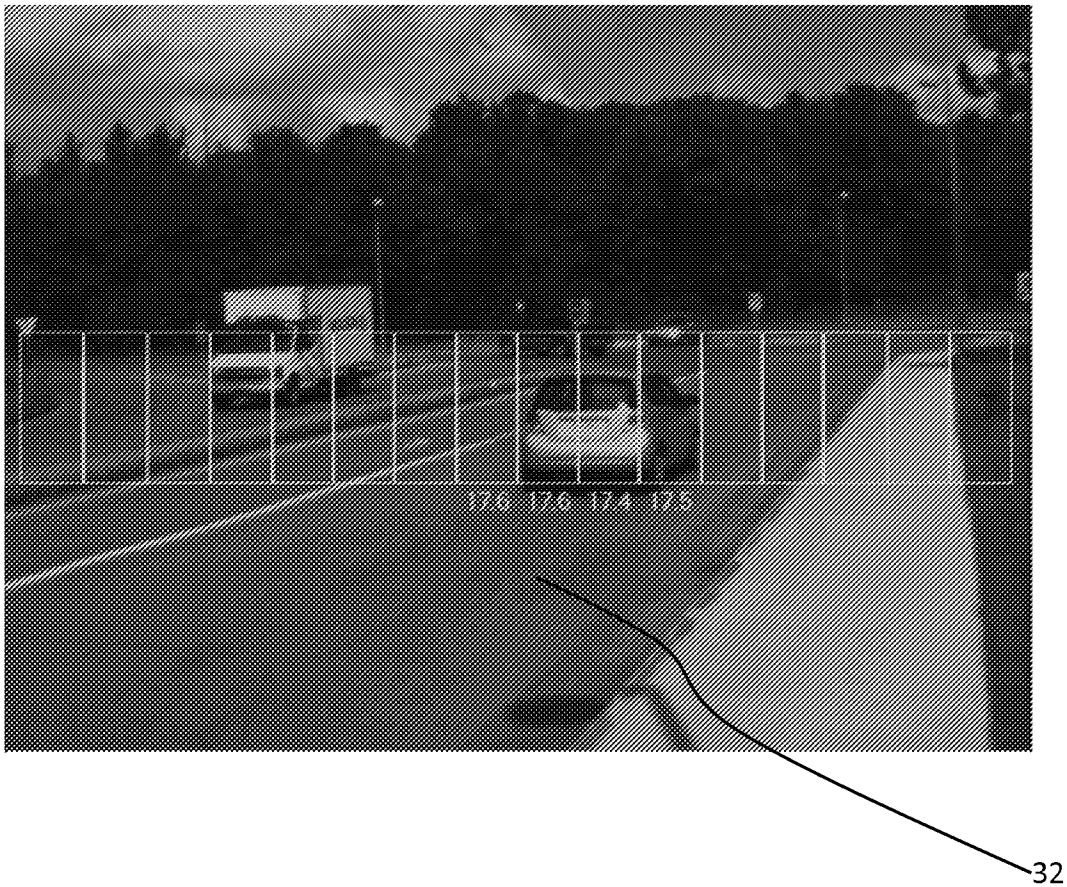
FIGS. 8A and 8B are photographs showing example snapshots taken by the image sensor with the overlay of the 3D sensor displaying a vehicle in the detected zone with distance measurements.
Figure 8B:
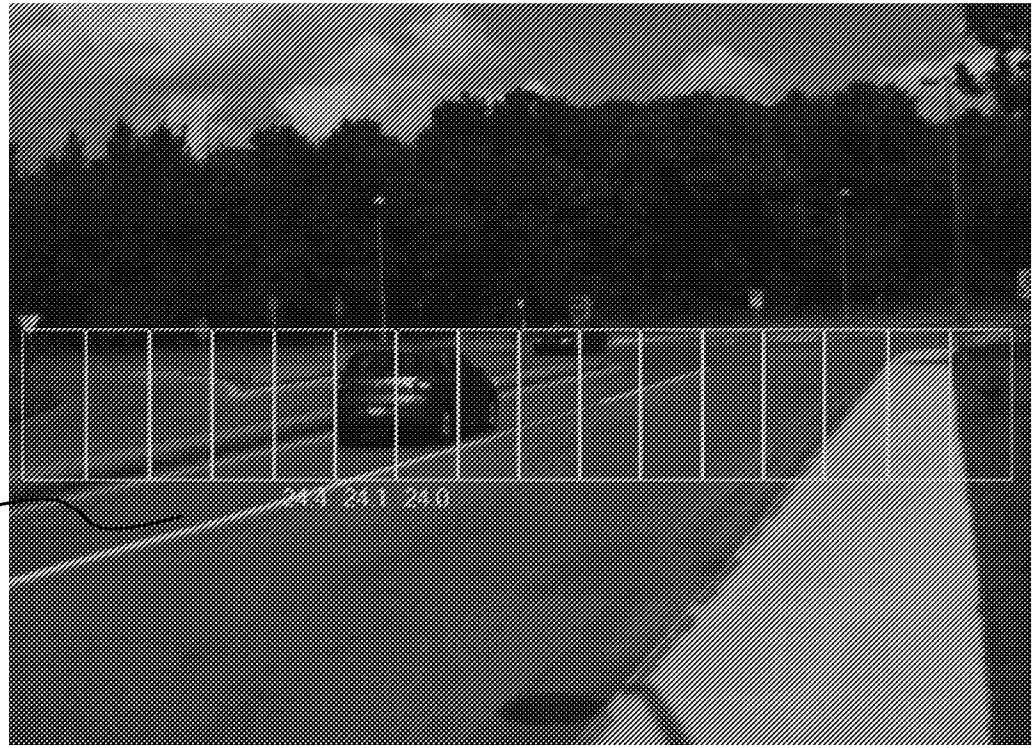

FIGS. 8A and B show examples images of a roadway captured by the 2DOR during the day. The image is overlaid with the perimeters of a set of 16 contiguous detection zones of the 3DOR. In FIG. 8A, a vehicle present in the first lane 32 would be detected by several adjacent channels at a respective detected distance between 17.4 m to 17.6 m (see the numbers at the bottom of the overlay). In FIG. 8B, the vehicle is detected in the second lane 34 between 24.0 m to 24.4 m. Note that the overall detection zone is wide enough to cover more than two lanes. In some situations depending on the context of the installation, some objects or even the ground can be detected by the system but can be filtered out and not be considered as an object of interest.

Figure 9B:
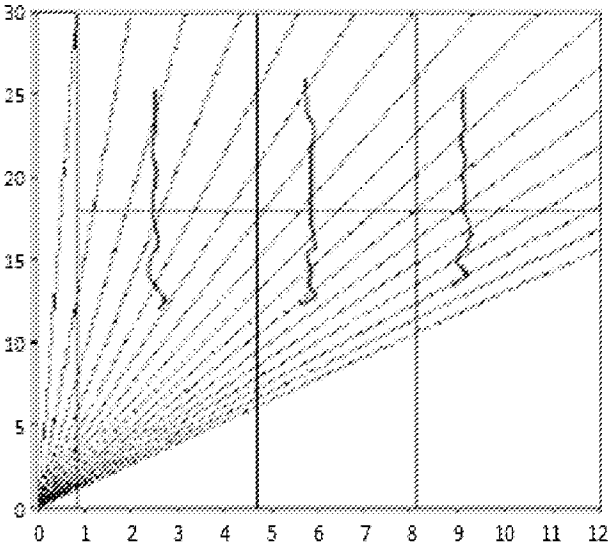
FIG. 9A is a photograph showing an example snapshot taken by the image sensor with the overlay of the 3D sensor at an intersection for red light enforcement application and FIG. 9B is a graph of data acquired by the detection system showing the range of detection of vehicles on 3 lanes in Cartesian coordinates.
Figure 9A:
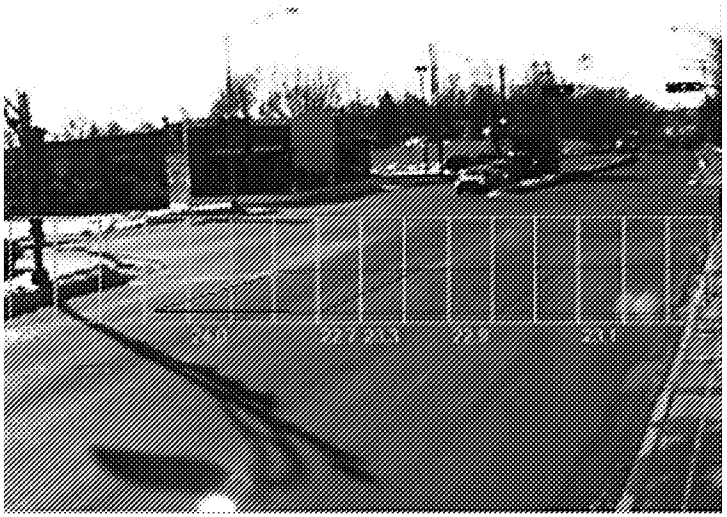

FIG. 9A shows a photograph of a red light enforcement application installation. Some channels detect echo back signals from the ground (see the numbers at the bottom of the overlay) but the system is able to discriminate them as static objects. FIG. 9B is a graph showing a top view of the 3D 16 field of view of a road with 3 lanes. In a Cartesian coordinate system, if the detection system represents the origin, the horizontal direction from left to right is taken as the positive x-axis and represents the width of the 3 lanes in meters, and the vertical direction from bottom to top is taken as the positive y-axis and represents the longitudinal distance from the sensor. To facilitation installation, the installation software will indicate the beginning and the end of the detection zone by showing a detection line as seen in FIG. 9B.

Figure 10:
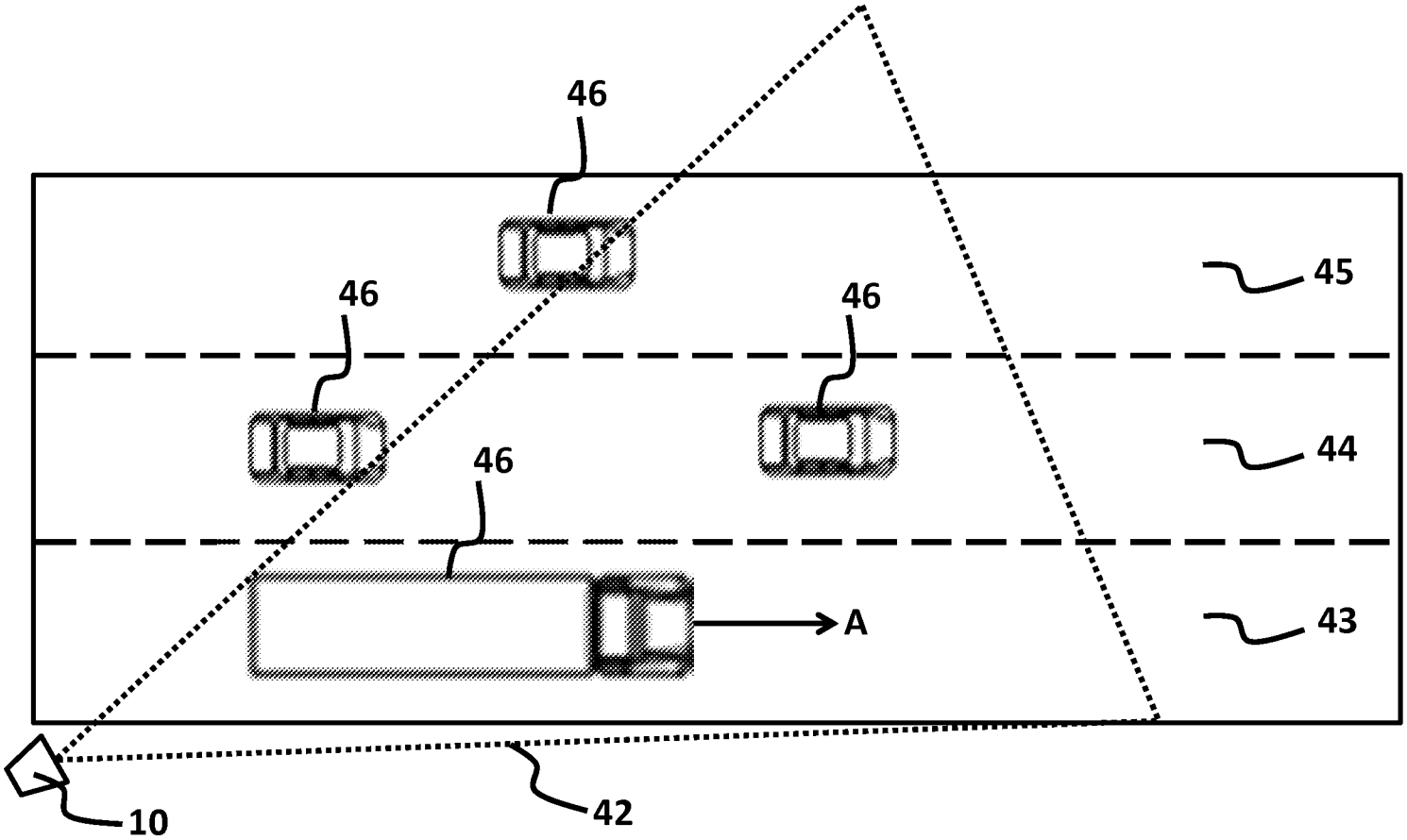
FIG. 10 is a top view of an example road side installation with the tracking system being installed next to a one-directional three-lane highway and for which the detection zone is apparent and covers, at least partly, each of the lanes, all vehicles traveling in the same direction.

Multi-Vehicle Simultaneous Detection and Tracking for Position Determination, Speed Measurement and Classification FIG. 10 shows a top view of an example road facility equipped with a multipurpose traffic detection system 10. The system 10 mounted on an existing traffic infrastructure is used to illuminate a detection zone 42. In this example, the mounting height is between 1 and 10 m with a distance from the road between 1 and 5 m. In FIG. 10, the vehicles 46 travel in lanes 43, 44 and 45 in a direction indicated by arrow A through the detection system illumination zone 42. The detection system 10 is used for detecting information of the rear surface of vehicles 46 coming in the illumination zone 42. The detection system 10 is based on IR LED illumination source with a multiple field-of-view detector.

Figure 11:
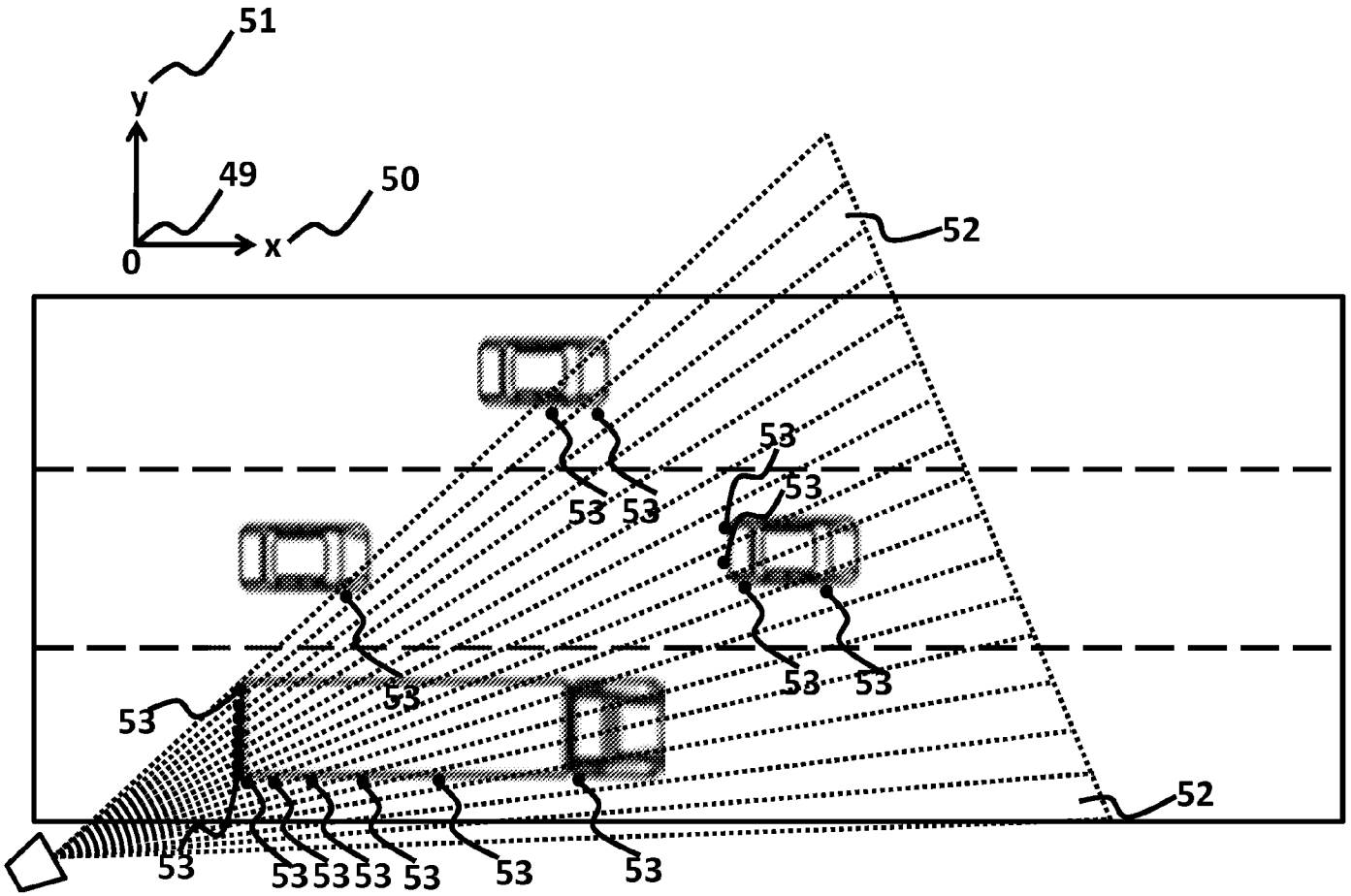
FIG. 11 is a top view of the example installation of FIG. 10 on which four vehicle detections are visible in some of the 16 separate channels with simultaneous acquisition capability.

In FIG. 11, the 16 fields of view 52 covering a section of the road are shown. In a Cartesian coordinate system, if the detection system represents the origin 49, the horizontal direction from left to right is taken as the positive x-axis 50, and the vertical direction from bottom to top is taken as the positive y-axis 51 then, each 3D detection 53 gives the distance between an object and the sensor.

Figure 12:
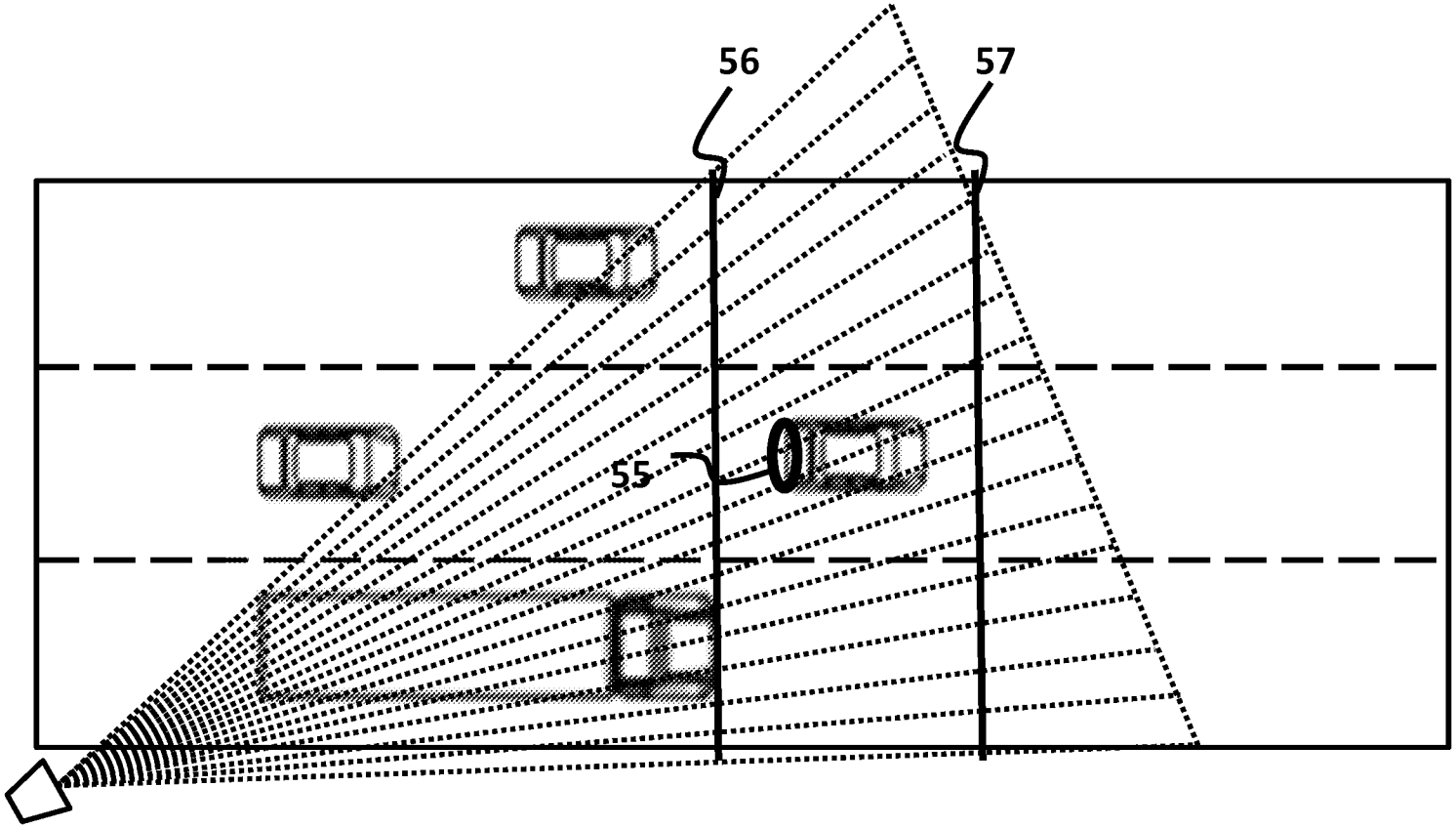
FIG. 12 is a top view of the example installation of FIG. 10 on which a detection is visible between two trigger lines.
Figure 13B:
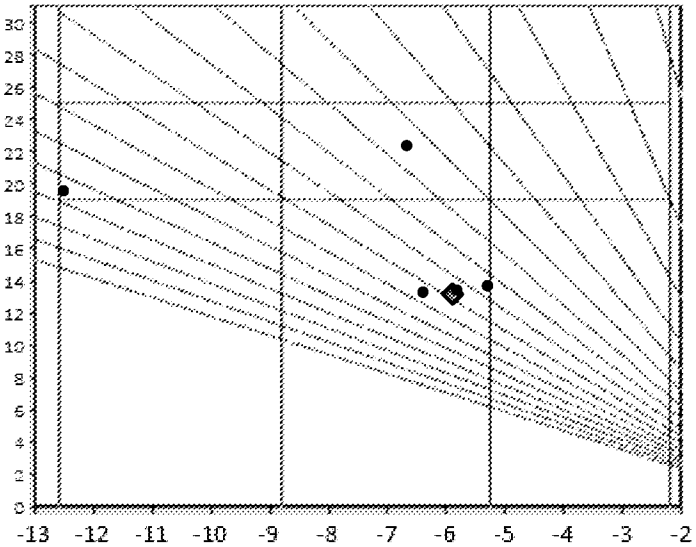
FIGS. 13B, 13D, and 13F show a graph of data acquired by the detection system for each corresponding frame.
Figure 13A:
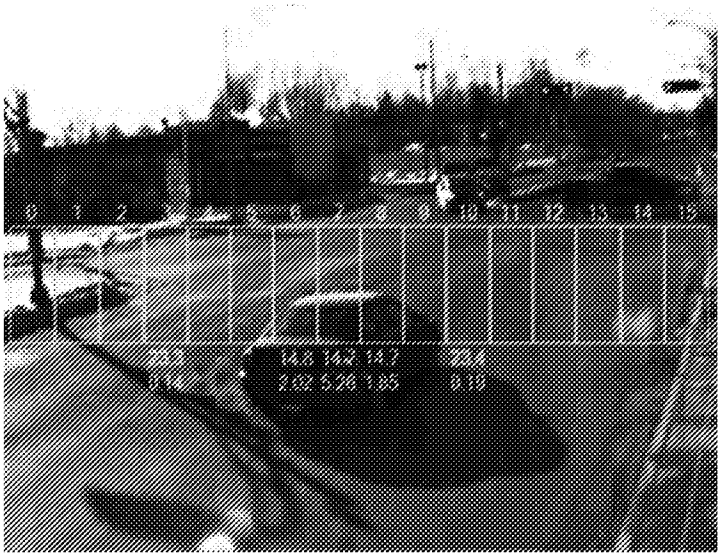
FIGS. 13A, 13C and 13E are photographs which show a few frames of vehicle tracking when vehicles arrive at an intersection with a red light
Figure 13D:
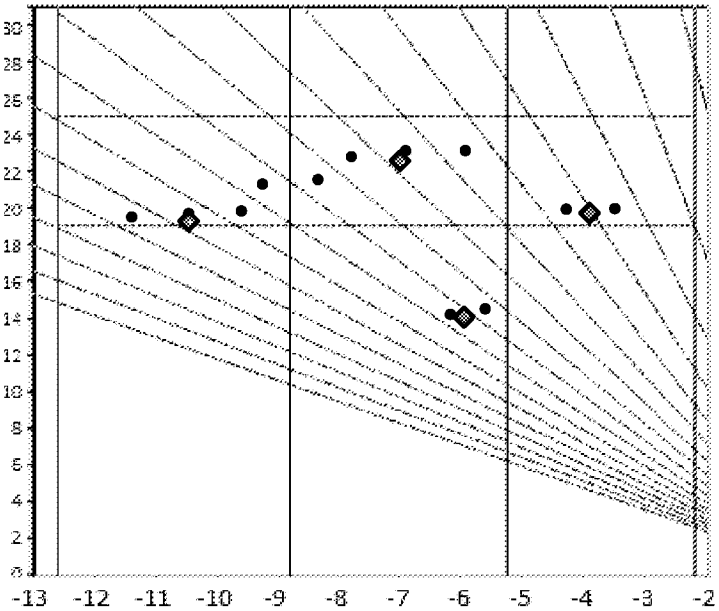
Figure 13C:
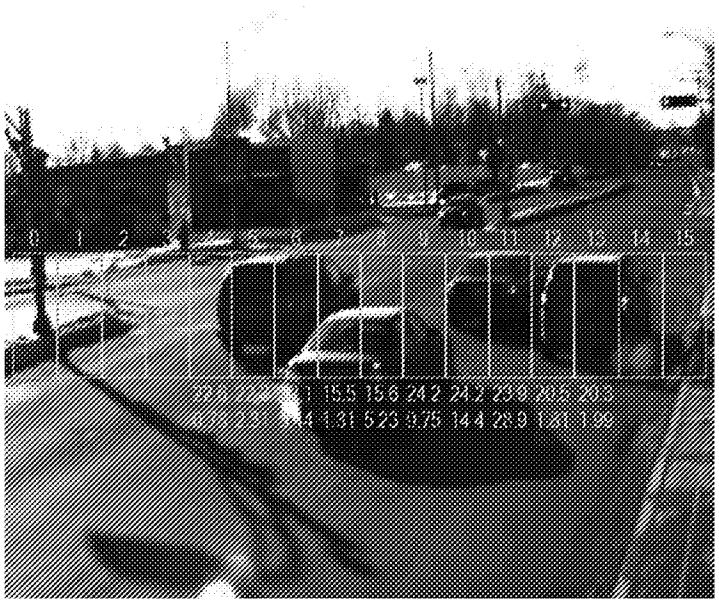
Figure 13F:
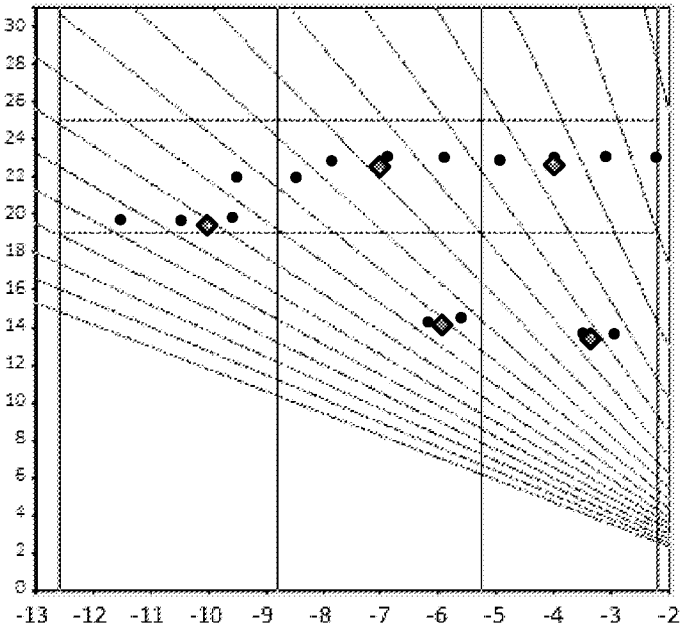
Figure 13E:
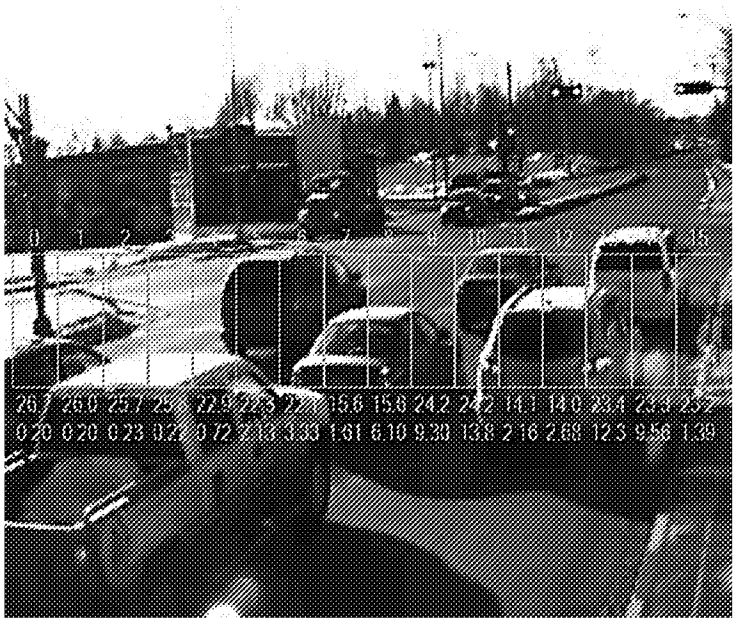
Figure 14B:
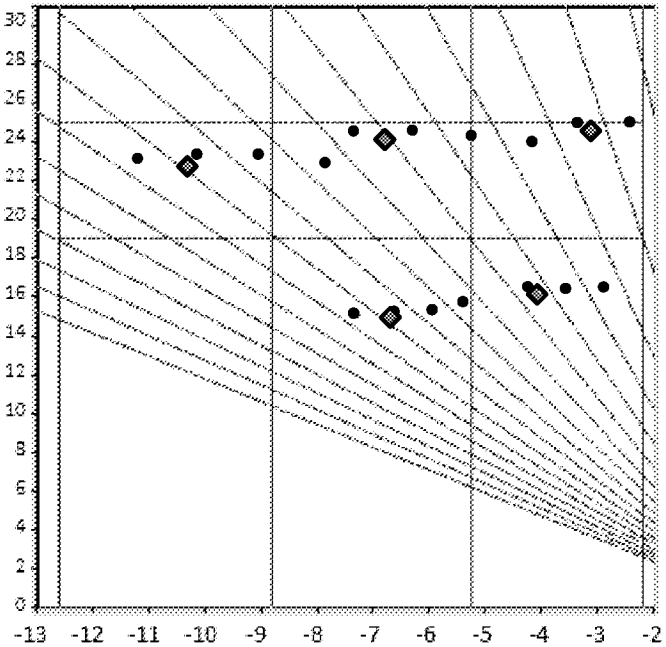
FIGS. 14B, 14D, and 14F show a graph of data acquired by the detection system for each corresponding frame.
Figure 14A:
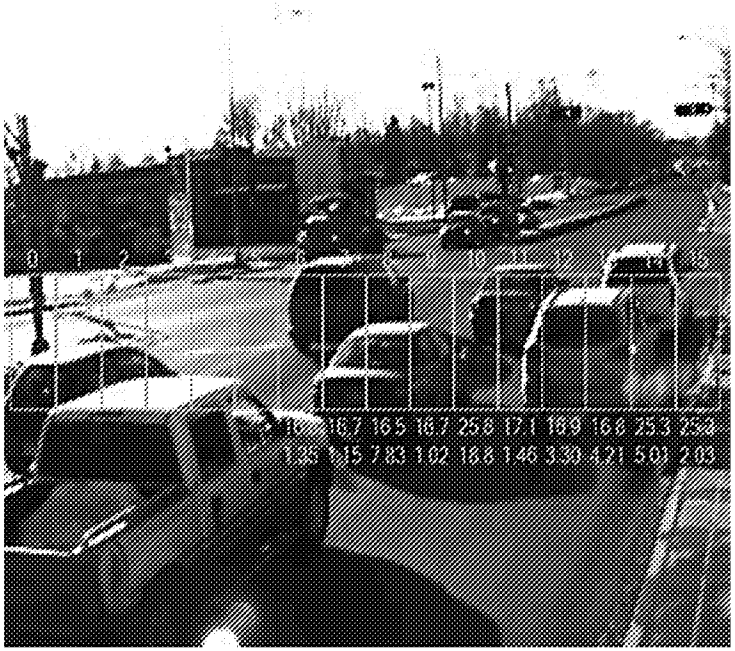
FIGS. 14A, 14C and 14E are photographs which show a few frames of vehicle tracking when vehicles depart the intersection of FIG. 13 at the green light
Figure 14D:
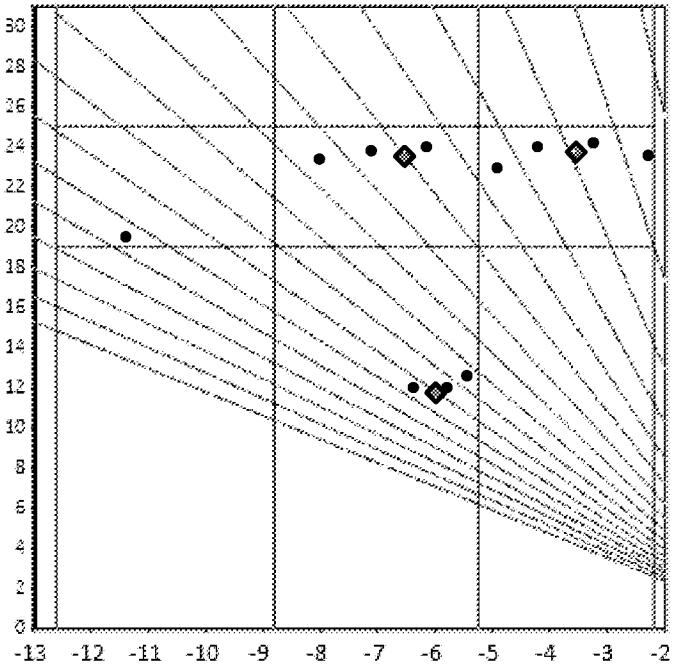
Figure 14C:
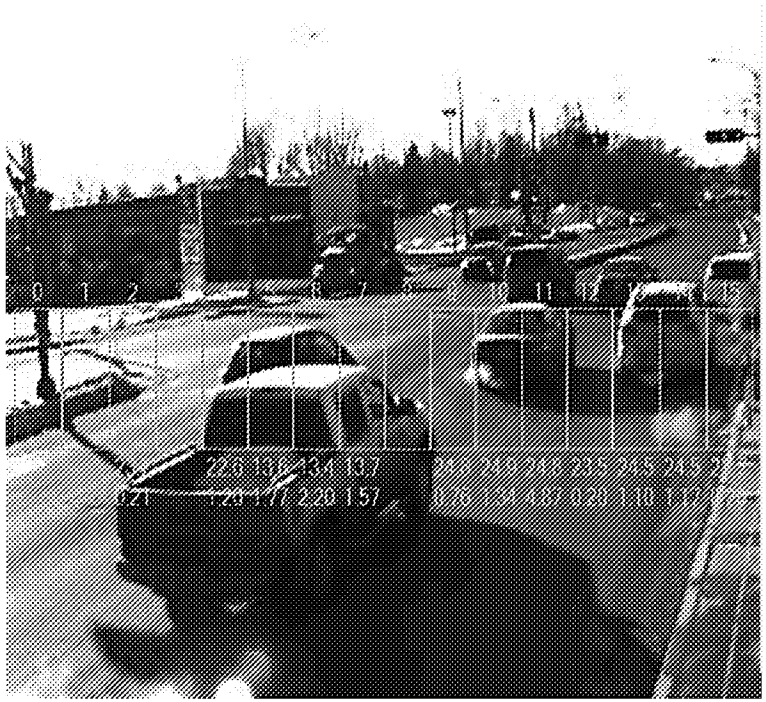
Figure 14F:
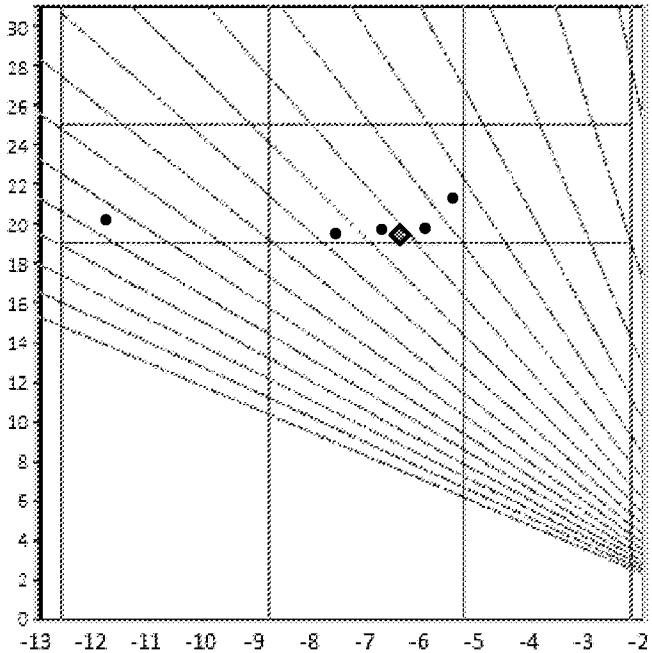
Figure 14E:
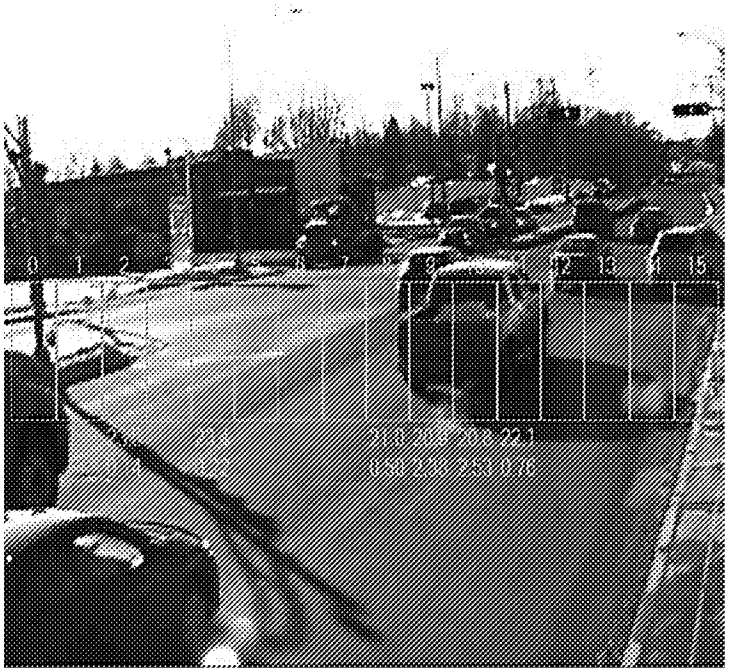

FIG. 12 shows the system in an example configuration with two trigger lines 56 and 57 located at a distance from the sensor between 10 and 50 m, for example. The two trigger lines 56 and 57 are configured by the user. Blob 55 illustrates a detectable vehicle rear. When the blob reaches the trigger line, the system returns a trigger message.

FIG. 13 and FIG. 14 show example data for vehicle tracking in the context of traffic light enforcement. Thanks to a projection of the field-of-view of the detection system on the real 2D image, the relationship between the top view (FIGS. 13B, 13D, 13F) and the scene (FIGS. 13A, 13C, 13E) is made apparent. The 3D detections are represented by dots in the top views. In this example, a small diamond in the top views shows the estimated position of the rear of each vehicle based on the 3D detections. In this example, the small diamond represents the middle of the rear of the vehicle. The distance of detection is indicated under each detection channel in the scene image. The amplitude of the detection is also indicated below the distance of detection. On the top view, thin lines define the limits of the tracking area and dotted lines define two trigger lines configured by the user. When entering this area, a new vehicle is labeled with a unique identifier. In each frame, its estimated position is shown using a small diamond. As shown, the interactions between vehicle detections are managed by the tracking algorithm allowing distinguishing vehicles located in the detection area.

Figure 15:
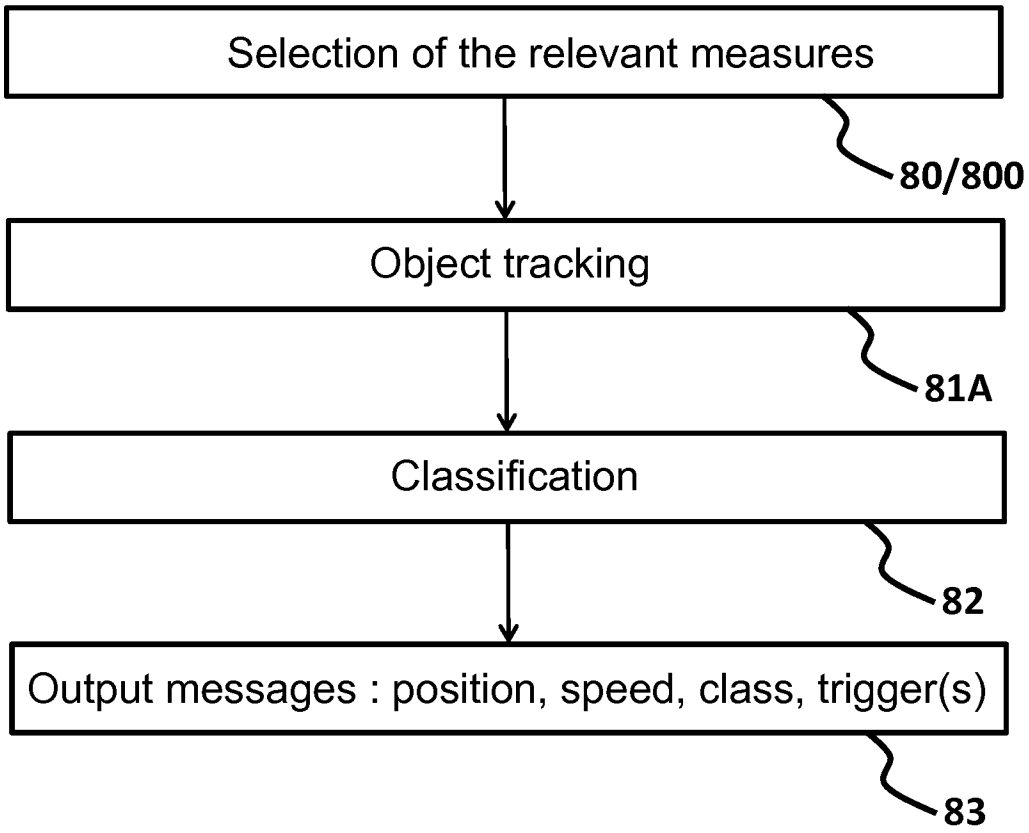
FIG. 15 is a flowchart illustrating an example method for tracking several vehicles based on a space-based tracking disjoint.

FIG. 15 shows the steps performed during the execution of an example tracking algorithm. At step 80, the tracking algorithm selects the reliable measurements located on the road. At step 81A, the generic Kalman Filter for tracking a variable number of objects is used. At step 82, a road user classification based on geometric features is computed. Finally, step 83 sends to each frame, a message with position, speed, class and trigger if necessary for the vehicles located in the detection zone.

Figure 16:
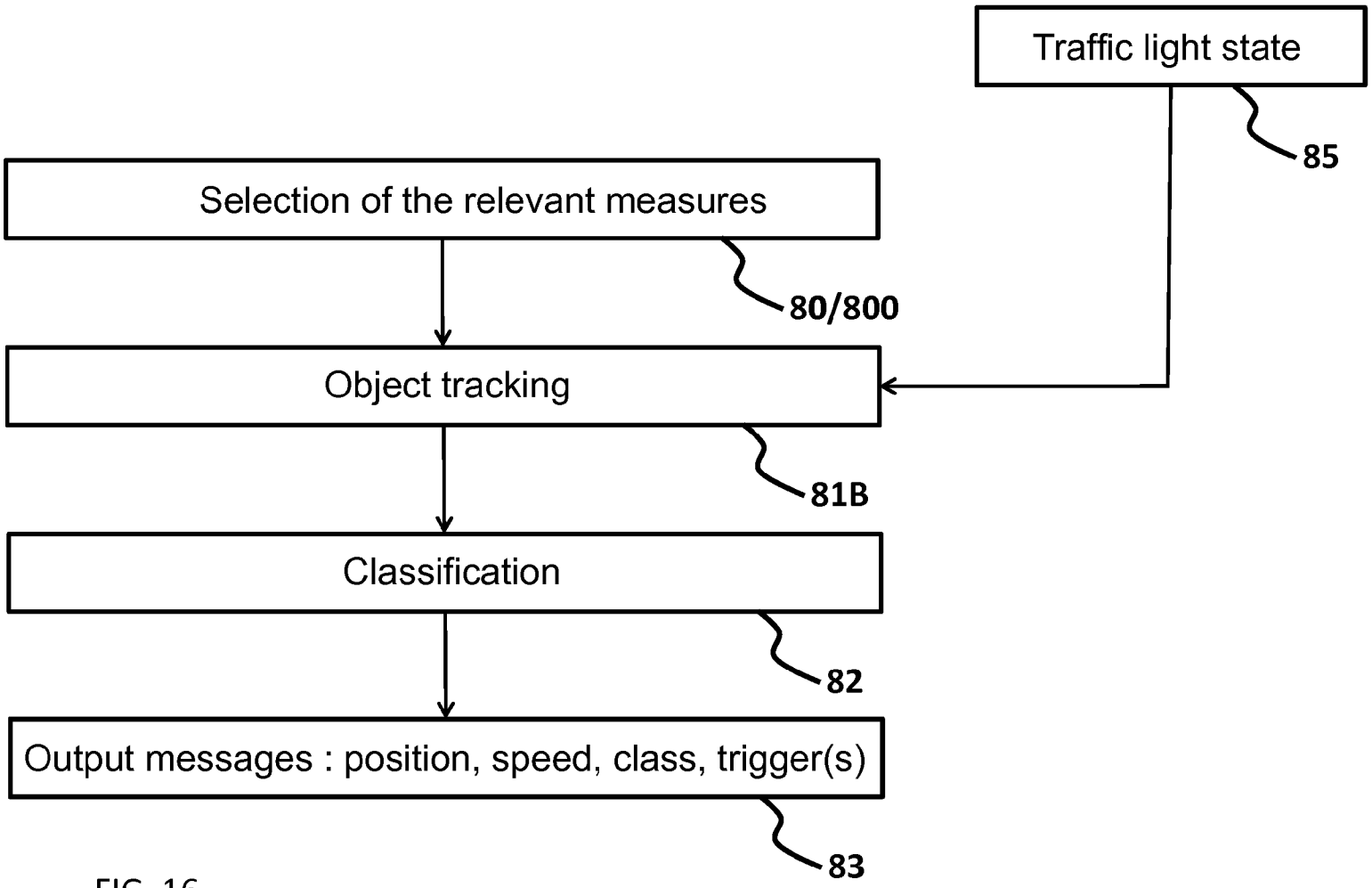
FIG. 16 is a flowchart illustrating an example method for tracking several vehicles for a red-light enforcement application, this algorithm uses a space-based tracking joint.

FIG. 16 shows the steps performed during the execution of the tracking algorithm if the traffic light state 85 is known. Steps 80/800, 82 and 83 are unchanged. However, step 81B is different because the additional information allows working in a space-based tracking joint.

Figure 17:
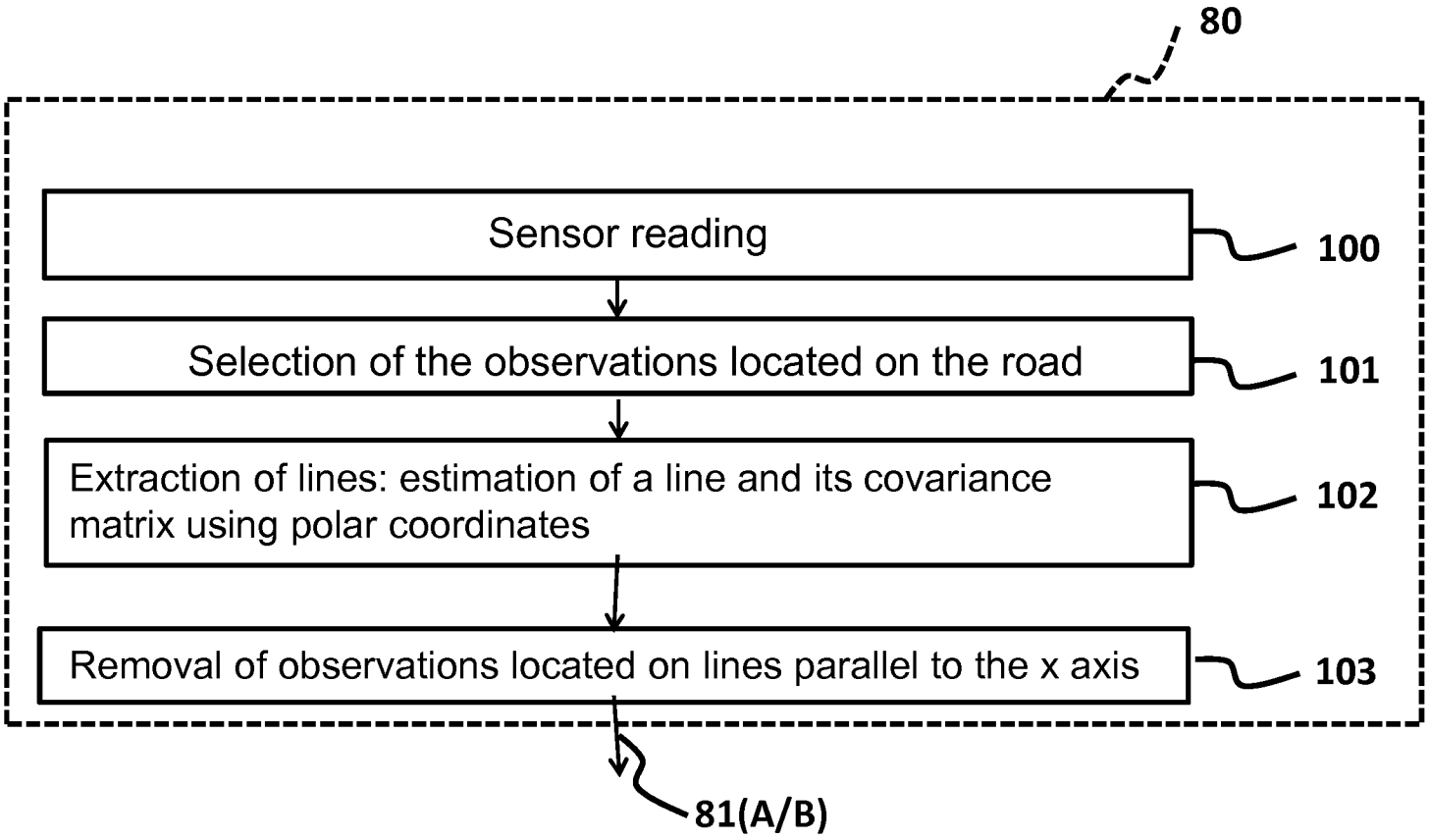
FIG. 17 is a flowchart illustrating the selection of appropriate measures among the detections.

The selection of relevant measures 80 is described in FIG. 17. At step 100 the tracking algorithm reads the available observations. At step 101, the tracking algorithm removes each detection that is not located on the road. Step 101 is followed by step 102 where the tracking algorithm recognizes lines by a feature-based approach. Step 103 eliminates the points located on lines parallel to the x-axis 50 with the aim of extracting the characteristics relating to the side(s) of vehicles and to keep only the objects having a "vehicle rear signature".

Figure 18:
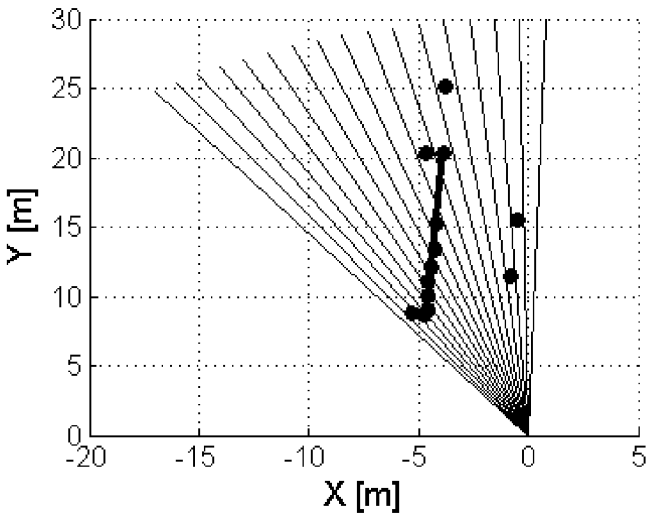
FIG. 18 shows an example segment extraction line for a long vehicle.

The estimation of a line based on the covariance matrix using polar coordinate 102 is illustrated in FIG. 18. This estimation is based on feature extraction. The strength of the feature-based approach lies in its abstraction from data type, origin and amount. In this application, line segments will be considered as a basic primitive which later serves to identify and then remove the side of vehicles. Feature extraction is divided into two sub-problems: (i) segmentation to determine which data points contribute to the line model, and (ii) fitting to give an answer as to how these points contribute.

The polar form is chosen to represent a line model:

$$x \cos \alpha + y \sin \alpha = r$$

where $-\pi<\alpha\leq\pi$ is the angle between the x axis and the normal of the line, $r\geq 0$ is the perpendicular distance of the line to the origin; (x, y) is the Cartesian coordinates of a point on the line. The covariance matrix of line parameters is:

$$\mathrm{cov}(r, \alpha) = \begin{bmatrix} \sigma_r^2 & \sigma_{r\alpha} \\ \sigma_{r\alpha} & \alpha_\alpha^2 \end{bmatrix}$$

Figure 19:
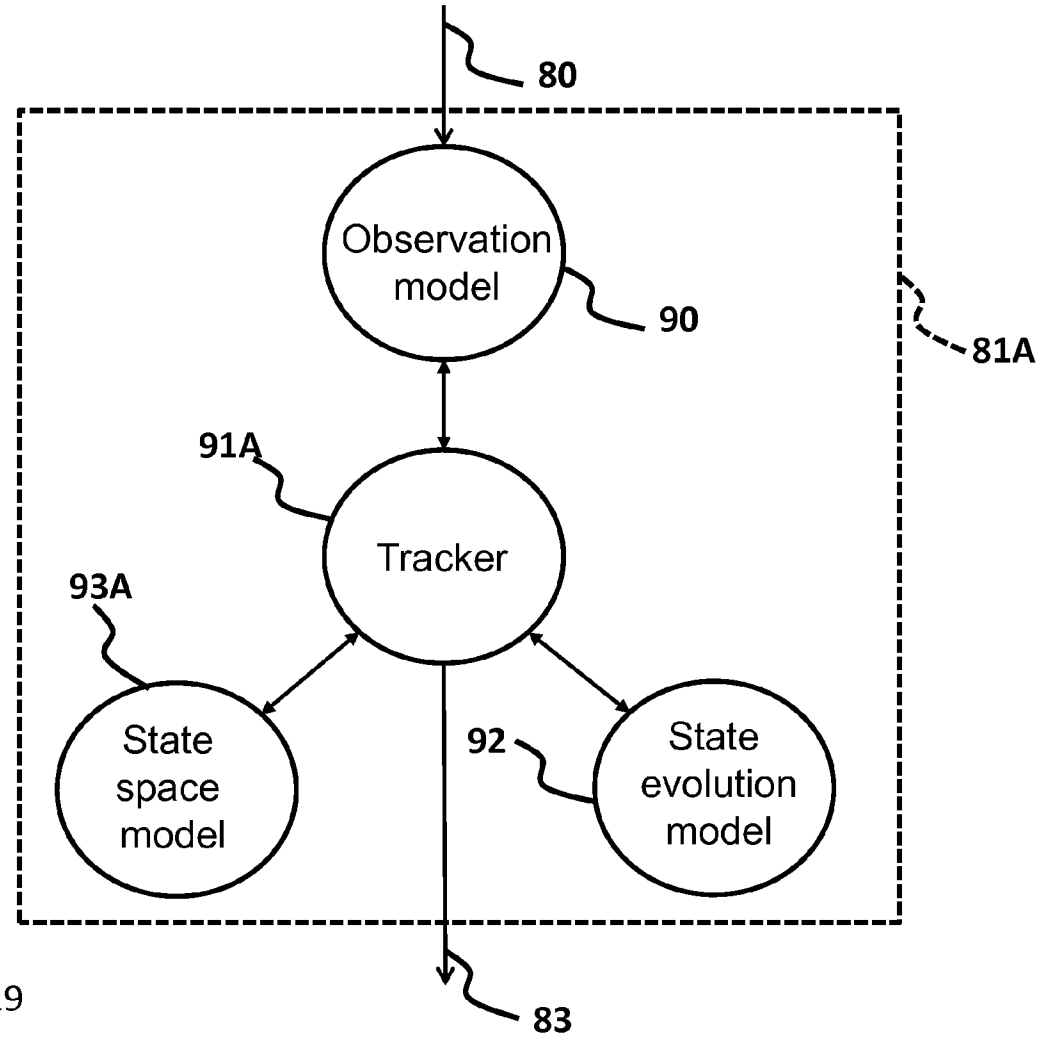
FIG. 19 is a state diagram illustrating the tracking system used without a traffic light state.
Figure 21:
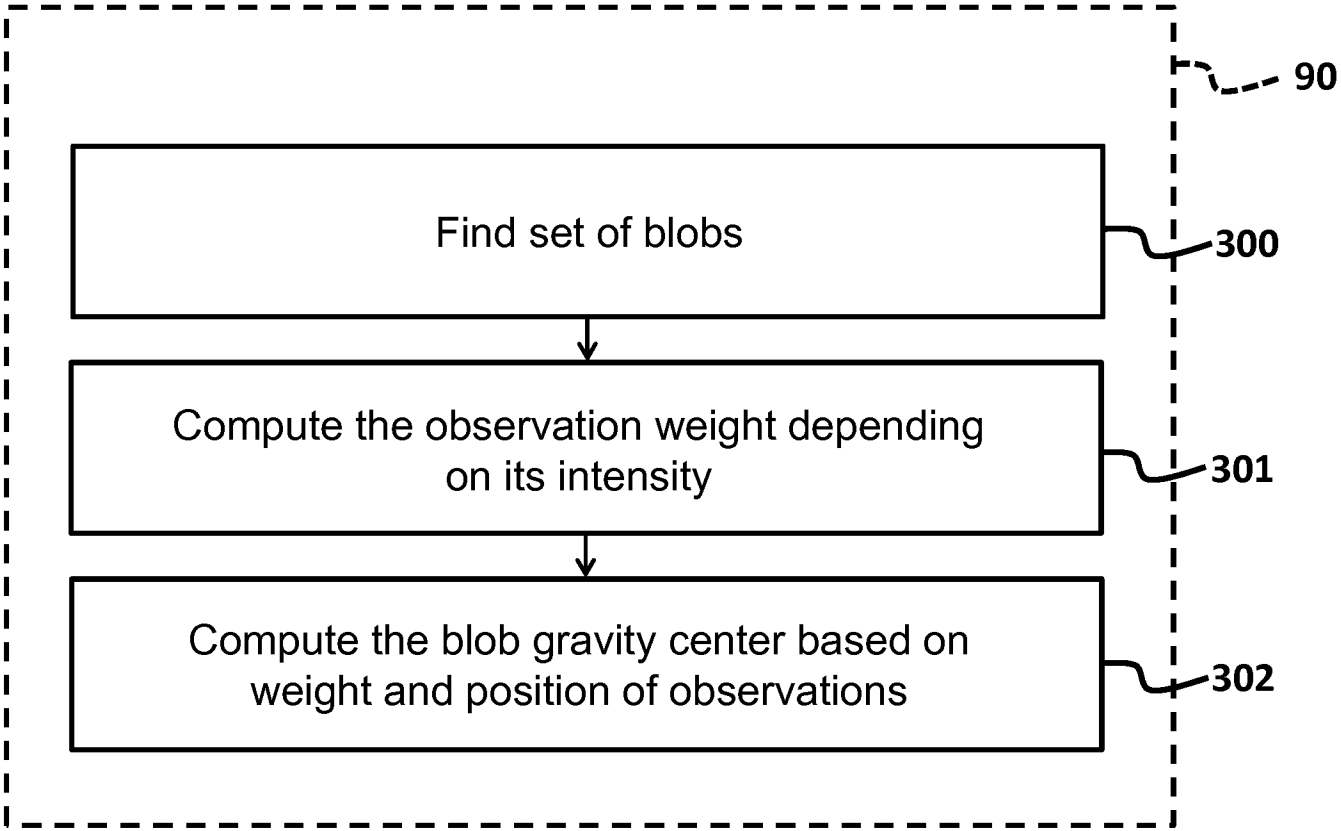
FIG. 21 is a flowchart showing example steps performed to compute the vehicle position.

FIG. 19 shows a state diagram for the 3D real-time detection multi-object tracker. The core of the tracker 91A is based on a Kalman Filter in all weather and lighting conditions. The observation model 90 is illustrated in FIG. 21 which presents an example method to compute the vehicle position by weighting each 3D observation according to its height amplitude. This method permits to improve the accuracy of the estimated position with respect to using only the x and y Cartesian positions.

Expression 301 computes the blob position as follows:

$$P_{blob}=\Sigma_{n=1}^{N}\pi^n \cdot P^n$$

where $\pi^n$ is the intensity weight for the observation n, $n\epsilon\{1, \ldots, N\}$, and N is the number of observation grouped together. Step 301 is followed by computing the observation weight depending on the intensity at step 302.

The function 300 normalizes the weight $\pi^n$ according to the amplitude $A^n$ of the observation $P^n$:

$$\pi^n = \frac{A^n}{\Sigma A^n}$$

The state evolution model 92 is represented by the classical model called speed constant. Kinematics model can be represented in a matrix form by:

$$p_{k+1}=F \cdot p_k+G \cdot V_k,\ V_k \sim N(0,Q_k)$$

where $p_k=(x_{obs}, \dot{x}_{obs}, y_{obs}, \dot{y}_{obs})$ is the target state vector, F the transition matrix which models the evolution of $p_k$, $Q_k$ the covariance matrix of $V_k$, and G the noise matrix which is modeled by acceleration.

$$F = \begin{bmatrix} 1 & \Delta T & 0 & 0 \\ 0 & 1 & 0 & 0 \\ 0 & 0 & 1 & \Delta T \\ 0 & 0 & 0 & 1 \end{bmatrix}$$

$$G = \begin{bmatrix} \frac{\Delta T^2}{2} & 0 \\ \Delta T & 0 \\ 0 & \frac{\Delta T^2}{2} \\ 0 & \Delta T \end{bmatrix}$$

$$Q_k = \begin{bmatrix} \sigma_x^2 & 0 \\ 0 & \sigma_y^2 \end{bmatrix}$$

The equation observation can be written as:

$$Z_k=H \cdot p_k+W_k,\ W_k \sim N(0,R_k)$$

[Where] *where* $Z_k=(x_{obs_k}, y_{obs_k})^t$ is the measurement vector, H the measurement sensitivity matrix, and $R_k$ the covariance matrix of $W_k$.

$$H = \begin{bmatrix} 1 & 0 & 0 & 0 \\ 0 & 0 & 0 & 0 \\ 0 & 0 & 1 & 0 \\ 0 & 0 & 0 & 0 \end{bmatrix}$$

-continued $$R_k = \begin{bmatrix} \sigma^2_{obs_x} & 0 \\ 0 & \sigma^2_{obs_y} \end{bmatrix}$$

The state space model 93A is based on probabilistic framework where the evolution model is supposed to be linear and the observation model is supposed to be Gaussian noise. In a 3D image, the system state encodes the information observed in the scene, e.g. the number of vehicles and their characteristics is $x_k^N=(p_k^N, l_k^N)$ with N as the number of detected vehicles, where $p_k^N$ denotes the 2D position of object N at iteration k, $l_k^N$ gives identification, age, lane and the object classification.

Figure 20:
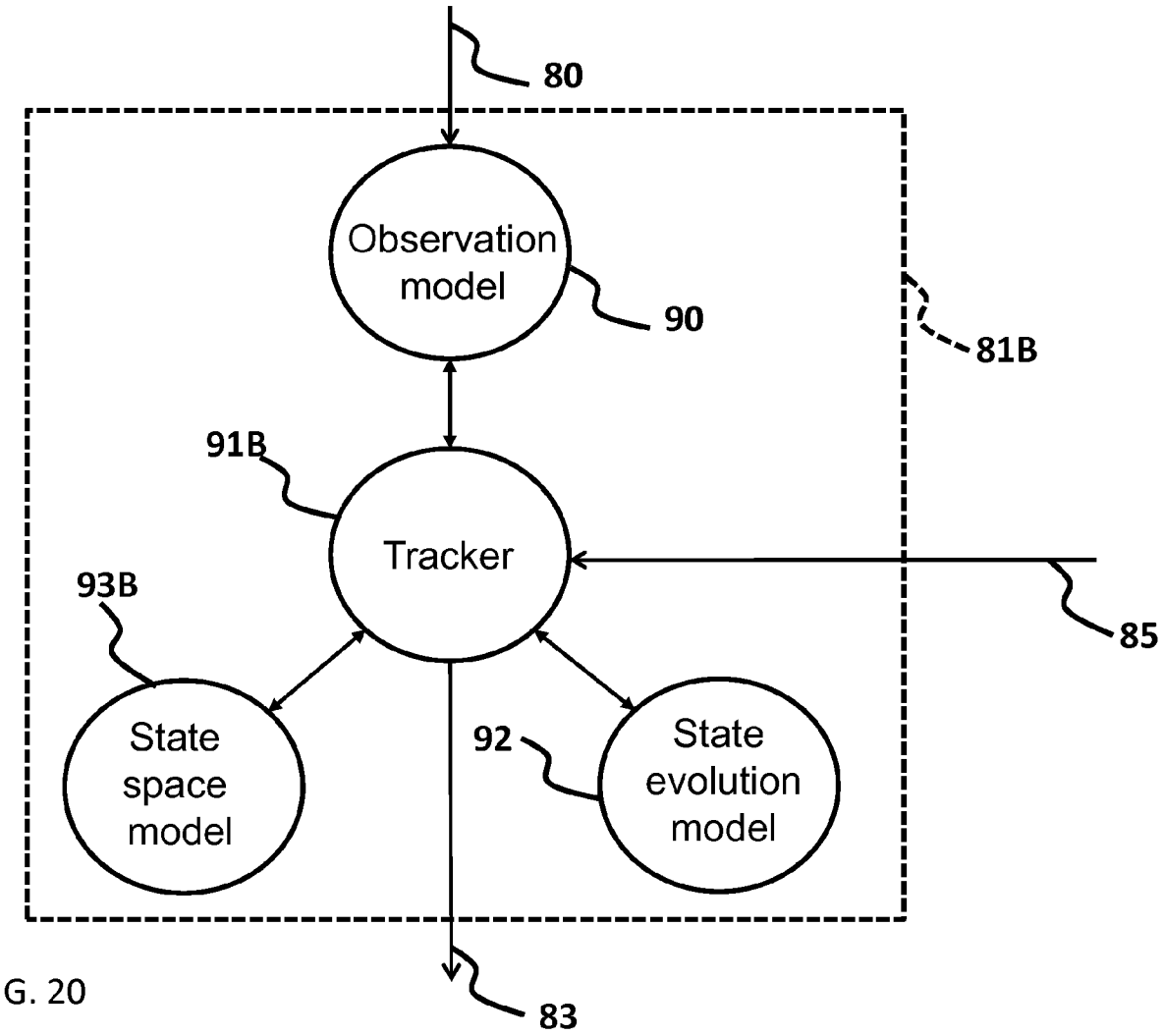
FIG. 20 is a state diagram illustrating the tracking system used with a traffic light state.

FIG. 20 shows a state diagram for 3D real-time detection multi-object joint tracker. The core of 91B is based on a Kalman Filter which addresses the issue of interacting targets, which cause occlusion issues. When an occlusion is present, 3D data alone can be unreliable, and is not sufficient to detect, at each frame, the object of interest. If the algorithm uses the traffic light state 85, occlusions can be modeled with a joint state space model 93B. The multi-object joint tracker includes a multi-object interaction distance which is implemented by including an additional interaction factor in the vehicle position. The state space model 93B encodes the observations detected in the scene, e.g. the number of vehicles, the traffic light state and the interaction between the vehicles located in the same lane by concatenating their configurations into a single super-state vector such as: $X_k=(O_k, x_k^1, \ldots, x_k^N)$ with $O_k$ the size of state space at iteration k and $x_k^N=(p_k^N, l_k^N)$ the state vector associated with the object N, where $p_k^N$ denotes the 2D position of the object N at iteration k, $l_k^N$ gives identification, age, lane, class, traffic light state and the object interaction.

Figure 22:
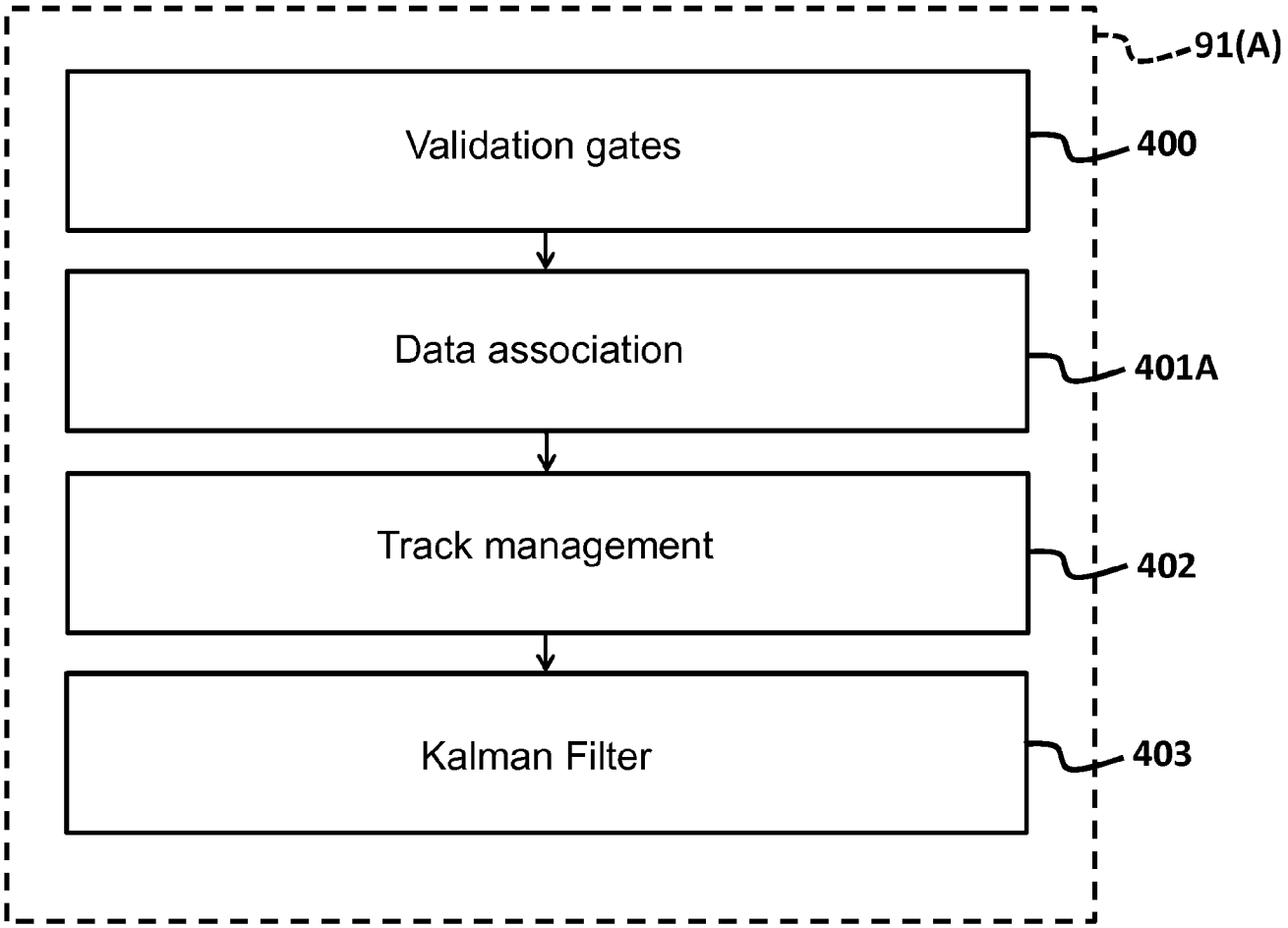
FIG. 22 is a flowchart showing example steps performed for object tracking without a traffic light state.
Figure 23:
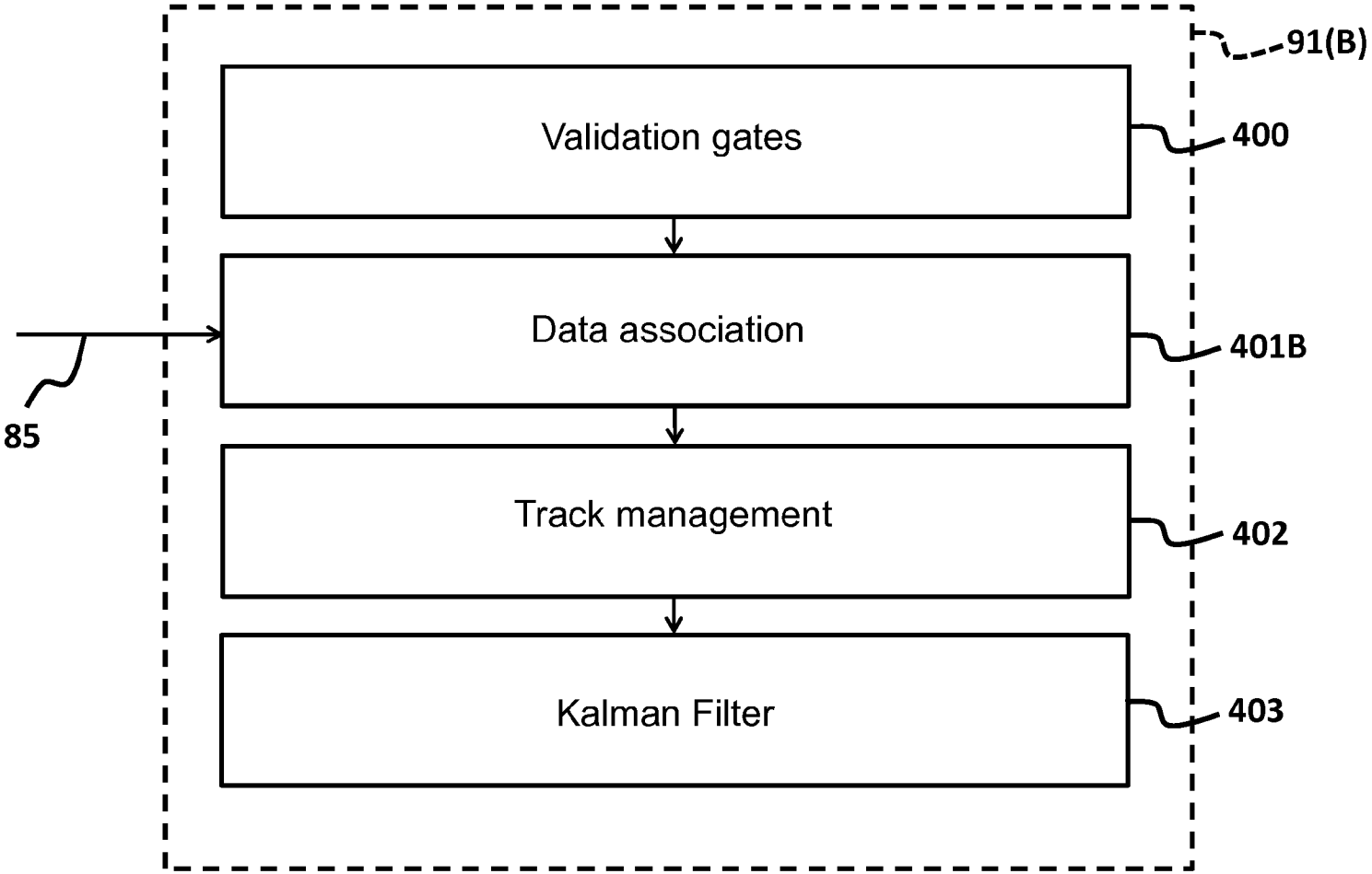
FIG. 23 is a flowchart showing example steps performed for object tracking with a traffic light state.

Before integrating measures into the filter, a selection is made by a two-step procedure shown in FIGS. 22 and 23: first at step 400 validation gate, then at step 401A/B data association. The validation gate is the ellipsoid of size $N_z$ (dimension of vector) defined such as:

$$\theta^t \cdot S^{-1} \cdot \theta \leq \gamma$$

where $\theta^t=Z_k-H\widehat{p_k}$ is the innovation, S the covariance matrix of the predicted value of the measurement vector and $\gamma$ is obtained from the chi-square tables for $N_z$ degree of freedom. This threshold represents the probability that the (true) measurement will fall in the gate. Step 400 is followed by step 401A/B which makes the matching between a blob and a hypothesis. Then, (i) consider all entries as new blobs; (ii) find the corresponding entries to each blob by considering gating intervals around the predicted position of each hypothesis, (iii) choose the nearest entry of each interval as the corresponding final observation of each blob. At step 402, the tracking algorithm uses a track management module in order to change the number of hypothesis. This definition is: (i) if, considering the existing assumption, there occurs an observation that cannot be explained, the track management module proposes a new observation; (ii) if an assumption does not find any observation after 500 ms, the track management module proposes to suppress the assumption. In this case, of course, an evolution model helps to guide state space exploration of the Kalman filter algorithm with a prediction of the state. Finally, step 403 uses a Kalman framework to estimate the final position of the vehicle.

In a 3D image, the system state encodes the information observed in the scene, the number of vehicles and their characteristics is $X_k=(O_k, x_k^1, \ldots, x_k^N)$ with $O_k$ the size of state space (number of detected vehicles) at iteration k and $x_k^N=(p_k^N, l_k^N)$ the state vector associated with object N, where $p_k^N$ denotes the 2D position of object N at iteration k, $l_k^N$ gives identification, age, lane and the object classification. Step 90 and 92 are unchanged.

Figure 24:
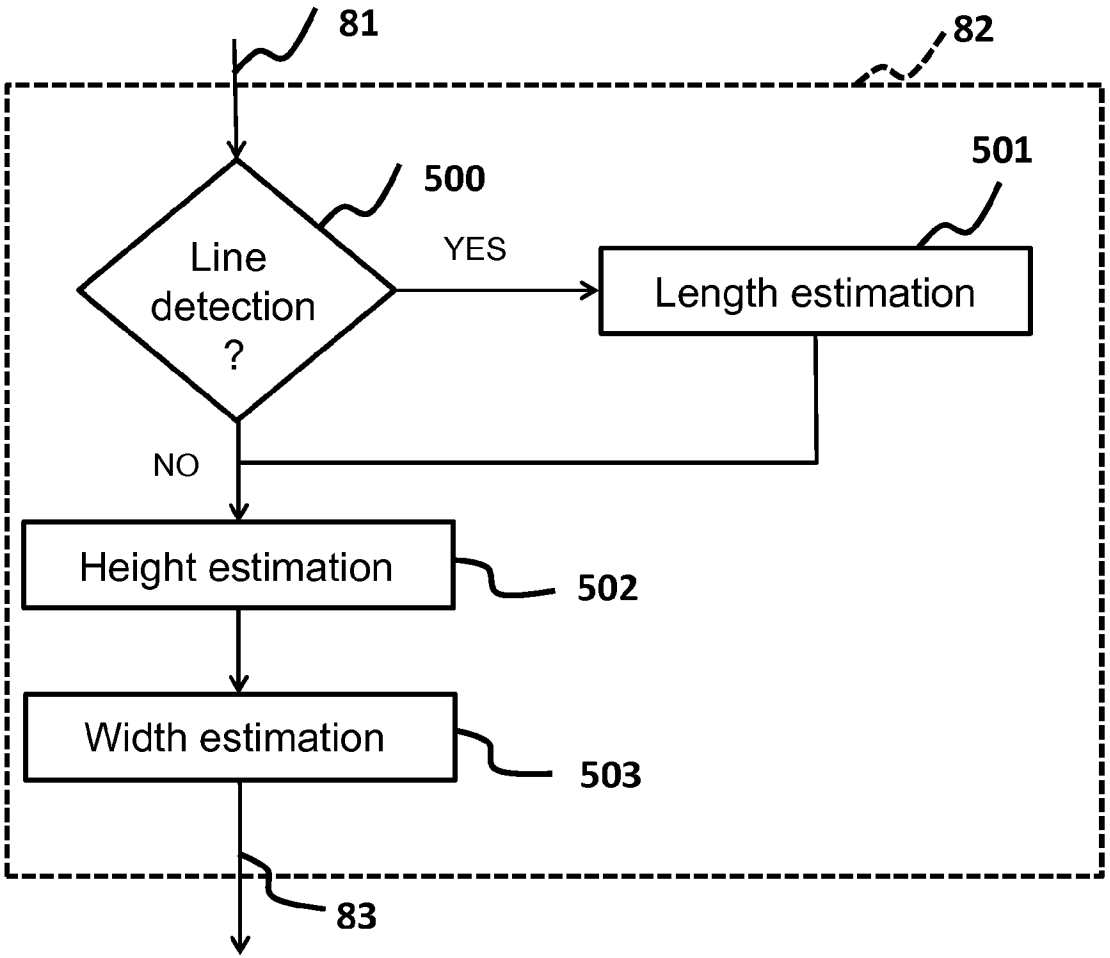
FIG. 24 is a flowchart illustrating an example classification process.

FIG. 24 shows the steps performed during the execution of the classification algorithm. At step 500, the algorithm checks if a line is detected in the 3D image. If a line is detected, step 500 is followed by step 501 which computes vehicle length. Vehicle length is defined as the overall length of the vehicle (including attached trailers) from the front to the rear. In order to calculate the length, two different positions are used: $X_0$ and $X_1 \ldots X_0$ is given by the position of the first detected line and $X_1$ is given by the trigger line 1 (for example). Once the speed has been estimated, the vehicle length l can be determined such as:

$l[m]=s[m/S]*(X_1(t)[s]-X_0(t)[s])-(X_1(x)[m])-X_0(x)[m])+Seg[m]+TH[m]$ [Where] *where* s is the vehicle speed, Seg is the length of the detected line and TH is a calibration threshold determined from a large dataset.

Figure 26:
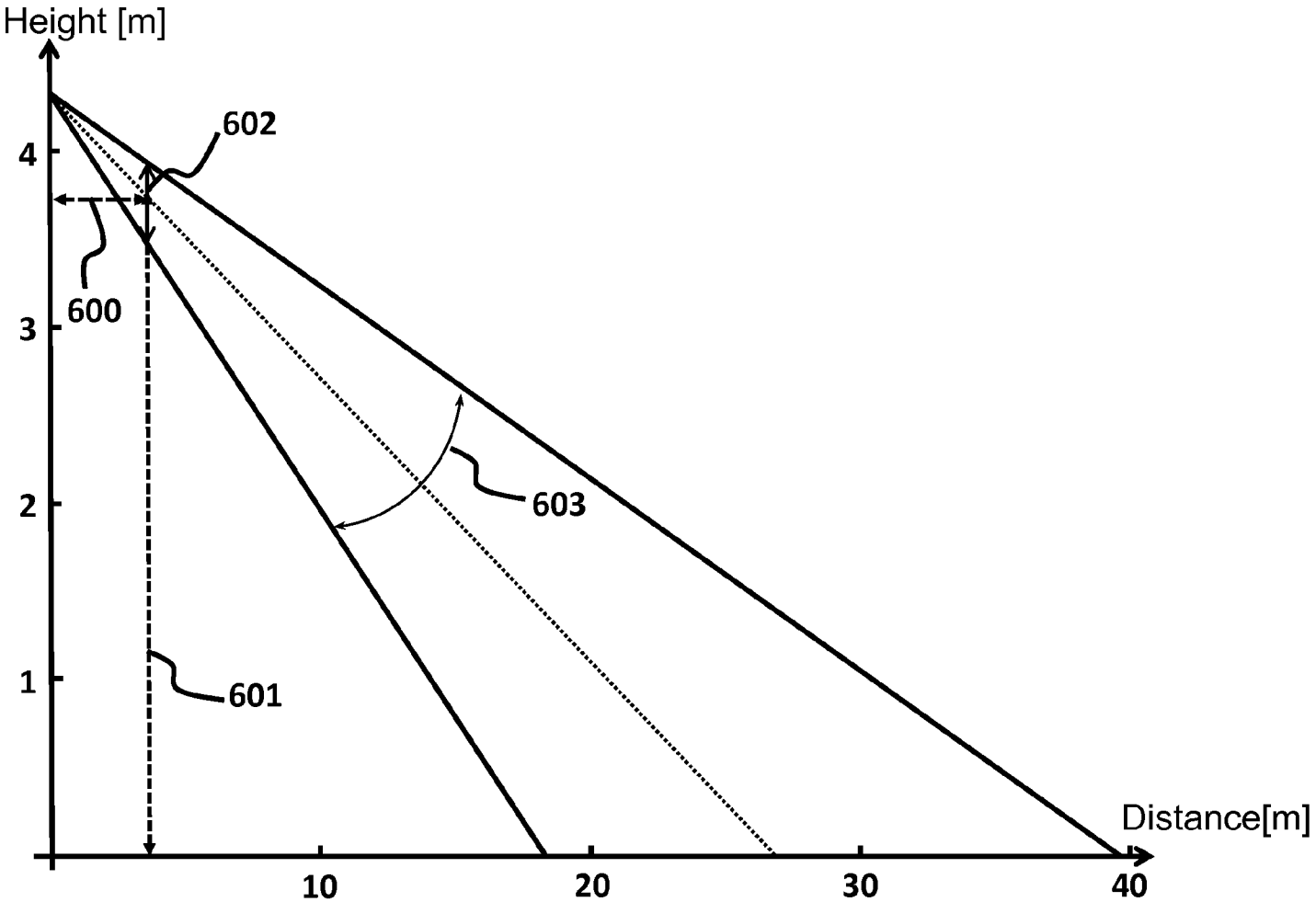
FIG. 26 illustrates the direct geometric relationship between height of the vehicle and distance of vehicle detection.

If the line is not detected at step 500, step 500 is followed by step 502 which computes the vehicle height. The vehicle height is estimated during the entry into the sensor field of view. As shown in FIG. 26, for a known configuration of the detection system, there is a direct geometric relationship between the height of a vehicle 601 and the detection distance 600. The accuracy 602 is dependent on the half-size of the vertical FOV angle 603. Height measurement is validated if the accuracy is lower than a threshold.

Finally, step 502 is followed by step 503 which computes the vehicle width. Over the vehicle blob, let [$(y_i, x)$] $(y_i, X)$ be leftmost pixel and $(y_r, x)$ be the rightmost pixel in the vehicle blob for a given x. Then the width w of the object is determined from the following formula:

$$w=|y_r-y_l|$$

Figure 25A:
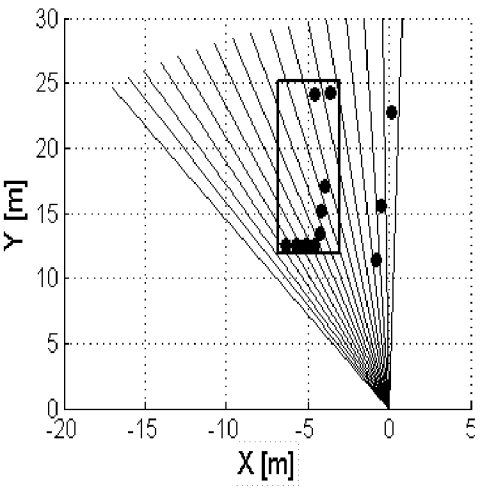
FIG. 25 includes FIGS. 25A, 25B and 25C which illustrate the relationship between the detections of a vehicle and its geometric features of width and length.
Figure 25B:
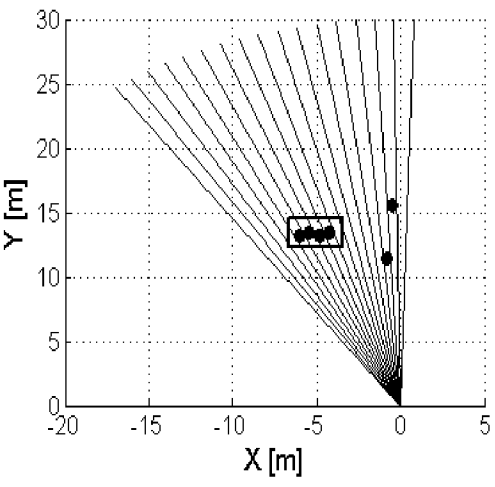
Figure 25C:
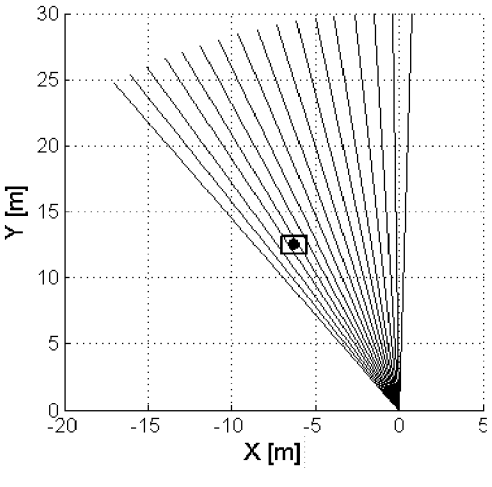

FIGS. 25A, 25B and 25C show a result of vehicle classification based on the classification algorithm. For example, in FIG. 25A, the classification result is a heavy vehicle; in FIG. 25B, it is a four-wheeled lightweight vehicle and in FIG. 25C, it is a two-wheeled lightweight vehicle. The information from the detection system is flexible and can be adapted to different schemes of classification. FIG. 25 illustrates graphically the basic elements of the concept of an object-box approach which is detailed below and in FIG. 27 and FIG. 28.

The object-box approach is mainly intended for vehicles because this approach uses the vehicle geometry in a LEDDAR image. The vehicles are represented by a 3D rectangular box of detected length, width and height. The 3D size of the rectangular box will vary depending on the detections in the FOV. FIGS. 27A, 27B, 27C and 27D show top view frames of a vehicle detected by the LEDDAR sensor. FIGS. 28A, 28B, 28C and 28D show corresponding side view frames of the vehicle of FIG. 27.

FIGS. 27A, 27B, 27C, 27D and FIGS. 28A, 28B, 28C, 28D show the changing 3D size of the rectangle 701 for four example positions of a vehicle 702 in the 3D sensor FOV 703. When a vehicle 702 enters the 3D sensor FOV 703, two detections are made on the side of the vehicle (see FIG. 27A) and one detection is made for the top of the vehicle (see FIG. 28A). The 3D rectangle is initialized with a length equal to 4 m, a width of 1.5 m and a height $O_{Hm}$ given by:

$$O_{Hm}=H_s-\text{dist}*\tan(\theta)$$

[Where] *where* $H_s$ is the sensor height 704, dist is the distance of the detected vehicle and $\theta$ is sensor pitch.

Figure 27A:
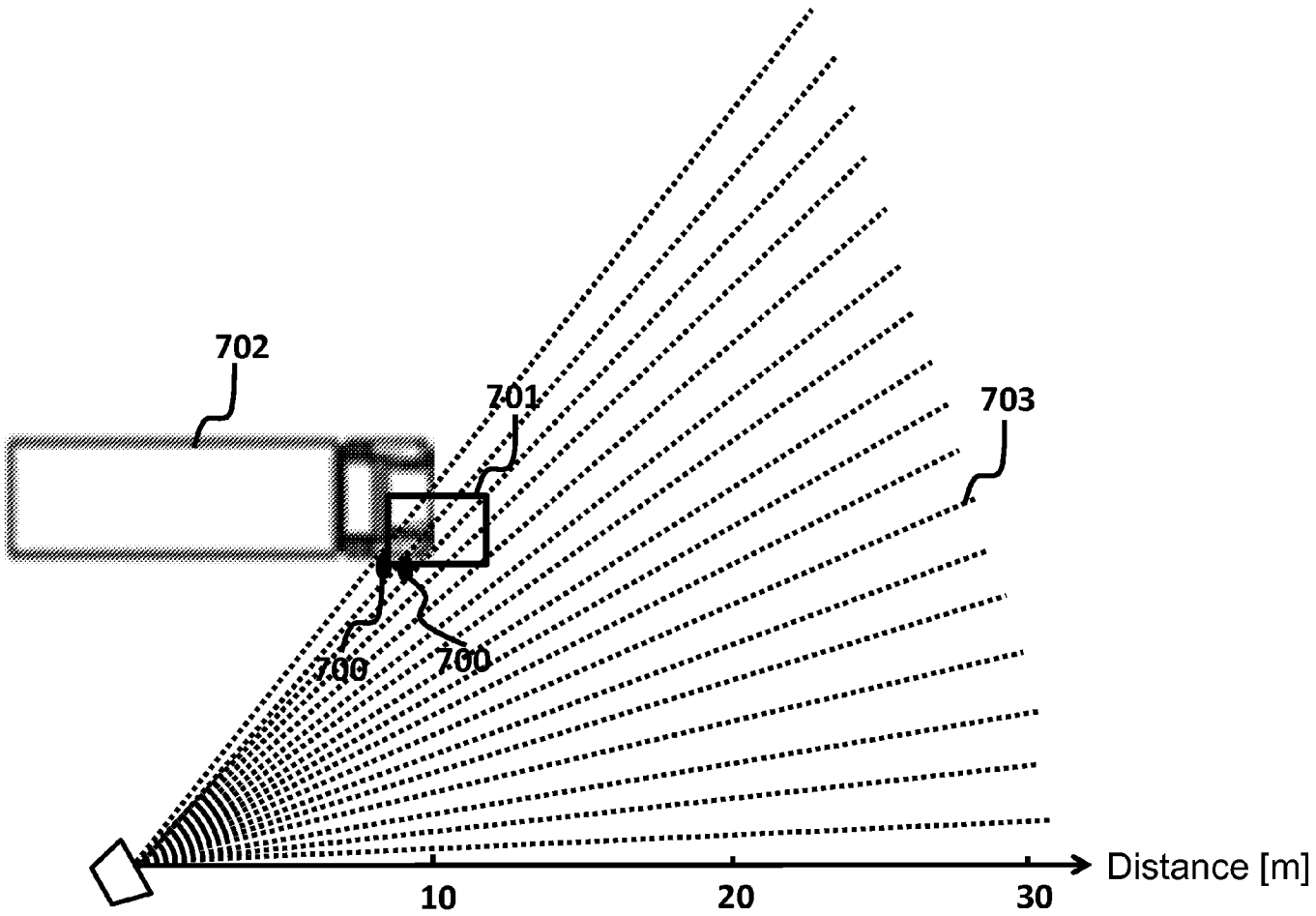
FIG. 27 includes FIGS. 27A, 27B, 27C and 27D which show top view frames of a vehicle detected by the LEDDAR sensor.
Figure 27B:
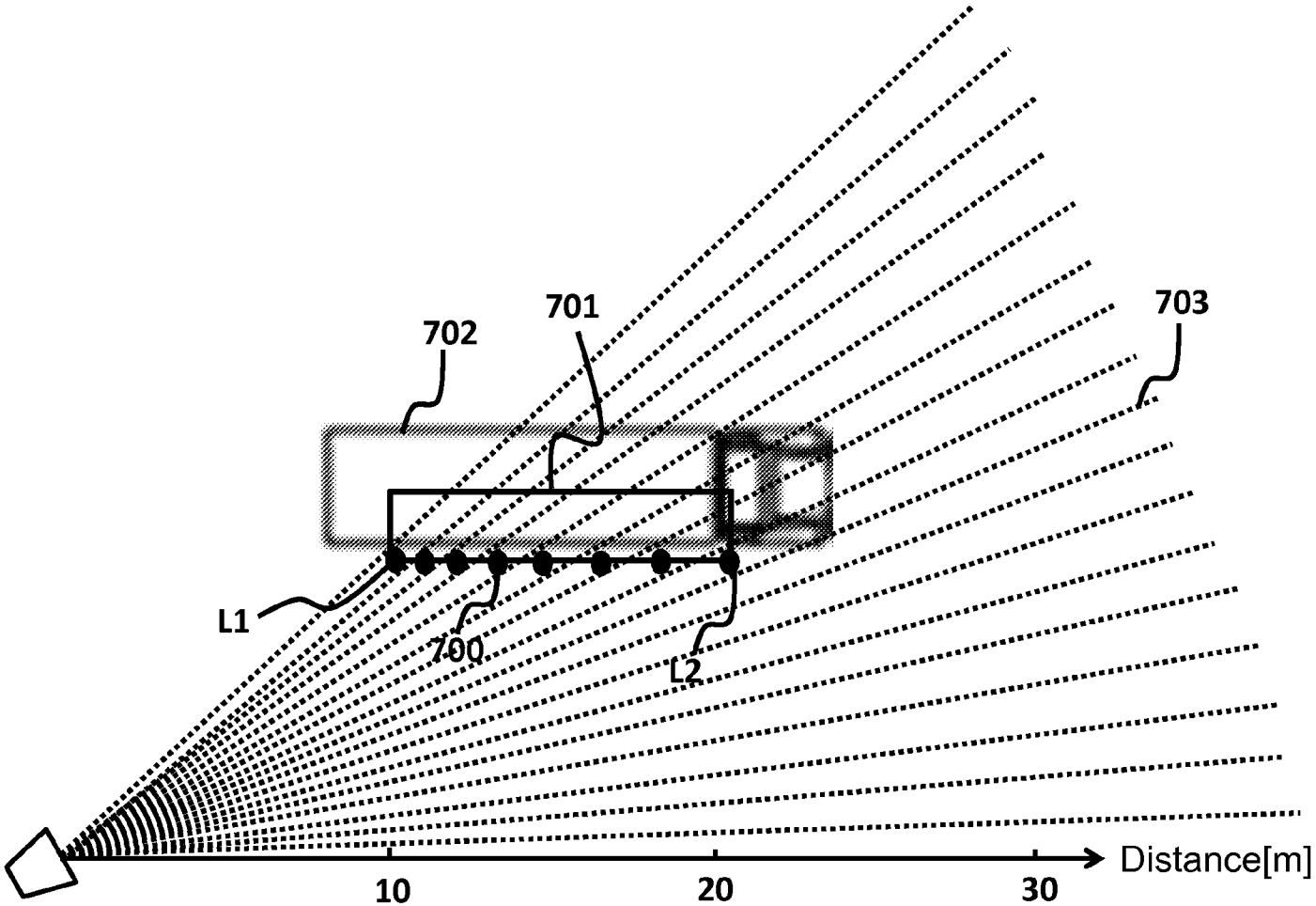
Figure 28A:
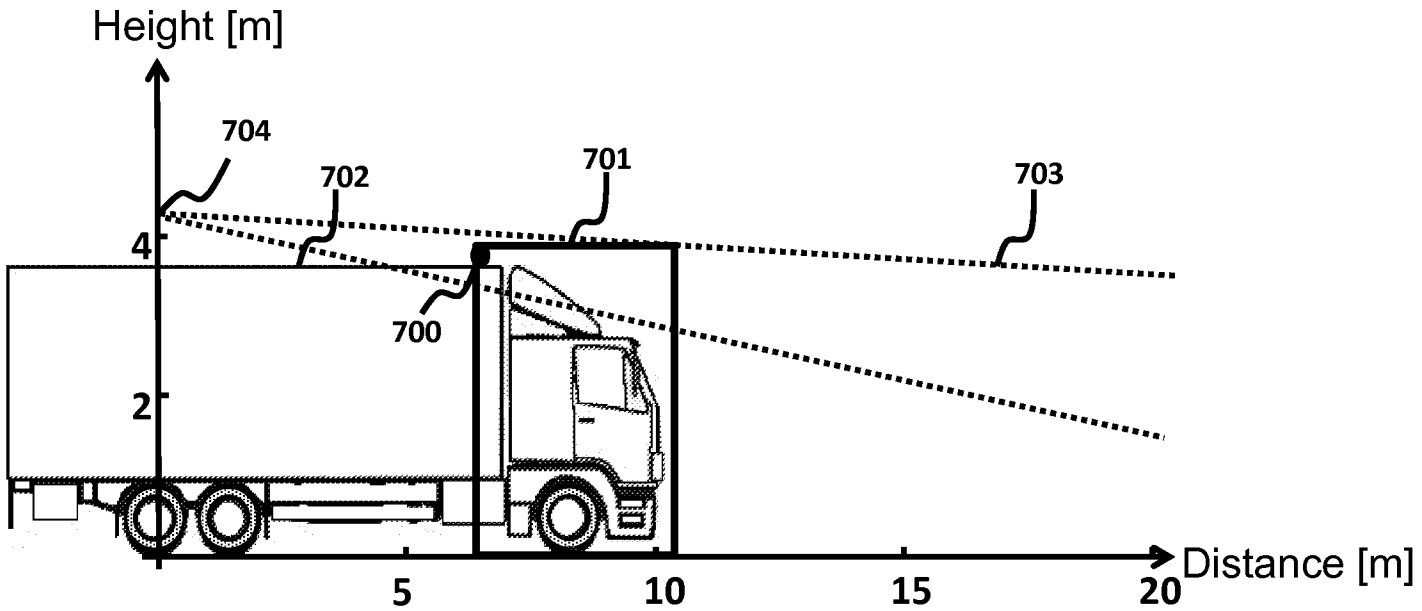
FIG. 28 includes FIGS. 28A, 28B, 28C and 28D which show corresponding side view frames of the vehicle of FIG. 27.
Figure 28B:
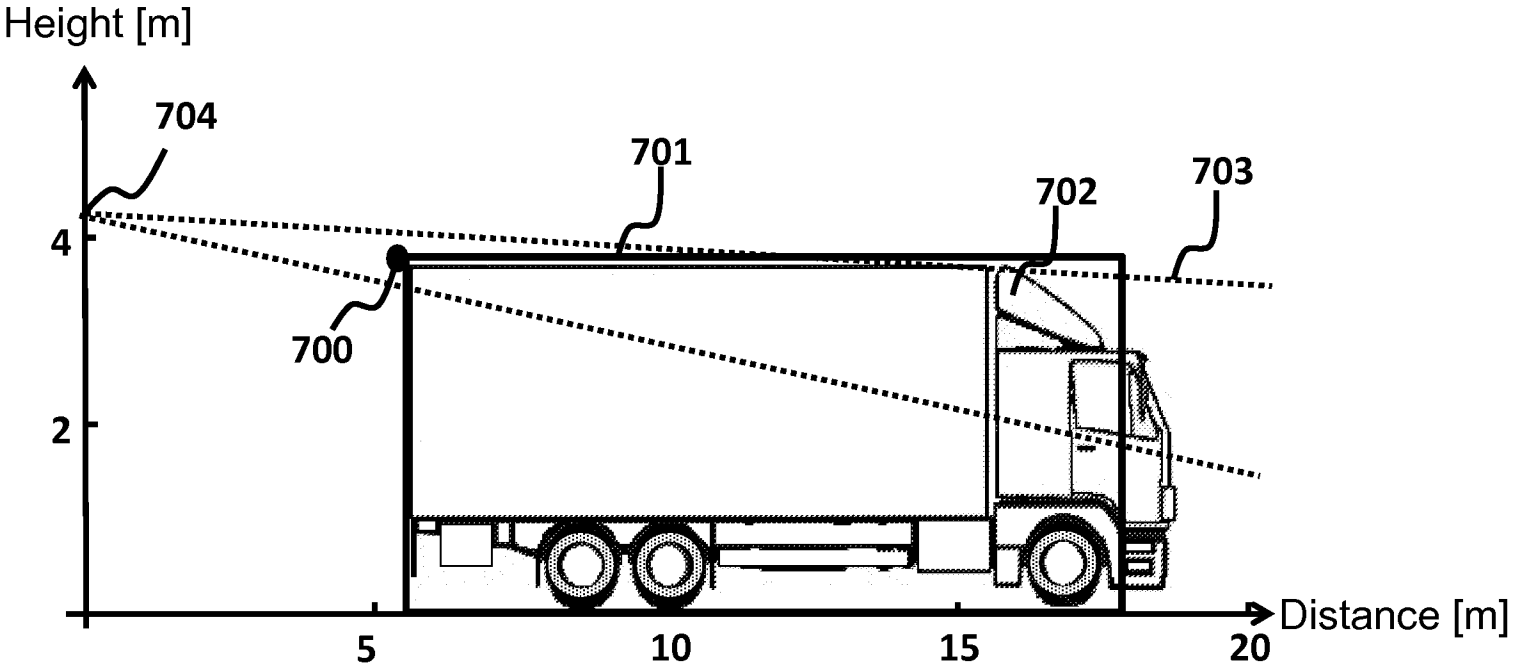

FIG. 27B and FIG. 28B represent detections when the vehicle is three-fourths of the way in the detection FOV. Eight side detections are apparent on FIG. 27B and one top detection is apparent on FIG. 28B. The dimensions of the 3D rectangle are calculated as follows:

The width is not yet adjusted because the vehicle back is not yet detected.

$$O_l(k)=\max(L_2-L_1,O_l(k-1))$$

$$O_h(k)=\max(O_{Hm},O_h(k-1))$$

[Where] *where* the points of a segment are clockwise angle sorted so $L_2$ is the point with the smallest angle and $L_1$ is the segment-point with the largest angle. $O_l(k)$ and $O_h(k)$ are respectively the current length and height value at time k.

Figure 27C:
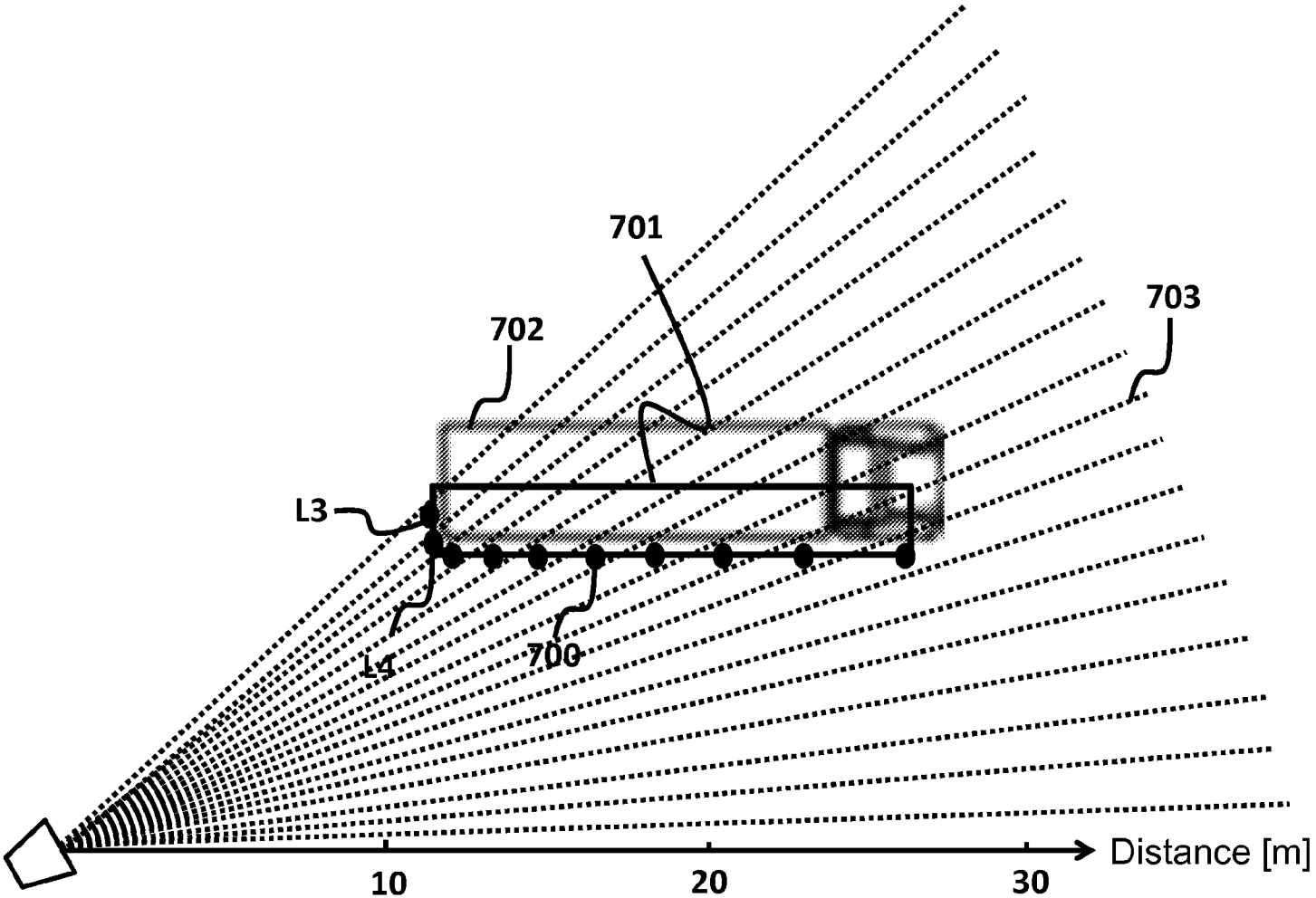
Figure 28C:
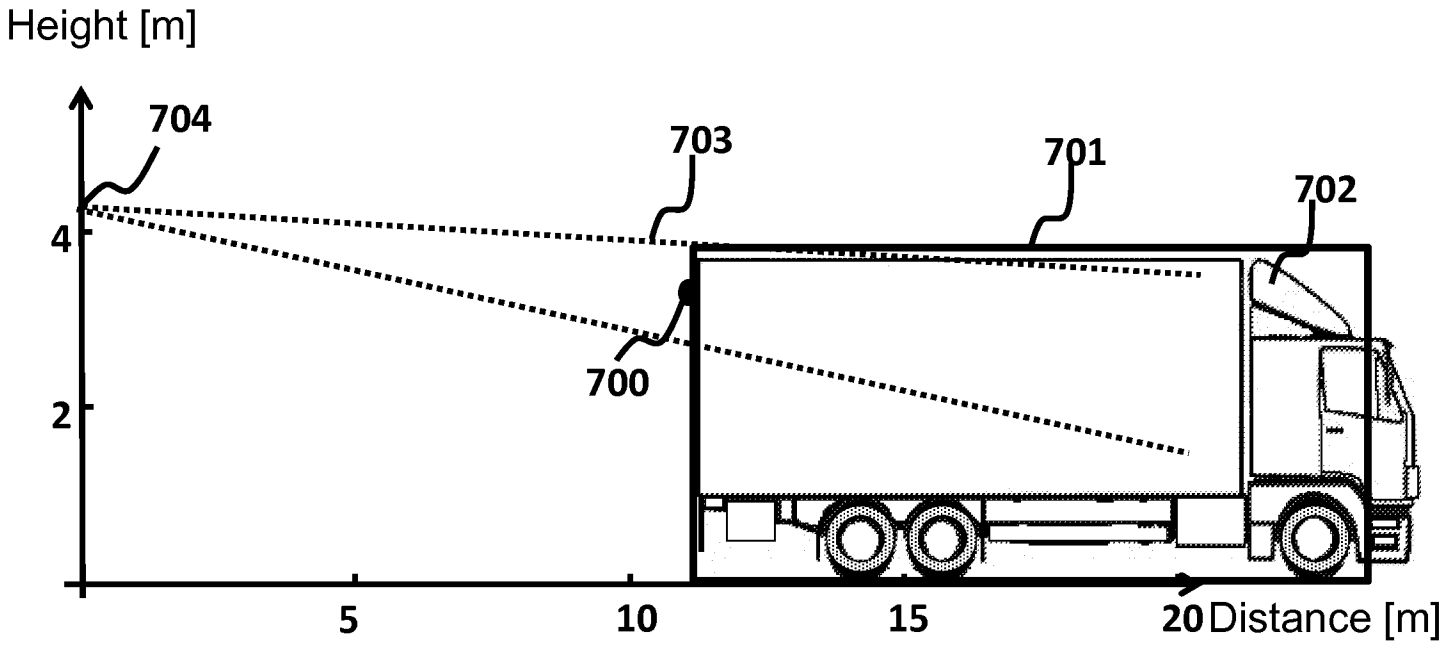

FIG. 27C and FIG. 28C represent detections when the back of the vehicle begins to enter in the detection FOV. Eight side detections and two rear detections are apparent on FIG. 27C while one detection is apparent on FIG. 28C. The dimensions of the 3D rectangle are calculated as follows:

$$O_l(k)=\max(L_2-L_1,O_l(k-1))$$

$$O_h(k)=\max(O_{Hm},O_h(k-1))$$

$$O_w(k)=\max(L_4-L_3,O_w(k-1))$$

As for the horizontal segment representing the side of the vehicle, the points of the vertical segment representing the rear and/or the top of the vehicle are clockwise angle sorted, so $L_4$ is the point with the smallest angle and $L_3$ is the segment-point with the largest angle. $O_l(k)$, $O_h(k)$ and $O_w(k)$ are respectively the current length, height and width value at time k.

Figure 27D:
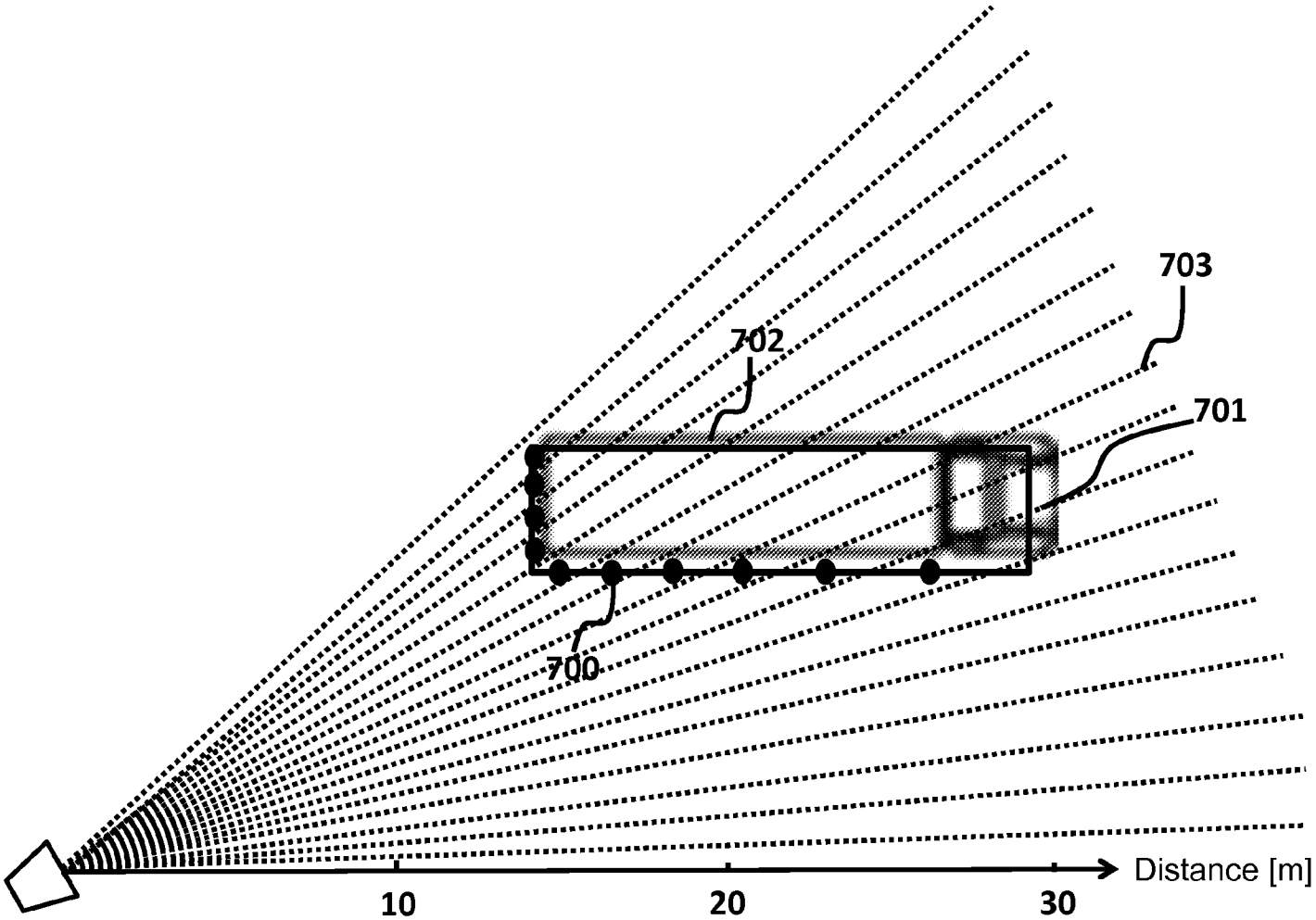
Figure 28D:
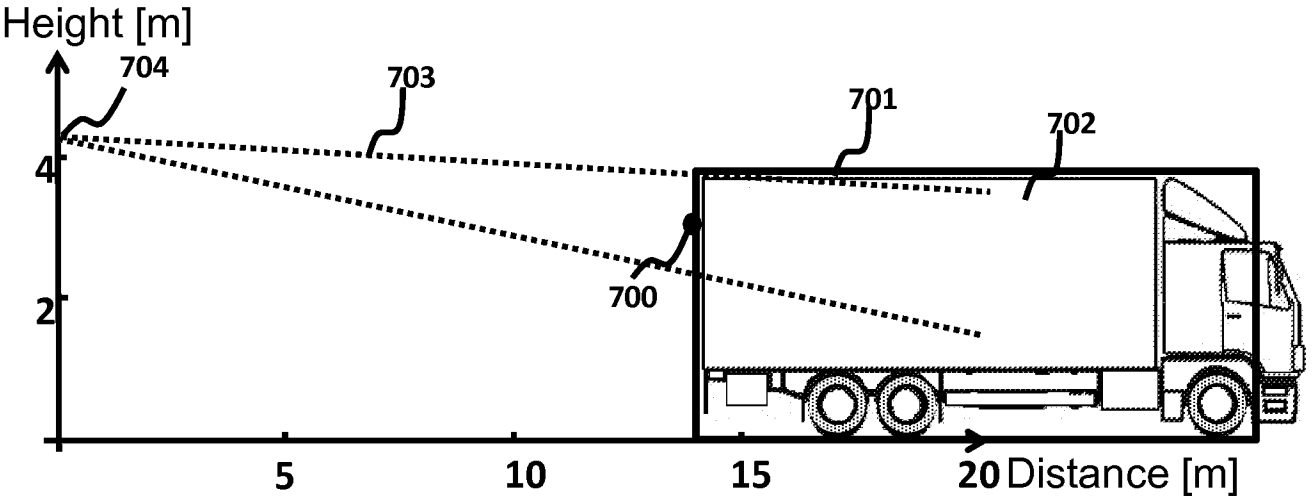

FIG. 27D and FIG. 28D represent detections when the back of the vehicle is fully in the detection FOV. Six side detections and four rear detections are apparent on FIG. 27D while one detection is apparent on FIG. 28D. The width $O_{lm}$ dimension is calculated as follows:

$$O_{lm}(k)=\alpha*(L_4-L_3)+(1-\alpha)*O_{lm}(k-1)$$

[Where] *where* $O_{lm}(k)$ is the current width at time k and $\alpha$ is the filtering rate.

The size of the vehicle can then be determined fully.

Figure 29:
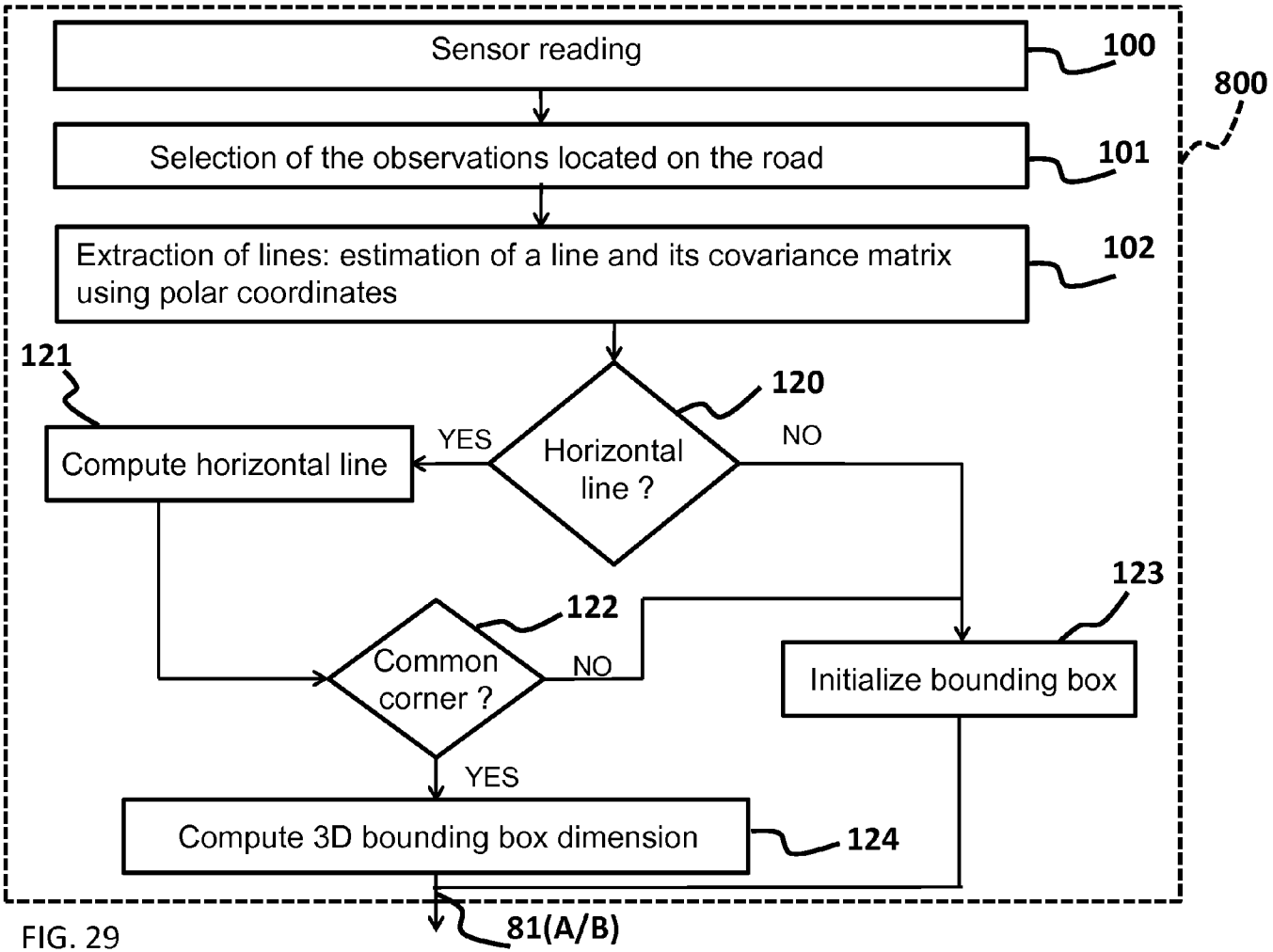
FIG. 29 is a flowchart illustrating an example segmentation algorithm based on a 3D bounding box.

The segmentation algorithm 800 based on a 3D bounding box for selection of the relevant measures is illustrated in FIG. 29. The first three steps are identical to that of FIG. 17. If step 120 finds horizontal lines, then step 120 is followed by step 121. As explained above, the points of a segment are clockwise angle sorted with $L_2$, the smallest angle and $L_1$ the largest angle. This segment length is given by $L_2-L_1$. Otherwise, the next step 123 initializes the 3D bounding box with a default vehicle length. Step 121 is followed by step 122 which considers that two segments have a common corner if there is a point of intersection $P_i$ between the two segments with $|P_i-L_1|$ and $|P_i-L_4|$ less than a distance threshold. If no corner is found, step 123 initializes the 3D bounding box with default values. Otherwise, step 124 computes the 3D bounding box dimensions from equations presented above with respect to FIG. 27C.

It is of interest to derive minimum variance bounds on estimation errors to have an idea of the maximum knowledge on the speed measurement that can be expected and to assess the quality of the results of the proposed algorithms compared with the bounds. In time-invariant statistical models, a commonly used lower bound is the Cramer-Rao Lower Bound (CRLB), given by the inverse of the Fisher information matrix. The PCRB can be used for estimating kinematic characteristics of the target.

Figure 30:
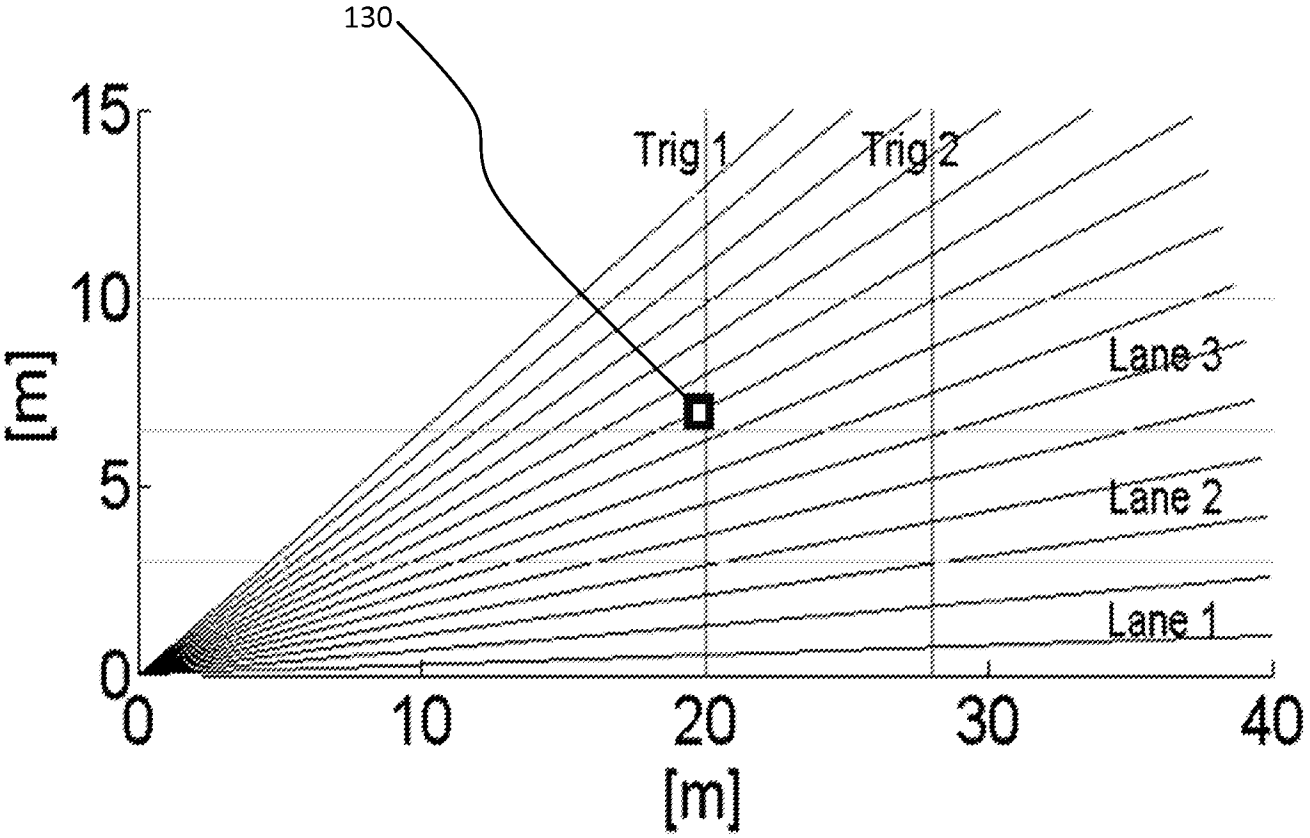
FIG. 30 is a top view of an example scenario used for the analysis of Posterior Cramer-Rao lower bound.
Figure 31:
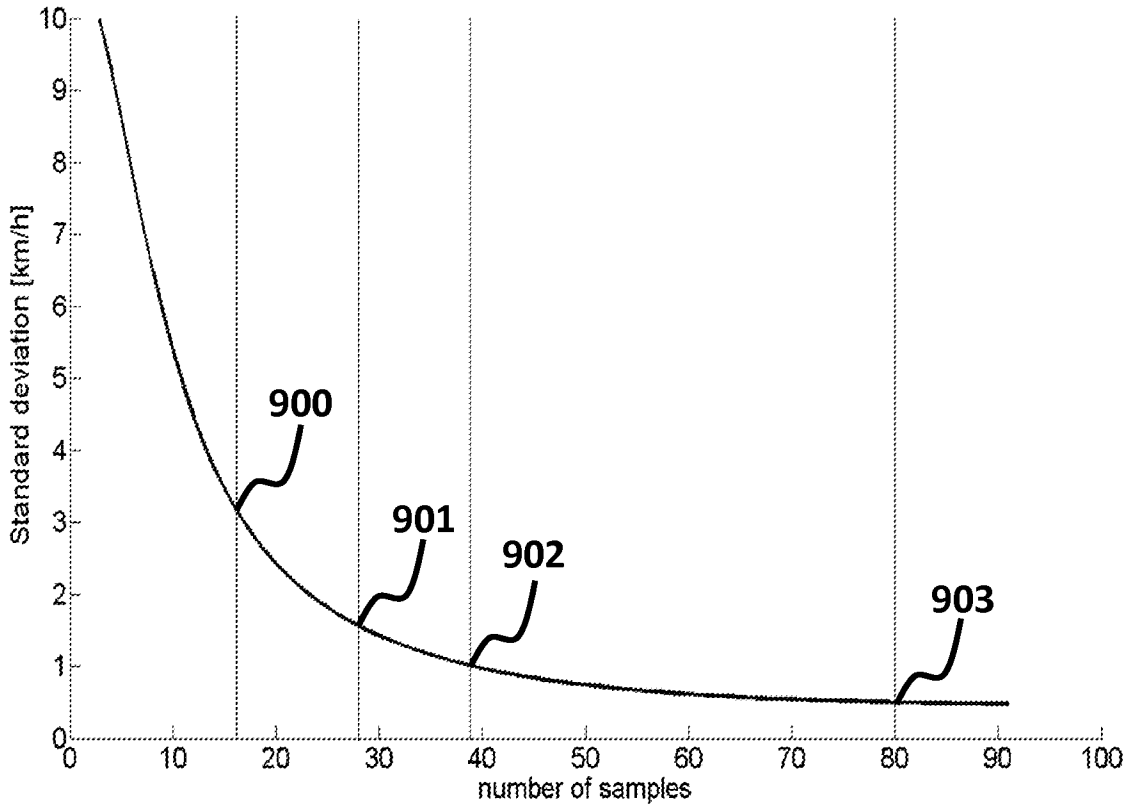
FIG. 31 is a graph showing theoretical performance of the tracking algorithm given by the PCRB.

A simulation was done according to the scenario shown in FIG. 30. The vehicle 130 is moving at a speed of 60 m/s along a straight line in lane 3. The PCRB was applied. As shown in FIG. 31, the tracking algorithm converges at point 903 at about $\sigma_{\dot{K}F}$=0.48 km/h after 80 samples. From point 900, it is apparent that after 16 samples, $\sigma_{\dot{K}F}$<3 km/h, from point 901 that after 28 samples, $\sigma_{\dot{K}F}$<1.5 km/h and from point 902 that after 39 samples, $\sigma_{\dot{K}F}$<1 km/h. Experimental tests confirmed the utility and viability of this approach.

Image Processing and Applications

The multipurpose traffic detection system uses a high-resolution image sensor or more than one image sensor with lower resolution. In the latter case, the control and processing unit has to process an image stitching by combining multiple images with different FOVs with some overlapping sections in order to produce a high-resolution image. Normally during the calibration process, the system can determine exact overlaps between images sensors and produce seamless results by controlling and synchronizing the integration time of each image sensor and the illumination timing and analyzing overlap sections. Infrared and color image sensors can be used with optical filters.

At night, a visible light is required to enhance the color of the image. A NIR flash is not visible to the human eye and does not blind drivers, so it can be used at any time of the day and night.

Image sensors can use electronic shutters (global or rolling) or mechanical shutters. In the case of rolling shutters, compensation for the distortions of fast-moving objects (skew effect) can be processed based on the information of the position and the speed of the vehicle. Other controls of the image sensor like Gamma and gain control can be used to improve the quality of the image in different contexts of illumination.

Figure 32A:
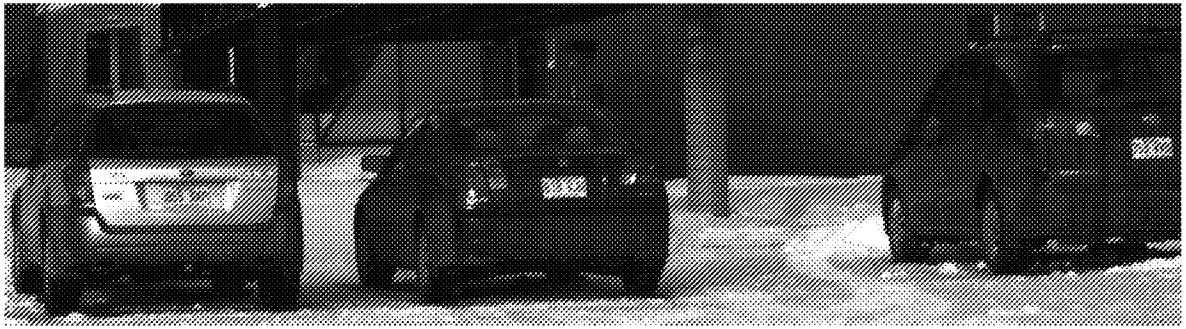
FIG. 32A is a photograph showing an example snapshot taken by the image sensor during the day.
Figure 32B:
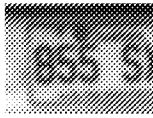
FIGS. 32B, 32C and 32D are photographs showing a zoom in on license plates in the snapshot of FIG. 32A.
Figure 32C:
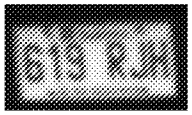
Figure 32D:
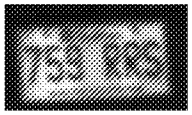

FIG. 32A is a photograph showing an example snapshot taken by a 5 Mpixels image sensor during the day. Vehicles are at a distance of approximately 25 m and the FOV at that distance covers approximately 9 m (almost equivalent to 3 lanes). FIGS. 32B, 32C and 32D show the quality of the image and resolution of FIG. 32A by zooming in on the three license plates.

Figure 33A:
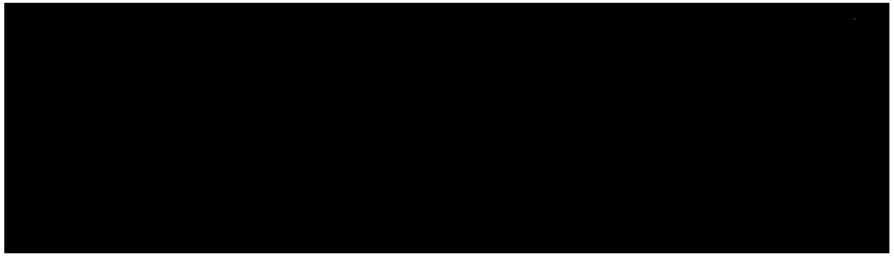
FIG. 33A is a photograph showing an example snapshot taken by the image sensor at night without any light.
Figure 33B:
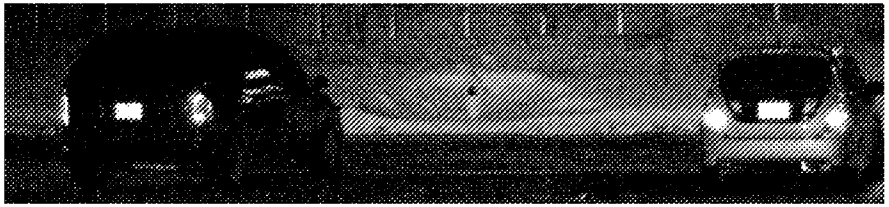
FIG. 33B is a photograph showing the same scene as FIG. 33A taken by the image sensor at night with an infrared light illumination.
Figure 33C:
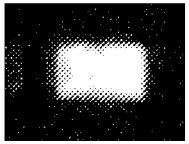
FIG. 33C is a photograph showing a zoom in on a license plate extracted from the image of FIG. 33B.
Figure 34B:
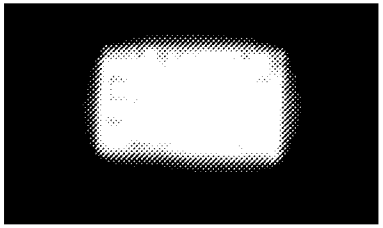
FIG. 34B is a photograph showing a zoom in on a license plate extracted from the image of FIG. 34A.
Figure 34D:
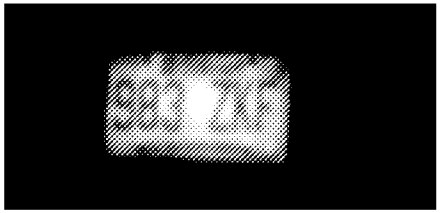
FIG. 34D is a photograph showing a zoom in on a license plate extracted from the image of FIG. 34C.
Figure 34A:
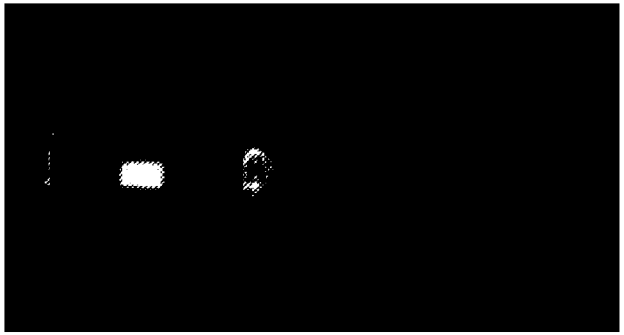
FIG. 34A is a photograph showing another example snapshot taken by the image sensor at night with infrared light.
Figure 34C:
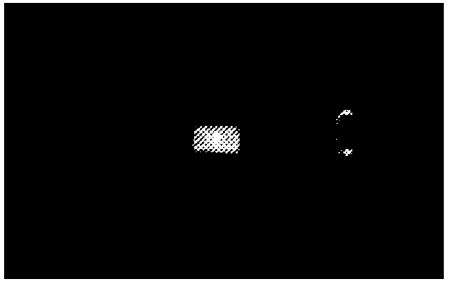
FIG. 34C is a photograph showing an example snapshot taken by the image sensor with a shorter integration time at night with infrared light.

FIG. 33A is a photograph showing an example snapshot taken by the image sensor at night without any light. This image is completely dark. FIG. 33B shows the same scene with infrared light. Two vehicles can be seen but the license plates are not readable even when zooming in as seen in FIG. 33C. The license plate acts as a retro-reflector and saturates the image sensing. FIGS. 34A and 34B use the same lighting with a lower integration time. The vehicle is less clear but the image shows some part of the license plate becoming less saturated. FIGS. 34C and 34D decrease a little more the integration time and produce a readable license plate.

One way to get a visible license plate at night and an image of the vehicle is to process several snapshots with different integration times (Ti). For example, when the 3D detection confirms the position of a vehicle in the detection zone, a sequence of acquisition of several snapshots (ex.: 4 snapshots with Ti1=50 μs, Ti2=100 μs, Ti3=250 μs and Ti4=500 μs), each snapshot taken at a certain frame rate (ex.: each 50 ms), will permit to get the information on a specific vehicle: information from the 3D sensor, a readable license plate of the tracked vehicle and an image from the context including the photo of the vehicle. If the system captures 4 images during 150 ms, a vehicle at 150 km/h would travel during 6.25 m (one snapshot every 1.5 m).

To enhance the quality of the image, high dynamic range (HDR) imaging techniques can be used to improve the dynamic range between the lightest and darkest areas of an image. HDR notably compensates for loss of information by a saturated section by taking multiple pictures at different integration times and using stitching process to make a better quality image.

The system can use Automatic License Plate Recognition (ALPR), based on Optical Character Recognition (OCR) technology, to identify vehicle license plates. This information of the vehicle identification and measurements is digitally transmitted to the external controller or by the network to back-office servers, which process the information and can traffic violation alerts.

The multipurpose traffic detection system can be used day or night, in good or bad weather condition, and also offers the possibility of providing weather information like the presence of fog or snowing conditions. Fog and snow have an impact on the reflection of the radiated light pulses of the protective window. In the presence of fog, the peak amplitude of the first pulse exhibits sizable time fluctuations, by a factor that may reach 2 to 3 when compared to its mean peak amplitude level. Likewise, the width of the first pulse also shows time fluctuations during these adverse weather conditions, but with a reduced factor, for example, by about 10 to 50%. During snow falls, the peak amplitude of the first pulse visible in the waveforms generally shows faster time fluctuations while the fluctuations of the pulse width are less intense. Finally, it can be noted that a long-lasting change in the peak amplitude of the first pulse can be simply due to the presence of dirt or snow deposited on the exterior surface of the protective window.

Figure 35:
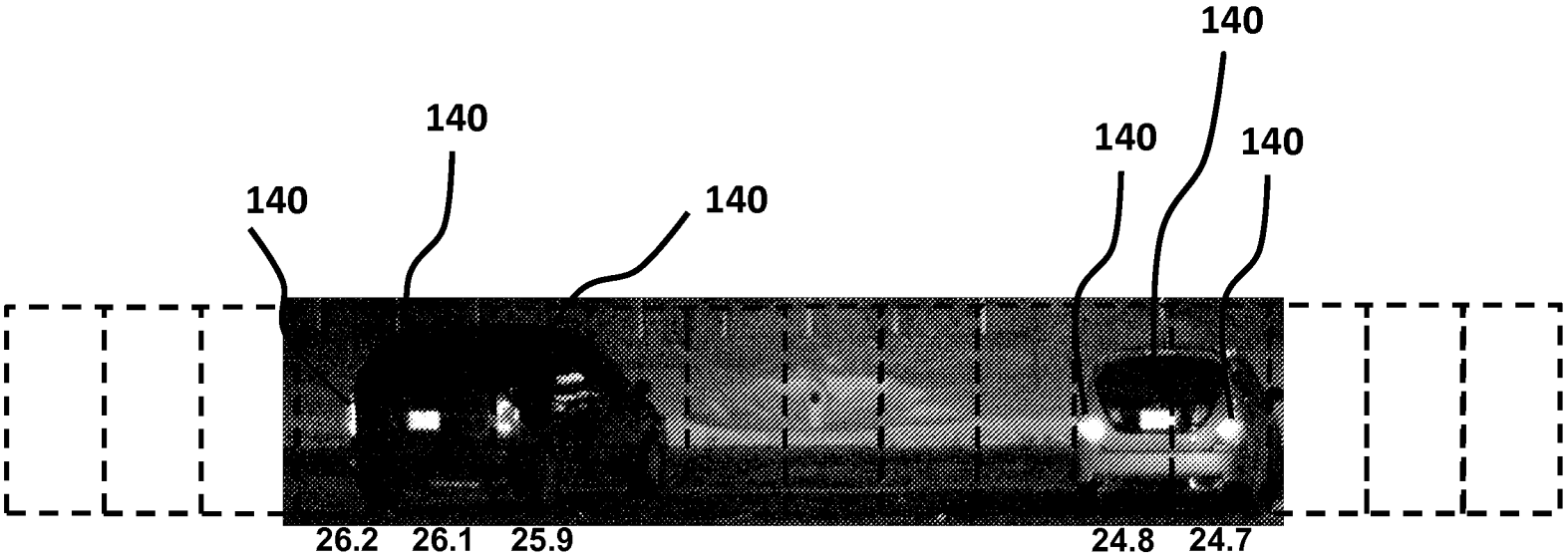
FIG. 35 is a photograph showing an example panoramic snapshot taken by the image sensor using infrared illumination in which two vehicles are present in the detection zone and on which the overlay of the 3D sensor is shown with dashed lines.

FIG. 35 shows an example image taken with infrared illumination with the overlay (dashed lines) representing the perimeter of the 16 contiguous detection zones of the 3DOR. Apparent on FIG. 35 are high intensity spots 140 coming from a section of the vehicle having a high retro-reflectivity characteristic. Such sections having a high retro-reflectivity characteristic include the license plate, retro-reflectors installed one the car and lighting modules that can include retro-reflectors. An object with retro-reflectivity characteristic reflects light back to its source with minimum scattering. The return signal can be as much as 100 times stronger than a signal coming from a surface with Lambertian reflectance. This retro-reflectivity characteristic has the same kind of impact on the 3DOR. Each 3D channel detecting a retro-reflector at a certain distance in its FOV will acquire a waveform with high peak amplitude at the distance of the retro-reflector. The numbers at the bottom of the overlay (in dashed lines) represent the distance measured by the multipurpose traffic detection system in each channel which contains a high peak in its waveform. Then, with a good image registration between the 2D image sensor and the 3D sensor, the 2D information (spot with high intensity) can be correlated with the 3D information (high amplitude at a certain distance). This link between 2D images and 3D detection ensures a match between the identification data based on reading license plates and measurements of position and velocity from the 3D sensor.

The license plate identification process can also be used as a second alternative to determine the speed of the vehicle with lower accuracy but useful as a validation or confirmation. By analyzing the size of the license plate and/or character on successive images, the progression of the vehicle in the detection zone can be estimated and used to confirm the measured displacement.

The embodiments described above are intended to be exemplary only. The scope of the invention is therefore intended to be limited solely by the appended claims.

We claim:

[1. A method for tracking and characterizing a plurality of vehicles simultaneously in a traffic control environment, the method comprising:

providing a 3D optical emitter at an installation height oriented to allow illumination of a 3D detection zone in said environment;

providing a 3D optical receiver oriented to have a wide and deep field of view within said 3D detection zone, said 3D optical receiver having a plurality of detection channels in said field of view;

driving the 3D optical emitter into emitting short light pulses toward the detection zone, said light pulses having an emitted light waveform;

receiving a reflection/backscatter of the emitted light on the vehicles in the 3D detection zone at said 3D optical receiver, thereby acquiring an individual digital full-waveform LIDAR trace for each detection channel of said 3D optical receiver;

using said individual digital full-waveform LIDAR trace and said emitted light waveform, detecting a presence of a plurality of vehicles in said 3D detection zone, a position of at least part of each said vehicle in said 3D detection zone and a time at which said position is detected;

assigning a unique identifier to each vehicle of said plurality of vehicles detected;

repeating said steps of driving, receiving, acquiring and detecting, at a predetermined frequency;

at each instance of said repeating step, tracking and recording an updated position of each vehicle of said plurality of vehicles detected and an updated time at which said updated position is detected, with said unique identifier;

wherein said detecting said presence includes:

extracting observations in the individual digital full-waveform LIDAR trace;

using the location for the observations to remove observations coming from a surrounding environment;

extracting lines using an estimate line and a covariance matrix using polar coordinates;

removing observations located on lines parallel to the x axis.]

[2. The method as claimed in claim 1, wherein said traffic control environment is at least one of a traffic management environment and a traffic enforcement environment.]

[3. The method as claimed in claim 1, wherein said detecting said presence includes extracting observations in the individual digital full-waveform LIDAR trace and intensity data for the observations;

finding at least one blob in the observations;

computing an observation weight depending on the intensity of the observations in the blob;

computing a blob gravity center based on the weight and a position of the observations in the blob.]

[4. The method as claimed in claim 1, further comprising setting at least one trigger line location and recording trigger line trespassing data with the unique identifier.]

[5. The method as claimed in claim 4, further comprising setting said trigger line location relative to a visible landmark in said environment.]

[6. The method as claimed in claim 1, wherein said detecting said time at which said position is detected includes assigning a timestamp for said detecting said presence and wherein said timestamp is adapted to be synchronized with an external controller.]

[7. The method as claimed in claim 1, further comprising obtaining a classification for each detected vehicles using a plurality of detections in the 3D detection zone caused by the same vehicle.]

[8. The method as claimed in claim 1, wherein said detecting said presence further comprises detecting a presence of a pedestrian in said environment.]

[9. The method as claimed in claim 1, wherein said part of said vehicle is one of a front, a side and a rear of the vehicle.]

[10. The method as claimed in claim 1, wherein emitting short light pulses includes emitting short light pulses of a duration of less than 50 ns.]

[11. The method as claimed in claim 1, wherein said 3D optical emitter is at least one of an infrared LED source, a visible-light LED source and a laser.]

[12. The method as claimed in claim 1, wherein said providing said 3D optical receiver to have a wide and deep field of view includes providing said 3D optical receiver to have a horizontal field of view angle of at least 20° and a vertical field of view angle of at least 4°.]

[13. The method as claimed in claim 1, further comprising determining and recording a speed for each said vehicle using said position and said updated position of one of said instances of said repeating step and an elapsed time between said time of said position and said updated time of said updated position, with said unique identifier.]

[14. The method as claimed in claim 13, further comprising using a Kalman filter to determine an accuracy for said speed to validate said speed; comparing said accuracy to a predetermined accuracy threshold; if said accuracy is lower than said predetermined accuracy threshold, rejecting said speed.]

[15. The method as claimed in claim 14, further comprising retrieving a speed limit and identifying a speed limit infraction by comparing said speed recorded for each said vehicle to said speed limit.]

[16. The method as claimed in claim 1, further comprising:

providing a 2D optical receiver, wherein said 2D optical receiver being an image sensor adapted to provide images of said 2D detection zone;

driving the 2D optical receiver to capture a 2D image;

using image registration to correlate corresponding locations between said 2D image and said detection channels;

extracting vehicle identification data from said 2D image at a location corresponding to said location for said detected vehicle;

assigning said vehicle identification data to said unique identifier.]

[17. The method as claimed in claim 16, wherein the vehicle identification data is at least one of a picture of the vehicle and a license plate alphanumerical code present on the vehicle.]

[18. The method as claimed in claim 17, wherein the vehicle identification data includes said 2D image showing a traffic violation.]

[19. The method as claimed in claim 17, further comprising extracting at least one of a size of characters on the license plate and a size of the license plate and comparing one of said size among different instances of the repeating to determine an approximate speed value.]

[20. The method as claimed in claim 16, further comprising providing a 2D illumination source oriented to allow illumination of a 2D detection zone in said 3D detection zone and driving the 2D illumination source to emit pulses to illuminate said 2D detection zone and synchronizing said driving the 2D optical receiver to capture images with said driving the 2D illumination source to emit pulses to allow capture of said images during said illumination.]

[21. The method as claimed in claim 20, wherein driving the 2D illumination source includes driving the 2D illumination source to emit pulses of a duration between 10 μs and 10 ms.]

[22. The method as claimed in claim 19, wherein the 2D illumination source is at least one of a visible light LED source, an infrared LED light source and laser.]

[23. The method as claimed in claim 19, wherein the 3D optical emitter and the 2D illumination source are provided by a common infrared LED light source.]

[24. The method as claimed in claim 19, wherein the vehicle identification data is at least two areas of high retroreflectivity apparent on the images, said detecting a presence includes extracting observations in the individual digital signals and intensity data for the observations, the method further comprising correlating locations for the areas of high retroreflectivity and high intensity data locations in the observations, wherein each said area of high retroreflectivity is created from one of a retroreflective license plate, a retro-reflector affixed on a vehicle and a retro-reflective lighting module provided on a vehicle.]

[25. The method as claimed in claim 16, further comprising combining multiples ones of said captured images into a combined image with the vehicle and the vehicle identification data apparent.]

[26. A system for tracking and characterizing a plurality of vehicles simultaneously in a traffic control environment, the system comprising:

a 3D optical emitter provided at an installation height and oriented to allow illumination of a 3D detection zone in the environment;

a 3D optical receiver provided and oriented to have a wide and deep field of view within the 3D detection zone, the 3D optical receiver having a plurality of detection channels in said field of view;

a controller for driving the 3D optical emitter into emitting short light pulses toward the detection zone, the light pulses having an emitted light waveform;

the 3D optical receiver receiving a reflection/backscatter of the emitted light on the vehicles in the 3D detection zone, thereby acquiring an individual digital full-waveform LIDAR trace for each channel of the 3D optical receiver;

a processor for detecting a presence of a plurality of vehicles in the 3D detection zone using the individual digital full-waveform LIDAR trace and the emitted light waveform, detecting a position of at least part of each the vehicle in the 3D detection zone, recording a time at which the position is detected, assigning a unique identifier to each vehicle of the plurality of vehicles detected and tracking and recording an updated position of each vehicle of the plurality of vehicles detected and an updated time at which the updated position is detected, with the unique identifier;

a 2D optical receiver, wherein the 2D optical receiver is an image sensor adapted to provide images of the 2D detection zone; and a driver for driving the 2D optical receiver to capture a 2D image;

the processor being further adapted for using image registration to correlate corresponding locations between said 2D image and said detection channels and extracting vehicle identification data from the 2D image at a location corresponding to the location for the detected vehicle; and assigning the vehicle identification data to the unique identifier.]

[27. The system as claimed in claim 26, wherein said processor is further for determining and recording a speed for each the vehicle using the position and the updated position of one of the instances of the repeating step and an elapsed time between the time of the position and the updated time of the updated position, with the unique identifier.]

[28. The system as claimed in claim 26, further comprising a 2D illumination source provided and oriented to allow illumination of a 2D detection zone in the 3D detection zone;

a source driver for driving the 2D illumination source to emit pulses;

a synchronization module for synchronizing said source driver and said driver to allow capture of said images while said 2D detection zone is illuminated.]

[29. A method for tracking and characterizing a plurality of vehicles simultaneously in a traffic control environment, the method comprising:

providing a 3D optical emitter at an installation height oriented to allow illumination of a 3D detection zone in said environment;

providing a 3D optical receiver oriented to have a wide and deep field of view within said 3D detection zone, said 3D optical receiver having a plurality of detection channels in said field of view;

driving the 3D optical emitter into emitting short light pulses toward the detection zone, said light pulses having an emitted light waveform;

receiving a reflection/backscatter of the emitted light on the vehicles in the 3D detection zone at said 3D optical receiver, thereby acquiring an individual digital full-waveform LIDAR trace for each detection channel of said 3D optical receiver;

using said individual digital full-waveform LIDAR trace and said emitted light waveform, detecting a presence of a plurality of vehicles in said 3D detection zone, a position of at least part of each said vehicle in said 3D detection zone and a time at which said position is detected;

assigning a unique identifier to each vehicle of said plurality of vehicles detected;

repeating said steps of driving, receiving, acquiring and detecting, at a predetermined frequency;

at each instance of said repeating step, tracking and recording an updated position of each vehicle of said plurality of vehicles detected and an updated time at which said updated position is detected, with said unique identifier, wherein said detecting said presence includes:

extracting observations in the individual digital full-waveform LIDAR trace and intensity data for the observations;

finding at least one blob in the observations;

computing an observation weight depending on the intensity of the observations in the blob;

computing a blob gravity center based on the weight and a position of the observations in the blob.]

*30. A vehicle detection system, comprising:*

*a 3D optical emitter oriented to allow illumination of a detection zone;*

*a 3D optical receiver having a plurality of detection channels;*

*a controller for driving the 3D optical emitter into emitting short light pulses toward the detection zone;*

*the 3D optical receiver for receiving a reflection/backscatter of the emitted light on vehicles in the detection zone, thereby for acquiring an individual full-waveform light detection and ranging (LIDAR) trace for each channel of the 3D optical receiver;*

*a processor configured to detect a presence of a plurality of vehicles in the detection zone using the individual full-waveform LIDAR trace for each channel, capture a plurality of vehicle measurements from the LIDAR trace in time steps, detect a position of at least part of each vehicle in the detection zone, and assign a unique identifier to each vehicle of the plurality of vehicles detected;*

*an image sensor adapted to provide 2D images of the detection zone; and*

*a driver for driving the image sensor to capture the 2D images;*

*the processor being further configured to:*

*correlate said vehicle measurements with corresponding locations within said 2D images;*

*associate individual ones of the measurements with one another based on a spatial relationship to measurements from preceding time steps to define one or more measurement sets, each measurement set associated with a unique identifier and representing a vehicle of the plurality of vehicles;*

*extract vehicle identification features for a vehicle of the plurality of vehicles from a corresponding location within a 2D image and compute a distance estimate using the vehicle identification features; and*

*use the measurement set representing a vehicle of the plurality of vehicles to estimate a position of the vehicle using individual measurements of the measurement set, weighted according to measurement intensity.*

*31. The vehicle detection system of claim 30, wherein said spatial relationship is defined using a Kalman filter.*

*32. The vehicle detection system of claim 30, wherein said processor is configured to match ones of said series of measurements with measurements from preceding time steps based on proximity to a position predicted from said measurements from preceding time steps.*

*33. The vehicle detection system of claim 32, wherein said processor is configured to define a spatial mask based on a kinematic movement model of a set of said measurements and associating new measurements with the set of said measurements based on said new measurements falling within said spatial mask.*

*34. The vehicle detection system of claim 33, wherein said processor is configured to suppress measurements not associated with other measurements within a defined period of time.*

*35. The vehicle detection system of claim 30, wherein said processor is configured to model occlusion caused by interacting targets in the area using a traffic light state in the area.*

*36. The vehicle detection system of claim 30, wherein said processor is configured to encode state information comprising a number of vehicles detected in the detection zone and a position for each vehicle detected.*

*37. The vehicle detection system of claim 36, wherein said state information comprises a detection age for each vehicle detected.*

*38. The vehicle detection system of claim 30, wherein said vehicle identification features comprise license plate features and said processor is configured to compute a distance estimate based on said license plate features.*

*39. The vehicle detection system of claim 38, wherein said processor is configured to compute a speed estimate based on vehicle identification data extracted from a sequence of 2D images.*

*40. A vehicle-mounted detection system, comprising:*

*a 3D optical emitter oriented to illuminate a detection zone;*

*a 3D optical receiver having a plurality of detection channels;*

*a controller configured to drive the 3D optical emitter into emitting short light pulses toward the detection zone;*

*the 3D optical receiver configured to receive a reflection/backscatter of the emitted light on vehicles in the detection zone, for acquiring an individual full-waveform light detection and ranging (LIDAR) trace for each channel of the 3D optical receiver;*

*a processor configured to detect a presence of a plurality of vehicles in the detection zone using the individual full-waveform LIDAR trace for each channel, capture a series of vehicle measurements from the LIDAR trace, the vehicle measurements comprising measurements at a plurality of time steps, detect a position of at least part of each vehicle of said plurality of vehicles in the detection zone, and assign a unique identifier to each vehicle of the plurality of vehicles detected;*

*an image sensor adapted to provide 2D images of the detection zone; and*

*a driver configured to drive the image sensor to capture the 2D images;*

*the processor further configured to:*

*correlate said vehicle measurements with corresponding locations within said 2D images;*

*group the vehicle measurements based on spatial relationship of the vehicle measurements to measurements from preceding time steps, to define one or more measurement sets, each measurement set representing a vehicle of the plurality of other vehicles;*

*extract vehicle feature data for a vehicle of the plurality of other vehicles from a corresponding location within a 2D image and compute a distance estimate for the vehicle based on the vehicle feature data; and*

*use the measurement set representing a vehicle of the plurality of other vehicles to estimate a position of said vehicle using individual measurements of the measurement set, weighted according to measurement intensity.*

*41. The detection system of claim 40, wherein said spatial relationship is defined using a Kalman filter.*

*42. The detection system of claim 40, wherein said processor is configured to match ones of said series of measurements with measurements from preceding time steps based on proximity to a position predicted from said measurements from preceding time steps.*

*43. The detection system of claim 42, wherein said processor is configured to define a spatial mask based on a kinematic movement model of a set of said measurements and associating new measurements with the set of said measurements based on said new measurements falling within said spatial mask.*

*44. The detection system of claim 40, wherein said processor is configured to suppress measurements not associated with other measurements within a defined period of time.*

*45. The detection system of claim 40, wherein said processor is configured to model occlusion caused by interacting targets in the area using a traffic light state in the area.*

*46. The detection system of claim 40, wherein said processor is configured to encode state information comprising a number of vehicles detected in the detection zone and a position for each vehicle detected.*

*47. The detection system of claim 46, wherein said state information comprises an age for each vehicle detected.*

*48. The detection system of claim 40, wherein said vehicle feature data comprises license plate features and said processor is configured to compute a distance estimate based on said license plate features.*

*49. The detection system of claim 48, wherein said processor is configured to compute a speed estimate based on vehicle feature data extracted from a sequence of 2D images.*

* * * * *